(12) United States Patent
Ortiz et al.

(10) Patent No.: US 11,973,877 B2
(45) Date of Patent: *Apr. 30, 2024

(54) SYSTEMS AND METHODS FOR SECURE TOKENIZED CREDENTIALS

(71) Applicant: ROYAL BANK OF CANADA, Toronto (CA)

(72) Inventors: Edison U. Ortiz, Orlando, FL (US); Mohammad Abuzar Shaikh, Orlando, FL (US); Margaret Inez Salter, Orlando, FL (US); Sarah Rachel Waigh Yean Wilkinson, Toronto (CA); Arya Pourtabatabaie, Orlando, FL (US); Iustina-Miruna Vintila, Bucharest (RO)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,713

(22) Filed: Dec. 26, 2022

(65) Prior Publication Data
US 2023/0140341 A1  May 4, 2023

Related U.S. Application Data

(63) Continuation of application No. 16/521,238, filed on Jul. 24, 2019, now Pat. No. 11,539,525.
(Continued)

(51) Int. Cl.
*H04L 9/32* (2006.01)
*G06N 3/04* (2023.01)
(Continued)

(52) U.S. Cl.
CPC .......... *H04L 9/3231* (2013.01); *G06N 3/04* (2013.01); *G06N 3/08* (2013.01); *G06V 10/803* (2022.01);
(Continued)

(58) Field of Classification Search
CPC .......... G06N 3/04; G06N 3/08; G06V 40/165; G10L 17/00; H04L 9/3231; H04L 9/3247
See application file for complete search history.

(56) References Cited

U.S. PATENT DOCUMENTS

| | | | |
|---|---|---|---|
| 2010/0138666 A1* | 6/2010 | Adams | G07F 7/1091 |
| | | | 713/186 |
| 2012/0173239 A1* | 7/2012 | Sanchez | G10L 17/06 |
| | | | 704/E17.001 |

(Continued)

OTHER PUBLICATIONS

United States Patent & Trademark Office (USPTO), Non Final Rejection issued to U.S. Appl. No. 16/521,238, filed Mar. 14, 2022.

*Primary Examiner* — Chau Le
(74) *Attorney, Agent, or Firm* — Norton Rose Fulbright Canada LLP

(57) ABSTRACT

Systems, devices, methods, and computer readable media are provided in various embodiments having regard to authentication using secure tokens, in accordance with various embodiments. An individual's personal information is encapsulated into transformed digitally signed tokens, which can then be stored in a secure data storage (e.g., a "personal information bank"). The digitally signed tokens can include blended characteristics of the individual (e.g., 2D/3D facial representation, speech patterns) that are combined with digital signatures obtained from cryptographic keys (e.g., private keys) associated with corroborating trusted entities (e.g., a government, a bank) or organizations of which the individual purports to be a member of (e.g., a dog-walking service).

20 Claims, 59 Drawing Sheets

Related U.S. Application Data

(60) Provisional application No. 62/839,384, filed on Apr. 26, 2019, provisional application No. 62/775,695, filed on Dec. 5, 2018, provisional application No. 62/774,130, filed on Nov. 30, 2018, provisional application No. 62/751,369, filed on Oct. 26, 2018, provisional application No. 62/702,635, filed on Jul. 24, 2018.

(51) Int. Cl.
| | | |
|---|---|---|
| *G06N 3/08* | (2023.01) | |
| *G06V 10/80* | (2022.01) | |
| *G06V 40/16* | (2022.01) | |
| *G06V 40/40* | (2022.01) | |
| *G10L 17/00* | (2013.01) | |

(52) U.S. Cl.
CPC .......... *G06V 40/165* (2022.01); *G06V 40/172* (2022.01); *G06V 40/40* (2022.01); *G10L 17/00* (2013.01); *H04L 9/3247* (2013.01)

(56) References Cited

U.S. PATENT DOCUMENTS

| | | | |
|---|---|---|---|
| 2014/0101453 A1 | 4/2014 | Senthurpandi | |
| 2015/0347734 A1* | 12/2015 | Beigi | H04L 9/3268 |
| | | | 726/28 |
| 2017/0085562 A1* | 3/2017 | Schultz | G06V 40/1371 |
| 2020/0145219 A1* | 5/2020 | Sebastian | G06F 21/32 |
| 2021/0295017 A1* | 9/2021 | Aoyagi | G06V 40/172 |

\* cited by examiner

700

```
┌─────────────────────────────────────────────────────────────┐
│ RECEIVE A FIRST VIDEO OF A USER, THE FIRST VIDEO BEING TWO  │
│                    DIMENSIONAL (2D)                         │
│                          701                                │
└─────────────────────────────────────────────────────────────┘
                              ↓
┌─────────────────────────────────────────────────────────────┐
│  ANALYZE THE FIRST VIDEO TO OBTAIN A FIRST SET OF PROFILE DATA │
│   BASED ON A FACIAL MOVEMENT OF THE USER IN THE FIRST VIDEO │
│                          702                                │
└─────────────────────────────────────────────────────────────┘
                              ↓
┌─────────────────────────────────────────────────────────────┐
│ RECEIVE A SECOND VIDEO OF A USER, THE SECOND VIDEO BEING THREE │
│       DIMENSIONAL (3D) AND HAVING A DEPTH COMPONENT         │
│                          703                                │
└─────────────────────────────────────────────────────────────┘
                              ↓
┌─────────────────────────────────────────────────────────────┐
│ DETERMINE THE USER IN THE SECOND VIDEO IS THE USER IN THE FIRST │
│            VIDEO BASED ON THE FIRST AND SECOND VIDEOS       │
│                          704                                │
└─────────────────────────────────────────────────────────────┘
                              ↓
┌─────────────────────────────────────────────────────────────┐
│ ANALYZE THE SECOND VIDEO TO OBTAIN A SECOND SET OF PROFILE DATA │
│  BASED ON A FACIAL MOVEMENT OF THE USER IN THE SECOND VIDEO │
│                          705                                │
└─────────────────────────────────────────────────────────────┘
                              ↓
┌─────────────────────────────────────────────────────────────┐
│   STORE THE FIRST AND SECOND SETS OF PROFILE DATA IN THE USER PROFILE │
│                          706                                │
└─────────────────────────────────────────────────────────────┘
                              ↓
┌─────────────────────────────────────────────────────────────┐
│                RECEIVE A THIRD VIDEO OF A USER              │
│                          707                                │
└─────────────────────────────────────────────────────────────┘
                              ↓
┌─────────────────────────────────────────────────────────────┐
│                     ANALYZE THE THIRD VIDEO                 │
│                          708                                │
└─────────────────────────────────────────────────────────────┘
                              ↓
┌─────────────────────────────────────────────────────────────┐
│ VERIFY THAT THE USER IN THE THIRD VIDEO IS THE USER IN THE USER │
│    PROFILE BASED ON THE FIRST OR SECOND SET OF PROFILE DATA │
│                          709                                │
└─────────────────────────────────────────────────────────────┘
```

FIG. 7

2D facial recognition can't distinguish similar people
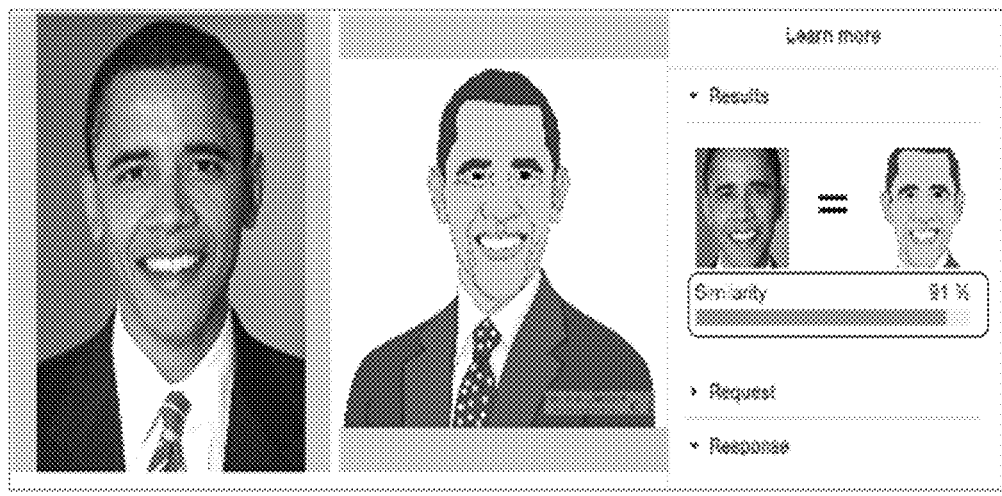
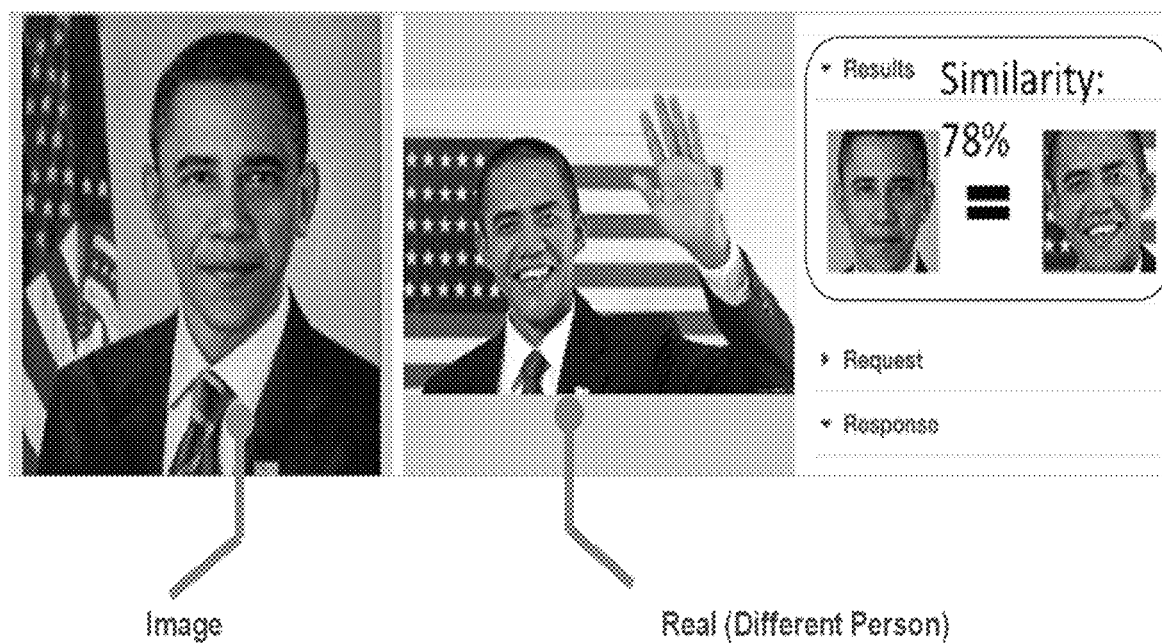
Image        Real (Different Person)
* Amazon Rekognition and Azure only offers 2D facial recognition
* FaceID on iPhoneX uses depth analysis, however, APIs are not open to developers
* Infrared hardware on iPhoneX is not accessible by developers
FIG. 11

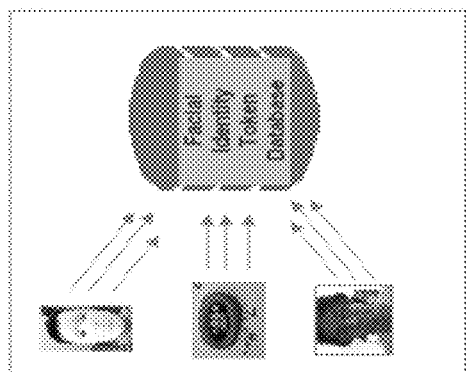

Facial Identity Token: Extracted features (e.g., 2D, Lip Movement, 3D) are encrypted and stored as string in a secure database

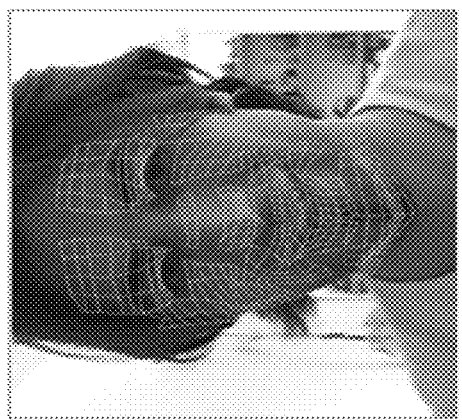

3D Depth Video Analysis: Extract and utilize user's depth facial features in situations where a depth camera is available

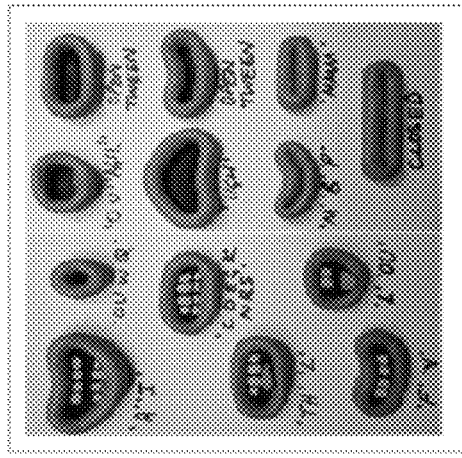

Lip Movement: AI to extract and interpret the user's lip movement against RBC-provided words as a way to validate the user

Pixel Mask: Applying an AR face mask via mobile to gamify and extract user's 2D facial features

FIG. 12

Leverage GAN in the system when needed

Problem
Video has proliferated the world, which has lead to latency problems due to high traffic and low bandwidth. A result, videos are transmitted at lower resolution to reduce latency and cost.

What is GAN?
GAN (Generative Adversarial Networks) is a Deep Learning algorithm that can use the algorithm to generate and render a better quality video. A browser plugin could be trained to upscale the frames of video.

Advantage of GAN

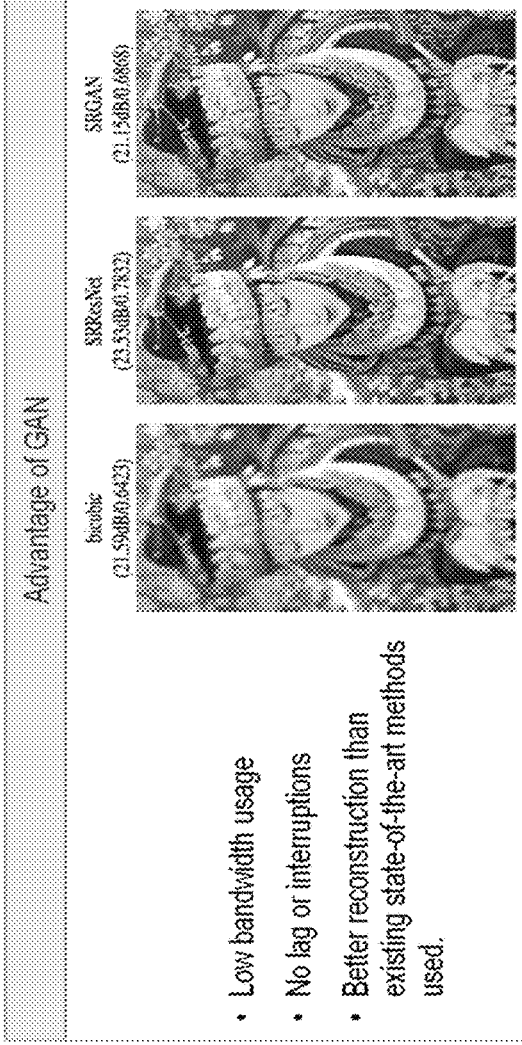

- Low bandwidth usage
- No lag or interruptions
- Better reconstruction than existing state-of-the-art methods used.

GAN Diagram

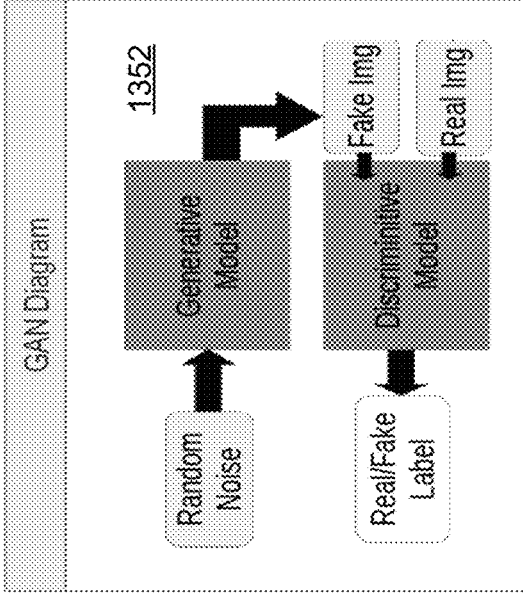

```
┌─────────────────────────────────────────────────────────────┐
│ RECEIVING ONE OR MORE IMAGES OR VIDEOS TAKEN BY A CAMERA,   │
│ EACH IMAGE OR VIDEO CONTAINING A FACE                       │
│ 2701                                                        │
└─────────────────────────────────────────────────────────────┘
                              │
                              ▼
┌─────────────────────────────────────────────────────────────┐
│ EXTRACTING ONE OR MORE FACIAL FEATURES OF THE FACE FROM EACH│
│ OF THE IMAGES OR VIDEOS BY PROCESSING THE IMAGE OR VIDEO TO │
│ GENERATE LOCATION COORDINATES OF EACH OF THE ONE OR MORE    │
│ FACIAL FEATURES                                             │
│ 2702                                                        │
└─────────────────────────────────────────────────────────────┘
                              │
                              ▼
┌─────────────────────────────────────────────────────────────┐
│ USING THE IMAGE AND LOCATION COORDINATES TO GENERATE A TOKEN│
│ 2703                                                        │
└─────────────────────────────────────────────────────────────┘
                              │
                              ▼
┌─────────────────────────────────────────────────────────────┐
│ A SIGNING AUTHORITY VERIFIES AND SIGNS THE TOKEN            │
│ 2704                                                        │
└─────────────────────────────────────────────────────────────┘
                              │
                              ▼
┌─────────────────────────────────────────────────────────────┐
│ SIGNED TOKEN IS SAVED IN A USER'S MOBILE DEVICE             │
│ 2705                                                        │
└─────────────────────────────────────────────────────────────┘
```

```
┌─────────────────────────────────────────────────────────────────┐
│ USER SCANS A QR OR BAR CODE USING A MOBILE DEVICE TO ASSOCIATE  │
│         THE MOBILE DEVICE WITH THE VERIFICATION PROCESS         │
│                              2801                               │
└─────────────────────────────────────────────────────────────────┘
                                 ↓
┌─────────────────────────────────────────────────────────────────┐
│           VENDOR POS TAKES A PICTURE OR IMAGE OF USER'S FACE    │
│                              2802                               │
└─────────────────────────────────────────────────────────────────┘
                                 ↓
┌─────────────────────────────────────────────────────────────────┐
│   POS EXTRACTING ONE OR MORE FACIAL FEATURES OF THE FACE FROM   │
│   EACH OF THE IMAGES OR VIDEOS BY PROCESSING THE IMAGE OR VIDEO │
│   TO GENERATE LOCATION COORDINATES OF EACH OF THE ONE OR MORE   │
│                        FACIAL FEATURES                          │
│                              2803                               │
└─────────────────────────────────────────────────────────────────┘
                                 ↓
┌─────────────────────────────────────────────────────────────────┐
│   POS USING THE IMAGE AND LOCATION COORDINATES TO GENERATE A    │
│                             TOKEN                               │
│                              2804                               │
└─────────────────────────────────────────────────────────────────┘
           ↓                                       ↓
┌────────────────────────────┐    ┌──────────────────────────────────┐
│   GENERATED TOKEN IS       │    │ IF THE USER'S MOBILE DEVICE IS   │
│   COMPARED AGAINST SIGNED  │    │ NOT REACHABLE, OR IT DOES        │
│   TOKENS STORED IN THE     │    │ NOT HAVE THE SIGNED TOKENS,      │
│   USER'S MOBILE DEVICE TO  │    │ POS MAY REACH AN EXTERNAL        │
│   CHECK FOR USER'S         │    │ DATABASE (E.G. FEATURE OR        │
│   IDENTITY                 │    │ TOKEN DATABASE) FOR THE          │
│   2805                     │    │ PURPOSE OF IDENTITY              │
│                            │    │ VERIFICATION                     │
│                            │    │ 2806                             │
└────────────────────────────┘    └──────────────────────────────────┘
```

FIG. 28

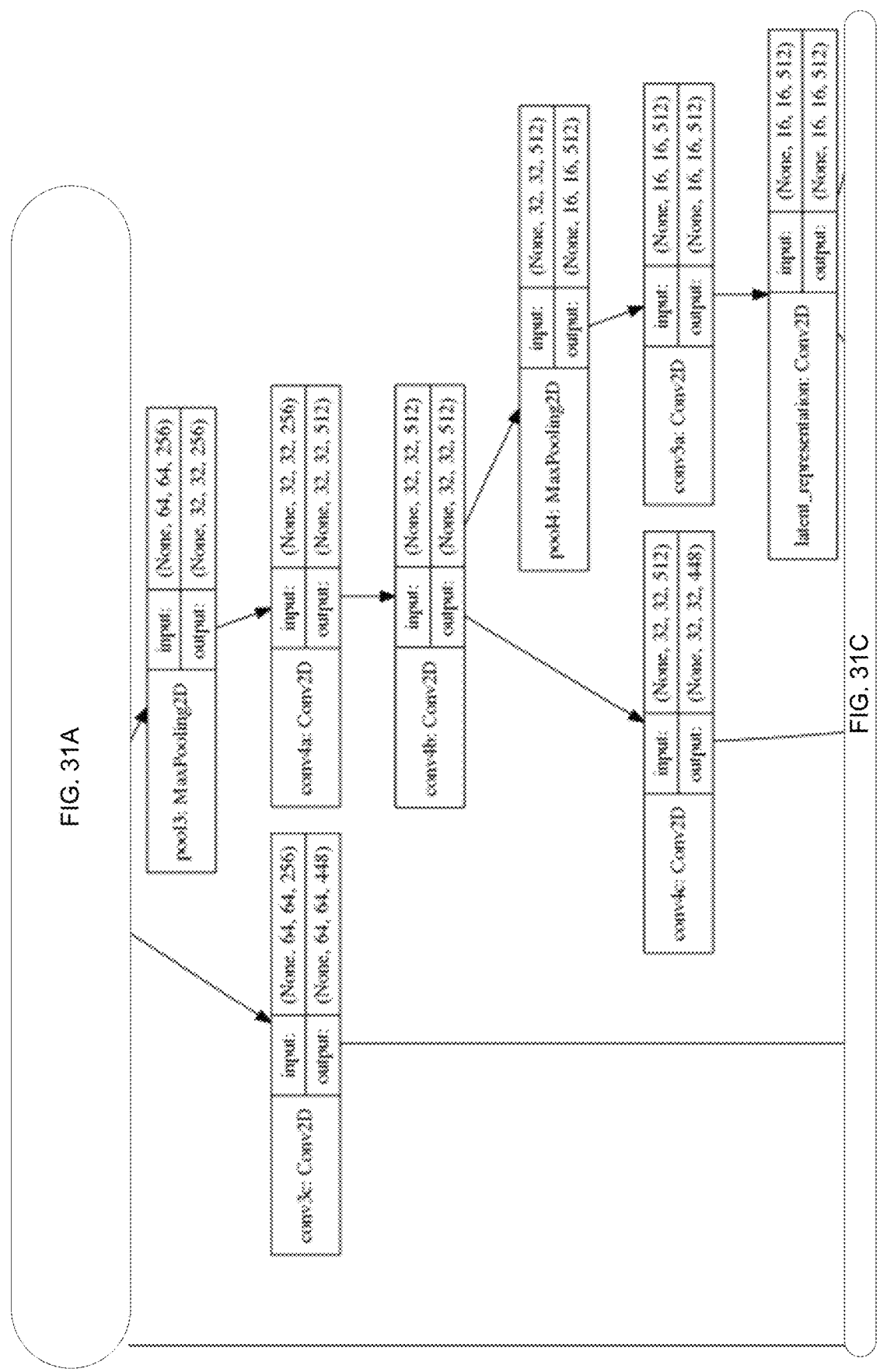

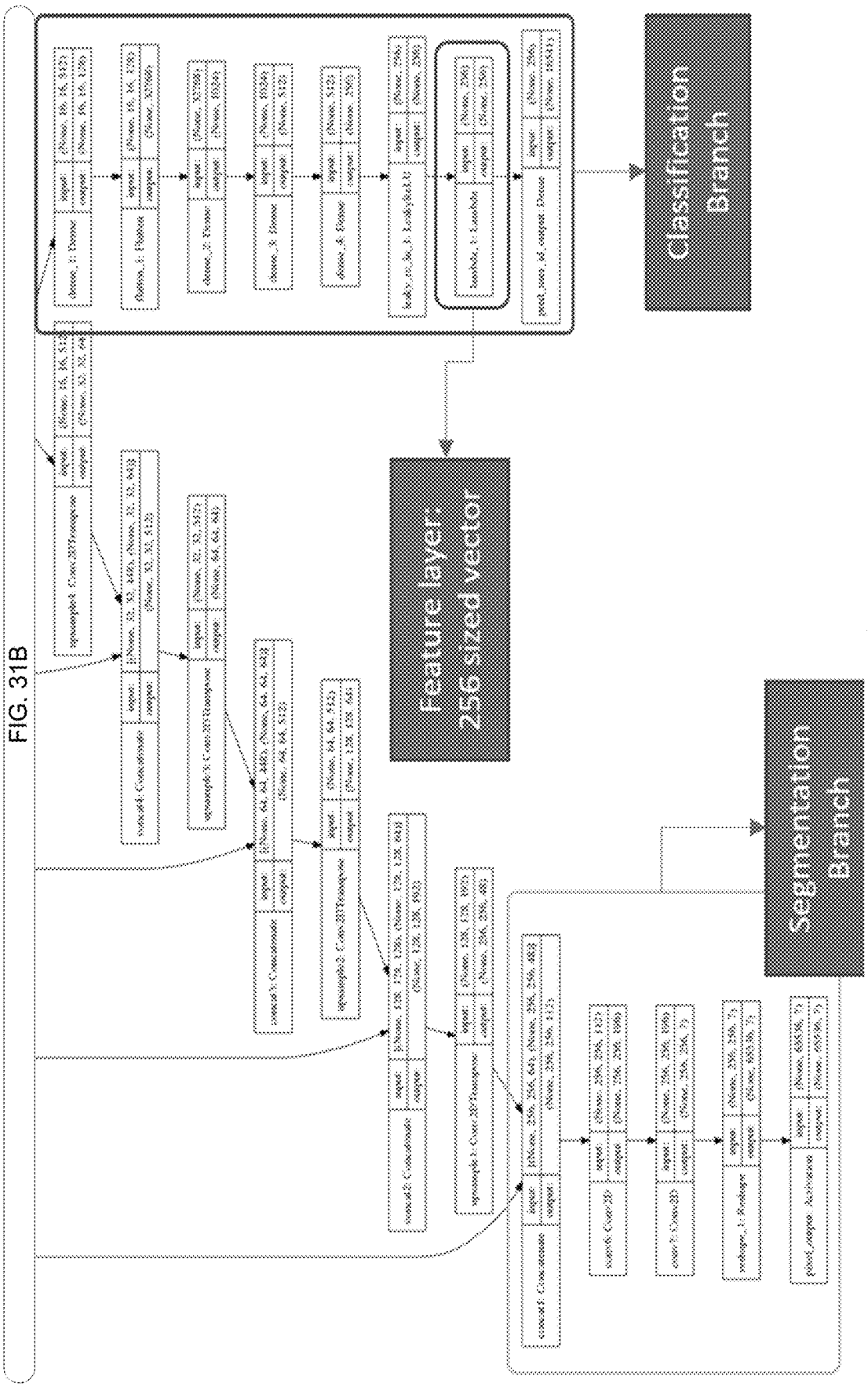

Use Case 1.a - Enrolment (2D + Lip)

Pre-Condition: Mobile Phone

Enrolment:
1. A User opens mobile-app for enrolment
2. The User requests for "Basic Enrolment" and provides required information
3. The Mobile-app takes a 2D picture of the User's face
4. The "Basic Enrolment" requests the User via mobile-app to say the challenge words/phrases
5. The "Basic Enrolment" extracts and tokenizes all the required information
6. The "Basic Enrolment" creates and delivers signed tokens to the PIB Note: This example enrolment is a Convenient, frequent and low barrier to entry such as gym membership, points program, work badge, low value transactions, restricted public space)

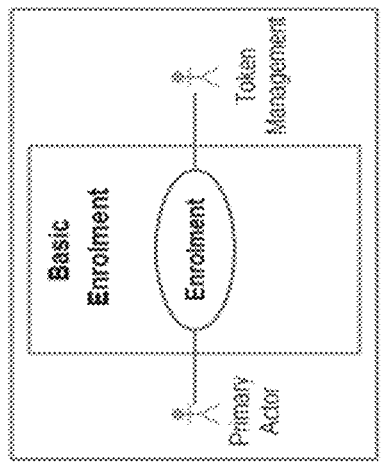

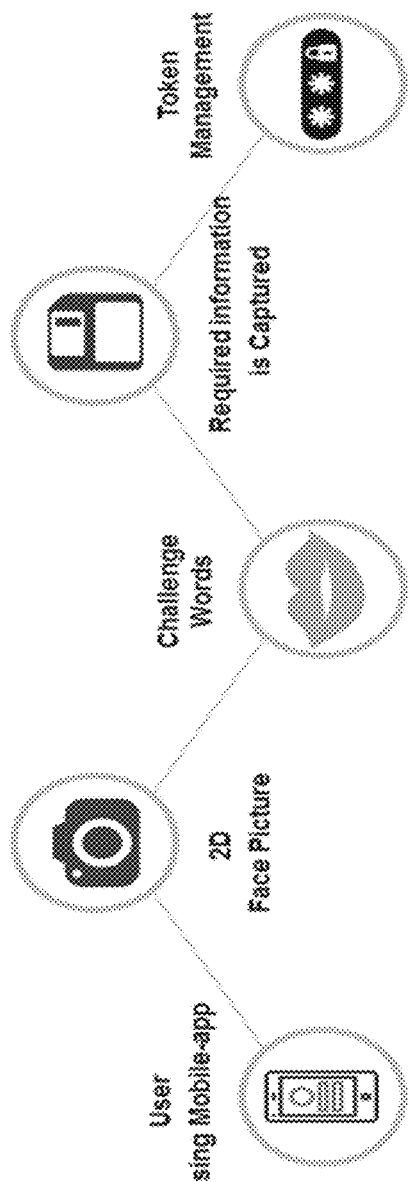

FIG. 34

```
def verifyFace(img1, img2, currd):
    img1_representation = vgg_face_descriptor.predict(preprocess_image(img1))[0,:]
    img2_representation = vgg_face_descriptor.predict(preprocess_image(img2))[0,:]

cosine_similarity = getCosineSimilarity(img1_representation, img2_representation)
    euclidean_distance = getEuclideanDistance(img1_representation, img2_representation)

passxx
    if(current_dataset=="dataset1"):
        name1=img1.rsplit("-",1)[0]
        name2=img2.rsplit("-",1)[0]
    elif(current_dataset=="dataset2"):
        name1=img1.split(".")[0]
        name2=img2.split(".")[0]
    elif(current_dataset=="dataset3"):
        lx=len("croppedx/dataset3/")
        name1="croppedx/dataset3/"+img1[lx:lx+10]
        name2="croppedx/dataset3/"+img2[lx:lx+10]

print(name1,name2)
    print("Cosine similarity: ",cosine_similarity)
    print("Euclidean distance: ",euclidean_distance)
    #print(img1_representation.shape)
    md=np.sum(np.abs(img1_representation-img2_representation))
    print("L1 distance: ",md)
    sr=spearmanr(img1_representation,img2_representation)
    print("Spearman Correlation: ",sr[0])
```

FIG. 56

SYSTEMS AND METHODS FOR SECURE TOKENIZED CREDENTIALS

CROSS REFERENCE

This application is a continuation of U.S. application Ser. No. 16/521,238, entitled "SYSTEMS AND METHODS FOR SECURE TOKENIZED CREDENTIALS", filed 24 Jul. 2019, incorporated herein by reference in its entirety.

application Ser. No. 16/521,238 is a non-provisional of, and claimed all benefit, including priority to:

U.S. Application No. 62/702,635, entitled "SYSTEM AND METHOD FOR FACIAL RECOGNITION", filed on Jul. 24, 2018;

U.S. Application No. 62/751,369, entitled "SYSTEM AND METHOD FOR FACIAL RECOGNITION", filed on Oct. 26, 2018;

U.S. Application No. 62/774,130, entitled "SYSTEM AND METHOD FOR FACIAL IMAGE PROCESSING", filed on Nov. 30, 2018;

U.S. Application No. 62/775,695, entitled "SYSTEMS AND METHODS FOR SECURE TOKENIZED CREDENTIALS", filed on Dec. 5, 2018; and U.S. Application No. 62/839,384, entitled "SYSTEMS AND METHODS FOR SECURE TOKENIZED CREDENTIALS", filed on Apr. 26, 2019.

All of these documents are incorporated herein by reference in their entirety.

FIELD

The present disclosure generally relates to the field of secure authentication tokens, and more specifically, data processing of secure authentication tokens for characteristic validation or access control.

INTRODUCTION

A challenge with authentication of user credentials arises in relation to providing too much information for meeting the validation challenge, or too little information.

Furthermore, traditional approaches at establishing credentials (e.g., showing a driver's license with a photo attached to it, providing business cards) are prone to falsification and fraud. As a high level of trust cannot be associated with traditional approaches, opportunities for usage are limited and additional steps are often required for corroboration prior to trust being provided.

A potential reason for the deficiencies of traditional approaches is a lack of secure mechanisms for validation that are established within the credentials.

For example, a driver's license does not use any form of cryptography or obfuscation, and rather, relies on the difficulty and illegality associated with creating forgeries of official documentation.

A driver's license, however, provides an overabundance of information to the verifier, and in the event of a sophisticated forgery, is difficult for the untrained eye to validate that it is indeed provided from the official issuing organization.

SUMMARY

A technical approach is described herein that is adapted for overcoming some of the challenges associated with technical approaches at establishing credentials. In a first aspect, a computer system is described that is used for authentication using secure tokens. The secure tokens can be adapted for use by computing devices having limited computing resources (e.g., portable devices), such as computer memory, processing capabilities, and computer storage.

The secure tokens are digitally signed tokens that incorporate data sets representing biometric verification credentials. In an embodiment, biometric verification credentials are obtained through data sets that can include image data, depth image data (e.g., 3-D image data), and can be combined with additional data fields that aid in improving a difficulty level of replication (e.g., a passphrase string or a set of phonemes/phoneme transitions). For example, as described in some embodiments, the image data can include a series of frames (e.g., a video), which together provide facial information, such as a facial representation, and the facial representation over a period of time can be used to extract facial (e.g., lip) movements in relation to individual phonemes of a spoken passphrase.

The facial movements can be tracked at phrase level, word level, syllable by syllable level, the phoneme-by-phoneme level (or transitions between phonemes). The greater resolution possible allows for increased accuracy at the cost of processing requirements and storage requirements. Accordingly, as described in various embodiments herein, additional steps of encoding and feature selection are used to aid in reducing overall storage requirements and reducing processing requirements by compressing and reducing dimensionality of the data based on features selected to have a highest ability to distinguish between individuals.

The secure tokens are generated by processors either at the portable computing device or at a computer server. The secure tokens can be stored on the portable computing device for electronic presentment to a third party computing device, such as a verifier device (e.g., a gate entry device controlling access to a building or a computer). Upon authentication, in some embodiments, a computing function can be invoked, for example, a computing process that initiates a financial transaction.

The secure tokens can include digital signatures associated with cryptographic keys of various validating parties. For example, the secure tokens can be processed to determine that the data fields stored thereon are signed by the party associated with a particular public key (e.g., bike share company public key that is accessible on the Internet). The third party computing device can, for example, be configured to compare the signature with the public key after retrieving the public key from an online repository, or in some embodiments, retrieving the public key from local storage (e.g., a bike share kiosk may store the bike share company public key).

The computer processors are configured to extract, for example, using an encoder neural network, the data sets into a data subset that represents a constrained set of features identifying an individual. The extraction allows for an improved compression ratio to reduce an overall storage and/or downstream processing burden. The determination of which features to retain (even in a transformed state) can be conducted by a specially configured and trained encoder neural network. The constrained set of features identifying an individual can be established to include a minimal set of elements based on the features selected by the encoder neural network. The image data (binary) can be converted in a numerical array, as encodings, which are further used in the ML model training and prediction workflows.

The image sets can include depth values, and the speech motions of the individual can be extracted from the one or more image data sets based a feature set including at least on at least one of: lateral and medial position coordinates of both eyes, lateral-position coordinates of lips, a forehead curvature, distances between an ear and the eyes, or a height of nose. For face recognition, the person's face can be cropped from the original image. A neural network model, in some embodiments (e.g., MTCNN) extracts 'left_eye', 'right_eye', 'nose', 'mouth_left', 'mouth_right' areas. The lips area can be defined as a rectangle which contains both the upper and bottom lips of a person. For lip reading embodiments, the most relevant area for analysis, in some embodiments, is the lips area, which is extracted from the video stream, in series of 30 static frames.

The data subset is then transformed (e.g., irreversibly through the use of hashing) such that the constrained set of features are combined with various cryptographic keys to generate the digitally signed token. The digitally signed token can be adapted for verifying that such information stored thereon is signed by one or more signatory computing devices (e.g., certificate authorities).

In some embodiments, the digitally signed token stores thereon a model data architecture trained based on speech motions of the individual speaking one or more passphrases.

The model data architecture is adapted to iteratively update, through modifying weight values associated with computing nodes, transfer functions configured to minimize a loss function related to a false positive by using the speech motions of the individual as positive training examples and using reference speech motions of other individuals as negative training examples, the one or more trained transfer functions used to process the validate the challenge response data set.

The speech motions of the individual can be added to a reference speech motion data storage for use as reference speech motions during generation of digitally signed tokens for other individuals.

The third party computing device processes the digitally signed token upon receiving a challenge response data set representative of response images asserted as the individual speaking the passphrase. The third party computing device validates the challenge response data set by validating against the facial representation and the model data architecture to establish that the passphrase satisfies an output the model data architecture at an acceptable confidence threshold value (e.g., a pre-defined value).

The passphrase can include multiple phonemes; and the model data architecture can, in some variant embodiments, include separate transfer functions, each corresponding to a separate phoneme of the passphrase, and each of the separate transfer functions generates intermediate outputs which are combined together to establish the output of the model data architecture. The speech motions of the individual can be added to a reference speech motion data storage for use as reference speech motions during generation of digitally signed tokens for other individuals.

The constrained set of features can be represented as a floating point latent vector extracted from raw image data, and the floating point vector generated from an encoder neural network can be adapted to learn a compression of the raw image data into the floating point latent vector defined by the feature set representing speech motions of the individual. In some embodiments, the encoder neural network is a trained 2D CNN adapted to generate pixel segments on at least one of eyes, nose, and lip corners, trained to recognize people to output the floating point latent vector, and the digitally signed token can further include a plurality of floating point latent vectors, each of the floating point latent vectors trained based on a different mix of feature sets representing speech motions of the individual.

In some embodiments, a different constrained set of features can be used for each phoneme or phoneme transition, and one or more encoders may be utilized to generate these different constrained set of features (e.g., an encoder assigned to each phoneme or each phoneme transition).

Systems, devices, methods, and computer readable media are provided in various embodiments having regard to authentication using secure tokens, in accordance with various embodiments. The authentication utilizes multiple technologies to implement an improved authentication process where an individual's personal information is encapsulated into transformed digitally signed tokens, which can then be stored in a secure data storage (e.g., a "personal information bank").

The digitally signed tokens can include blended characteristics of the individual (e.g., 2D/3D facial representation, speech patterns) that are combined with digital signatures obtained from cryptographic keys (e.g., private keys) associated with corroborating trusted entities (e.g., a government, a bank) or organizations of which the individual purports to be a member of (e.g., a dog-walking service).

The digital signatures, for example, can then be used for validation against public keys associated with the corroborating trusted entities or the organizations of which the individual purports to be a member of.

The secure data storage storing the digitally signed tokens can, for example, be resident or coupled with a mobile computing device of the individual, such that when one or more data sets representing one or more biometric verification credentials are received, the data subset representing a constrained set of features identifying an individual can be extracted.

The constrained set of features can be used for a one-way transformation in combination with one or more cryptographic keys to generate a digitally signed token, stored the digitally signed token in a data storage resident on the mobile computing device (e.g., a secure enclave or accessible only through a set of secure processing components and/or pathways).

The digitally signed token, when processed by a third party computing device, indicates that one or more characteristics of the individual are verified in accordance with one or more parties associated with each cryptographic key of the one or more cryptographic keys, and in some embodiments, the digitally signed token can be compared against captured information by the third party computing device to assess veracity as between the captured information and the digitally signed token. The comparison and provisioning of the digitally signed token may be using the U-Prove mechanism, in some embodiments.

For example, a facial recognition scanner can be provided in the context of a bike-sharing or a smart door lock, which takes a picture or a 3D representation of a face of the individual. This picture or the 3D representation is converted into a feature representation. The individual then utilizes the mobile device to adduce the digitally signed token as a "deposit token", which is then received in relation to a challenge request mapping the picture or a 3D representation of a face of the individual against the available characteristics of the digitally signed token. If the device is satisfied that the captured picture or a 3D representation of a face of the individual is corroborated by the available characteristics of the digitally signed token, the device may then provision access (e.g., unlock a bicycle or unlock a door).

In further embodiments, a new token may be generated that tracks when an access was provisioned, and in response to a signal indicating an event at a future time (e.g., when bicycle was returned or a dog was returned), the new token may be used to process a financial transaction in relation to the event (e.g., pay for the bike rental for a duration of time, or pay the individual for walking the dog and returning the dog).

In another aspect, the one or more biometric verification credentials includes at least of facial recognition credentials and speech credentials.

In another aspect, the one or more cryptographic keys includes one of a public-private key pair associated with the mobile computing device, the private key stored on a secure enclave data storage residing in or coupled with the mobile computing device.

In another aspect, the digitally signed token, when processed by the third party computing device, provides elements of information including a representation of the individual's facial features or a date of birth.

In another aspect, irreversibly transforming the constrained set of features in combination with one or more cryptographic keys to generate the digitally signed token includes at least one cryptographic key provided by a verifier institution computing device following physical verification of one or more proofs of identity at a physical location associated with a verifier institution.

In another aspect, the method includes receiving, from a terminal, a vector data set representative of an authentication credential associated with the individual; determining whether the vector data set corresponds with the digitally signed token; and controlling, the terminal to actuate one or more physical access control devices.

In another aspect, the vector data set is a facial authentication vector.

In another aspect, the one or more physical access control devices includes a vehicular lock.

In another aspect, the one or more physical access control devices includes a door lock; the one or more cryptographic keys includes at least a cryptographic key includes a service provider key such that the digitally signed token is signed at least using the service provider key; and the determining of whether the vector data set corresponds with the digitally signed token includes an additional determination that the individual is authorized by the service provider.

In another aspect, the method includes responsive to detection of a service termination event, processing a financial transaction by the mobile computing device.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 7 is an example flow chart representing a process performed by the facial recognition system, according to some embodiments.

FIG. 11 shows that 2D facial recognition cannot distinguish similar faces.

FIG. 12 shows example capabilities of a facial recognition system, according to some embodiments.

FIG. 21 shows an example neutral network algorithm implemented as part of a facial recognition system, according to some embodiments.

FIG. 27 shows an example process for registration using a user's mobile phone for facial image processing, according to some embodiments.

FIG. 28 shows an example process for verification at a Point-of-Sale (POS), according to some embodiments.

FIGS. 31A, 31B and 31C show another example neural network model used for segmentation and classification of facial images, according to some embodiments.

FIG. 34 is an example method diagram of an enrollment example, according to some embodiments.

FIG. 39 is a screenshot showing a screen of available data elements that can be stored on a user's portable device.

FIG. 40 is a screenshot showing a screen indicating various credential requestor parties.

FIG. 41 is a screenshot of a quick response (QR code) that can be used for interacting with a computing device of the credential requestor parties.

FIG. 42 is a screenshot of a requestor page indicating the type of information being requested.

FIG. 43 is a screenshot of a requestor page indicating the type of information being requested, showing a toggle bar widget element being selected.

FIG. 44 is a screenshot of a page indicating that a requestor was able to validate information from the individual.

FIG. 45 is a screenshot of a page indicating that a requestor was able to validate information from the individual.

FIG. 46 is a screenshot of a page showing another request.

FIG. 47 is a screenshot of a page showing an alternate request.

FIG. 48 is a screenshot of a page showing an alternate request.

FIG. 49 is a screenshot of a page showing a widget for accepting or declining a request.

FIG. 50 is a screenshot of a page showing another request.

FIG. 51 is a screenshot of a page showing a request, that can be used, for example, to obtain a discount at the coffee shop.

FIG. 52 is a screenshot showing sources of issuer identities.

FIG. 53 is a screenshot showing a summary page of details.

FIG. 54 is a screenshot showing a page having requestors and visual elements relating to specific types of information available.

FIG. 56 is an example pseudocode for facial recognition, according to some embodiments.

DETAILED DESCRIPTION

Embodiments of methods, systems, and apparatus are described through reference to the drawings.

Disclosed herein includes a system configured to identify a user through facial recognition. For example, the system may be configured to leverage depth analysis and lip motion to verify a user's identity.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing implementation of the various example embodiments described herein.

A technical approach is described herein that is adapted for overcoming some of the challenges associated with technical approaches at establishing credentials.

Figure 1:
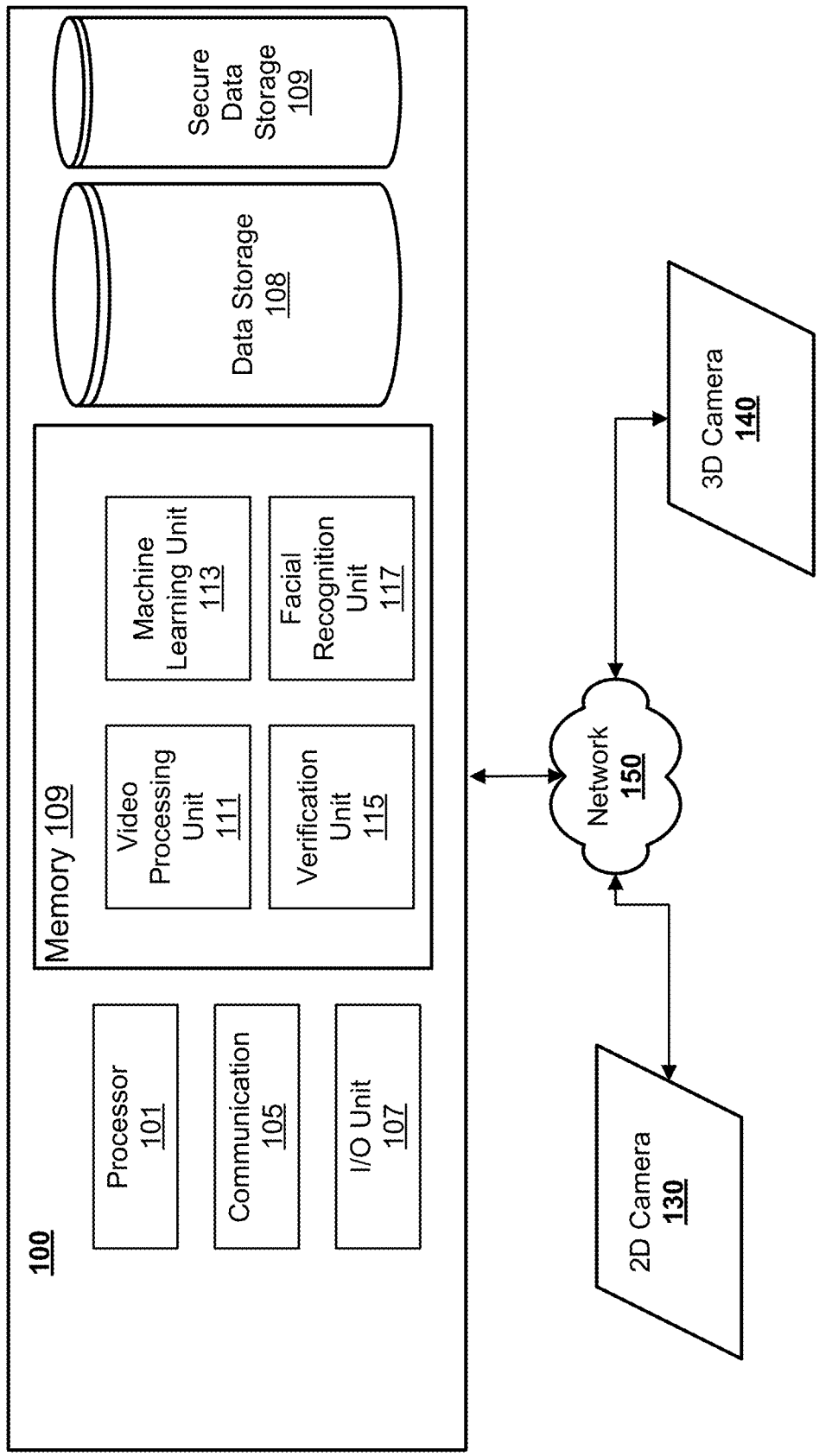
FIG. 1 shows an example facial recognition system, in accordance with one embodiment.

FIG. 1 is a schematic block diagram of a physical environment for a system 100 for facial recognition.

The computer system 100 is used for authentication using secure tokens. System 100 may be software (e.g., code segments compiled into machine code), hardware, embedded firmware, or a combination of software and hardware, according to various embodiments.

The secure tokens can be adapted for use by computing devices having limited computing resources (e.g., portable devices), such as computer memory, processing capabilities, and computer storage, which are then used to validate responses to challenges by third party devices to validate or verify one or more characteristics of the individual attesting to the challenge.

The secure tokens are digitally signed tokens that incorporate data sets representing biometric verification credentials.

In an embodiment, biometric verification credentials are obtained through data sets that can include image data, depth image data (e.g., 3-D image data), and can be combined with additional data fields that aid in improving a difficulty level of replication (e.g., a passphrase string or a set of phonemes/phoneme transitions).

System 100 is configured to receive one or more data sets representative of one or more images or videos of a user, as taken by a 2D camera 130 and a 3D camera 140 through network 150. A 3D camera 140 may be configured to record images or videos with a depth component.

In some embodiments, a pixel in a 2D image may be represented as a data set containing three values, respectively, red, green and blue (RGB). In some embodiments, a pixel in a 3D image may be represented as a data set containing RGB values, and further containing a value representing a depth component.

A depth component may, in some embodiments, refer to information regarding a depth of a pixel, for one or more pixels of an image, and for some or all images of a video. In some embodiments, a depth component may also be a value representing a distance of the points on the object being filed or photographed from the camera aperture.

The image data can include a series of frames (e.g., a video), which together provide facial information, such as a facial representation, and the facial representation over a period of time can be used to extract facial (e.g., lip) movements in relation to individual phonemes of a spoken passphrase.

A processor or processing device 101 can execute instructions in memory 109 to configure various components or units 111, 113, 115, 117. A processing device 101 can be, for example, microprocessors or microcontrollers, a digital signal processing (DSP) processor, an integrated circuit, a field programmable gate array (FPGA), a reconfigurable processor, or combinations thereof.

Each communication interface 105 enables the system 100 to communicate with other components, exchange data with other components, access and connect to network resources, serve applications, and perform other computing applications by connecting to a network (or multiple networks) capable of carrying data.

Each I/O unit 107 enables the system 100 to interconnect with one or more input devices, such as a keyboard, mouse, camera, touch screen and a microphone, or with one or more output devices such as a display screen and a speaker.

Data storage 108 can be, for example, one or more NAND flash memory modules of suitable capacity, or may be one or more persistent computer storage devices, such as a hard disk drive, a solid-state drive, and the like. In some embodiments, data storage 108 comprises a secure data warehouse configured to host user profile data.

Data storage 108 can store, for example, reference databases of other facial frames for usage in encoder neural network (e.g., variational auto-encoder) selection of features for compression or supervised/unsupervised training, model data architecture parameters, weights, and filters (e.g., together representing various transfer functions), secure tokens, and user profile information for example.

The secure tokens can be digitally signed tokens that incorporate data sets representing biometric verification credentials.

As described herein, biometric verification credentials are obtained through data sets that can include image data, depth image data (e.g., 3-D image data), and can be combined with additional data fields that aid in improving a difficulty level of replication (e.g., a passphrase string or a set of phonemes/phoneme transitions).

For example, as described in some embodiments, the image data can include a series of frames (e.g., a video), which together provide facial information, such as a facial representation, and the facial representation over a period of time can be used to extract facial (e.g., lip) movements in relation to individual phonemes of a spoken passphrase.

Memory 109 may include a suitable combination of computer memory.

A video processing unit 111 may be configured to record and process raw videos taken by 2D camera 130 or 3D camera 140.

A machine-learning unit 113 may be configured to process one or more data sets representative of one or more images or videos for training one or more models for generating predictions regarding new images or videos.

In some embodiments, the machine-learning unit 113 may be configured to process images or videos of a user speaking a specific word and to derive models representing a user's lip movements when speaking the specific word. In some embodiments, unit 113 may be a deep learning unit.

There may be two machine learning units—a first unit adapted for extracting, for example, using an encoder neural network, the data sets into a data subset that represents a constrained set of features identifying an individual.

The extraction allows for an improved compression ratio to reduce an overall storage and/or downstream processing burden. The determination of which features to retain (even in a transformed state) can be conducted by a specially configured and trained encoder neural network.

A constrained set of features can be represented as a floating point latent vector extracted from raw image data, and the floating point vector generated from an encoder neural network can be adapted to learn a compression of the raw image data into the floating point latent vector defined by the feature set representing speech motions of the individual.

In some embodiments, the encoder neural network is a trained 2D CNN adapted to generate pixel segments on at least one of eyes, nose, and lip corners, trained to recognize people to output the floating point latent vector, and the digitally signed token can further include a plurality of floating point latent vectors, each of the floating point latent vectors trained based on a different mix of feature sets representing speech motions of the individual.

A different constrained set of features can be used for each phoneme or phoneme transition, and one or more encoders may be utilized to generate these different constrained set of features (e.g., an encoder assigned to each phoneme or each phoneme transition). This approach requires more memory usage, but also improves accuracy and resolution as not all the same features for each phoneme or phoneme transition are contributors to a classification or distinction as between individual people.

For example, certain phonemes utilize more of the lips, while others are based on movements of the throat or include nasal movements. Accordingly, for those phonemes, nasal movements or throat should be emphasized in by the encoder neural network for compression as they provide improved resolution as distinguishing between different people.

The constrained set of features identifying an individual can be established to include a minimal set of elements based on the features selected by the encoder neural network.

The image data (binary) can be converted in a numerical array, as encodings, which are further used in the ML model training and prediction workflows.

A second machine learning unit may be utilized for supervised or unsupervised training of a machine learning model whose parameters and/or representations of one or more transfer functions (e.g., activation function/policy function) are stored directly into the secure token as one or more fields of a data structure.

The specific word could be a passphrase that can be stored on the secure tokens, and in some embodiments, a secure token can have multiple valid passphrases (e.g., "spider", "cow", "pig"). For example, there may be a set of personal verification phrases (e.g., as an extension from personal verification questions).

The facial/recognition model architecture can be established with different levels of granularity, according to various embodiments. For example, transfer functions can be established at the phrase level (e.g., "the fox jumps over the river"), the word string level ("fox"), the syllable level ("ri", "ver"), the phoneme level ("'r", "i", "v", "ə", "r"), or the phoneme transition level (e.g., "'r'/'i'", "'i'/'v'", "'v'/'ə'", "'ə'/'r'"), and combinations thereof.

For example, the facial/recognition model architecture, can receive a series of frame corresponding to a video of an individual, Bob, speaking five passphrases. In this example, they are all animals but other words can be used (e.g., "spider", "cow", "pig", "turtle", "kingfisher").

Each of these passphrases can be broken at different levels: sp·ider, 'spĭdə r, and transitions thereof in between. In an example embodiment, transfer functions are established for at the corresponding level of granularity of tokenization. T(spider), T(spi), T(der); or T('s), T(p), T(ĭ), T(d), T(ə), T(r); or T('s/p), T('p/ĭ), T(ĭ/d), T(d/ə ), T(ə /r).

Each transfer function can be represented as a policy function having, various parameters, such as weightings, filters, etc., which in concert represent an activation function for the specific neural networking function. The transfer functions can be considered intermediate steps that are used together to arrive at an overall confidence level.

Each transfer function can include various parameters. For example: $T(tt)=Ax+By+C$, $T(\theta)=Dx+Ey+F$. A, B, C, D, E, F are constants whose values are refined over time through training to distinguish between individuals—and to arrive at a confidence value in respect of a classification of a new, unverified person against what is represented in the neural network. Accordingly, the secure token itself can store the parameters (or in some cases, the neural network itself) after it has been trained for the individual, and thus the values stored thereon can be processed by the third party verifying device to compare against the information adduced at the time of the response challenge (e.g., say one of the passphrases, and Eve tries to say "spider", but has a different facial technique and is rejected).

The image sets can include depth values, and the speech motions of the individual can be extracted from the one or more image data sets based a feature set including at least on at least one of: lateral and medial position coordinates of both eyes, lateral-position coordinates of lips, a forehead curvature, distances between an ear and the eyes, or a height of nose.

These are extracted based on sections of the passphrase being provided, and in some embodiments, multiple passphrases may share some common phonemes, syllables, and phoneme transitions, which can be used to reinforce and/or cross-train various transfer functions (if a phoneme by phoneme or phoneme transition approach is being utilized, in accordance with some embodiments).

For face recognition, the person's face can be cropped from the original image. A neural network model, in some embodiments (e.g., MTCNN) extracts 'left_eye', 'right_eye', 'nose', 'mouth_left', 'mouth_right' areas. The lips area can be defined as a rectangle which contains both the upper and bottom lips of a person. For lip reading embodiments, the most relevant area for analysis, in some embodiments, is the lips area, which is extracted from the video stream, in series of 30 static frames.

The data subset is then transformed (e.g., irreversibly through the use of hashing) such that the constrained set of features are combined with various cryptographic keys to generate the digitally signed token.

The digitally signed token can be adapted for verifying that such information stored thereon is signed by one or more signatory computing devices (e.g., certificate authorities).

In some embodiments, the digitally signed token stores thereon a model data architecture trained based on speech motions of the individual speaking one or more passphrases.

The model data architecture is adapted to iteratively update, through modifying weight values associated with computing nodes, transfer functions configured to minimize a loss function related to a false positive by using the speech motions of the individual as positive training examples and using reference speech motions of other individuals as negative training examples, the one or more trained transfer functions used to process the validate the challenge response data set.

The speech motions of the individual can be added to a reference speech motion data storage for use as reference speech motions during generation of digitally signed tokens for other individuals.

A verification unit 115 may be configured to receive processed images and videos from video processing unit 111 and verify a user's identity based on a user profile stored in data storage 108.

The verification unit 115 processes the digitally signed token upon receiving a challenge response data set representative of response images asserted as the individual speaking the passphrase. In some embodiments, a facial recognition unit 117 may be used by verification unit 115 to locate and recognize a user's face in an image or video.

The verification unit 115 validates the challenge response data set by validating against the facial representation and the model data architecture to establish that the passphrase satisfies an output the model data architecture at an acceptable confidence threshold value (e.g., a pre-defined value).

The passphrase can include multiple phonemes; and the model data architecture can, in some variant embodiments, include separate transfer functions, each corresponding to a separate phoneme of the passphrase, and each of the separate transfer functions generates intermediate outputs which are combined together to establish the output of the model data architecture.

The speech motions of the individual can be added to a reference speech motion data storage for use as reference speech motions during generation of digitally signed tokens for other individuals.

The facial movements can be tracked at the phoneme-by-phoneme level (or transitions between phonemes).

The secure tokens are generated by processors either at the portable computing device or at a computer server.

The secure tokens can be stored on the portable computing device for electronic presentment to a third party computing device, such as a verifier device (e.g., a gate entry device controlling access to a building or a computer). Upon authentication, in some embodiments, a computing function can be invoked, for example, a computing process that initiates a financial transaction.

A verification unit 115 may in some embodiments be configured to detect if a person present in the image or video at the time of image or video capturing is an actual person, or a fake person. For example, the facial recognition unit 117 may check for an image or video quality based on captured data using one or more algorithms.

In some embodiments, verification unit 115 may retrieve stored data from a corresponding user profile, and use the stored data to determine if a person presented in an image or video has the same identity associated with the corresponding user profile. The stored data may relate to one or more biometric features of the user associated with the corresponding user profile. The one or more biometric features may include, for example, a user's facial movement such as lip movements. In some example, the stored data may relate to the user's lip movements when the user speaks a specific word or phrase.

The one or more biometric features may include, for another example, a depth component of a user's face. The depth component may be represented by a value indicating a depth of a pixel, for one or more pixels representing the user's face recognized in an image or video. The depth component may be captured by a 3D camera 140.

The secure tokens can include digital signatures associated with cryptographic keys of various validating parties that are processed by verification unit 115.

For example, the secure tokens can be processed by the verification unit 115 to determine that the data fields stored thereon are signed by the party associated with a particular public key (e.g., bike share company public key that is accessible on the Internet). The verification unit 115 (e.g., a third party computing device) can, for example, be configured to compare the signature with the public key after retrieving the public key from an online repository, or in some embodiments, retrieving the public key from local storage (e.g., a bike share kiosk may store the bike share company public key).

In some embodiments, system 100 may include an API unit (not illustrated) configured for providing or facilitating an interface, such as a user interface, to connect to external databases and systems. The interface may allow one or more administrators and users to configure the settings of system 100, such as for example, the quality of an image or video, e.g., at 1080p or 2064p.

Figure 26:
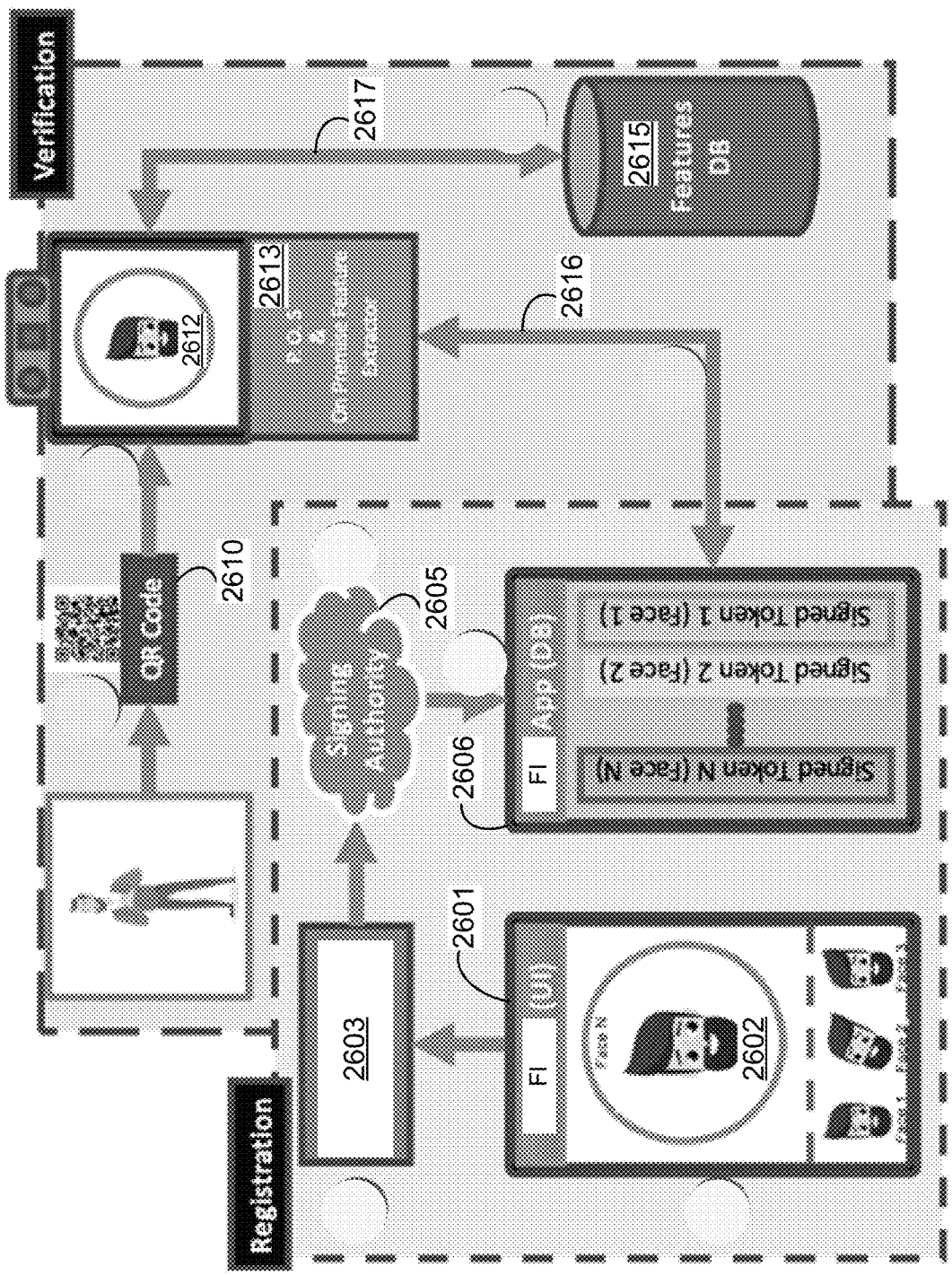
FIG. 26 shows an example block diagram representing a system architecture for registration and verification process using facial image processing, according to some embodiments.

Referring now to FIG. 26, which shows an example block diagram representing a system architecture for registration and verification process using facial image processing. A portable electronic device 2601, such as a mobile device or a laptop, may have a camera 2602, which may take a picture or a video of a person. A neural network model 2603, implemented by a processor on the mobile device, may receive the one or more images or videos, and process them, for example in accordance with a process illustrated in FIG. 27, to generate one or more signed tokens signed by a signing authority 2605. The one or more signed tokens may be stored in a database 2606 on the mobile device 2601.

During verification process, which is further disclosed herein in association with FIG. 28, a user may scan a QR code or a bar code 2610 using his mobile device 2601, to associate his phone with a POS. The POS 2613 may have a camera 2612 to take image or video of the user. The POS 2613 may contain a model similar to the model 2603 stored on user's mobile device, to process the image or video, to generate one or more tokens, which can be sent via a network connection 2616 to either the database 2606 on user's mobile device, if the mobile device is available, to authenticate the user. If the user's mobile device is not available, the POS 2613 can send the token via a network connection 2617 to a remote features database 2615 to authenticate the user.

The neutral network model 2603 may in some embodiments output a 256 bit floating point latent vector. The model 2603 may learn to represent facial features namely—eyes, nose, mouth in a lower dimension. For example, it may be a machine learning based system that looks at a picture, or a frame of a video, processes it to determine that the picture contains a face, and identify the facial features. Training of the model may require a lot of data. The training process teaches the model 2603 to generate a meaningful vector, which may be a 256 floating point numbers, that reduce a higher dimension (e.g. 256×256×3) image to a lower dimension (256).

In some embodiments, the neutral network model 2603 may include a first neural network model, which may be a Multi-Task Convolution Neural Net (MTCNN), this model can detect the human faces in an image, even if the image is blurred. The model can determine the location (x, y coordinates) of the pixels if various facial features such as eyes, lips, nose and ears. This data output may augment the entire face analysis and is added to a second neural network.

The MTCNN can include a model data architecture for face detection, implemented, for example, in TensorFlown™. The detector can return a list of JSON objects, where each object contains three main keys: 'box', 'confidence' and 'keypoints': bounding box is formatted as [x, y, width, height] under the key 'box'; confidence is the probability for a bounding box to be matching a face; and keypoints can be formatted into a JSON object with the keys 'left_eye', 'right_eye', 'nose', 'mouth_left', 'mouth_right'. Each keypoint is identified by a pixel position (x, y).

A convolutional neural network (e.g., VGG-19) can be used that is pre-trained on more than a million images from the ImageNet database. The example network VGG-19 is 19 layers deep and can classify images into 1000 object categories. Data sets can be obtained, for example, using available data sets, such as labelled faces in the wild (13,000 images from 1680 people, JAFF with emotions, and Lip-FaceID for faces with different pose variations).

The approach can include: preprocessing images from the public data sets, by cropping the face area from the image; invoking MTCNN to detect the face from an image; and using VGG 19 model to get feature representation from an image.

After faces are detected, each image is compared with all other images in the data set, determining similarity matching between faces by using Euclidian and cosine distances, or optionally L1 distance, Spearman correlation.

GPU processors can be used to provide parallel processing for all datasets tested. Model metrics can be determined as follows: true positive, true negative, false positive, false negative, precision, recall, Matthews Correlation Coefficient, F1, F2, F0.5 scores.

Figure 55:
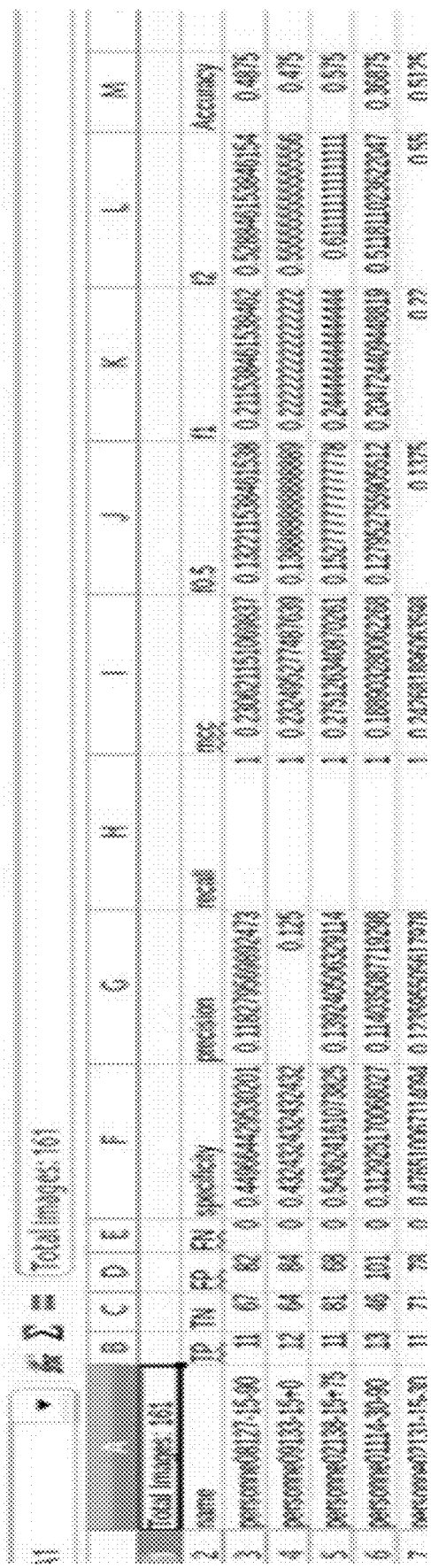
FIG. 55 is a screenshot showing a chart of example features and associated weights, according to some embodiments.

In Applicants' testing, the accuracy was approximately 80% for a test set of images. FIG. 55 includes a chart screenshot showing a sample analysis of a set of images, according to some embodiments. A code snapshot is provided at FIG. 56. Alternate, different code is possible and FIG. 56 is provided as a example.

Model 2603 may include a second neural network. The second neural network may be, for example, a trained 2D CNN (e.g. SA-SC) to generate pixel segments on eyes, nose, and lip corners. That is, knowledge in the form of data output from the first neural network (e.g. MTCNN) may be fed into a second neural network SA-SC. Also, the 2D CNN may be trained in parallel to recognize people. The second model may output a 256-bit vector.

The model may process one or more, likely a plurality of dimensions (e.g. distances) in a human face contained in the image. The model may select a number of distances (e.g. 256) to figure out how to compute and generate a vector. The model 2603 may be trained to look at the picture, and decide what are the eyes and nose, and generate distance between the eyes and nose. The model 2603 may then compute all the distances to generate the vector (token). Lighting and other factors may affect the vector. The model may create several vectors describing the face. That is, a face may have several different vectors and tokens.

In some embodiments, the model 2603 may have a size suitable for storing on a mobile device. For example, it may have a size of 80 MB.

Figure 29A:
FIG. 29A shows example pictures containing human faces used to train a neural network model, according to some embodiments.

FIG. 29A shows example pictures containing human faces used to train a neural network model, either be the first neural network model or the second neural network model. Training deep learning models to learn to extract meaningful features from 2D and 3D facial images can be done using MegaFaces. The number of unique users may be for example 16,540 and the number of data points maybe for example 694,771.

Figure 29B:
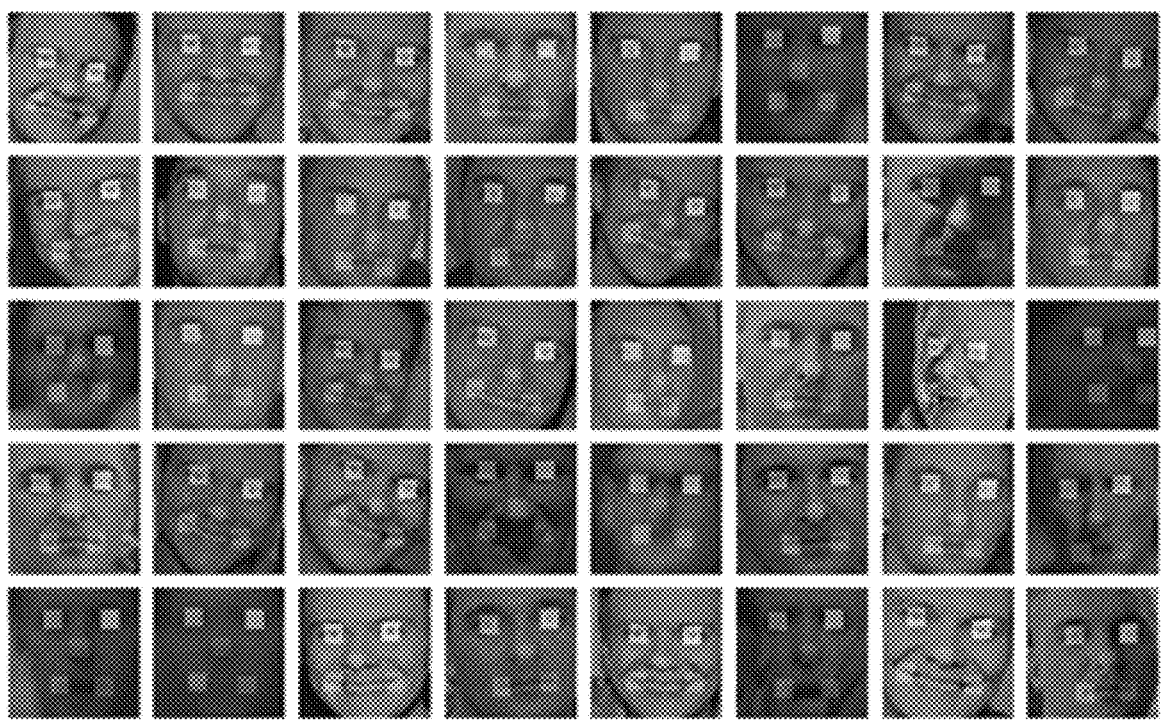
FIG. 29B shows example segmentation results from the neural network model in FIG. 29A. according to some embodiments.

FIG. 29B shows example segmentation results from the neural network model in FIG. 29A. The 5 colors are in the images used as the target. For visualization purpose the mask is superimposed on the actual face images. The x, y coordinates of the facial features in the mask is provided by a first neural network model MTCNN.

Figure 30:
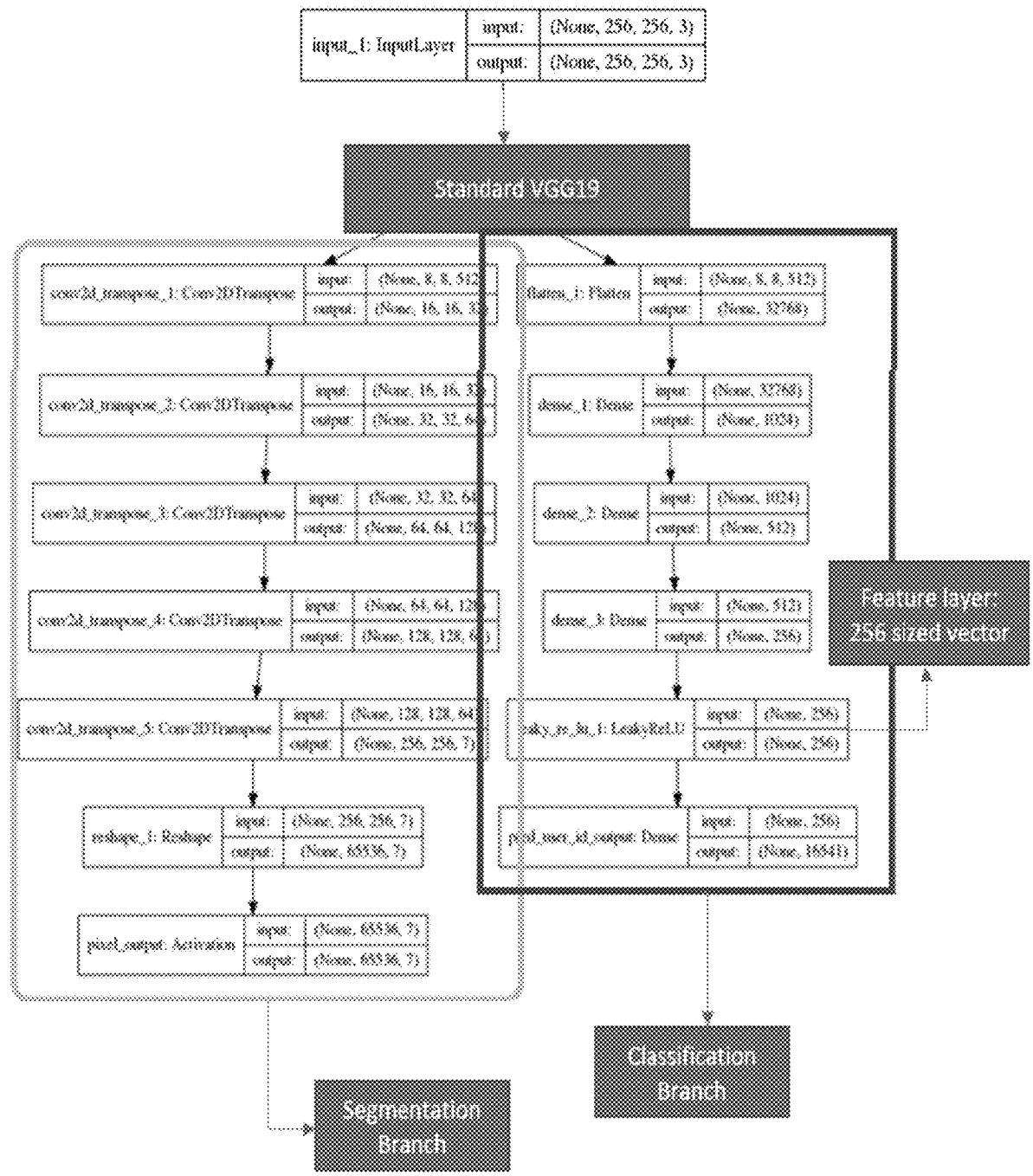
FIG. 30 shows an example neural network model used for segmentation and classification of facial images, according to some embodiments.

FIG. 30 shows an example neural network model used for segmentation and classification of facial images. For example, this may be a VGG19 based segmentation and classification (VGG-SC) model. As illustrated, the input may be a 256×256×3 image, and the output may be a 256-bit vector (feature layer) during the classification branch, which may be a token available for signing.

Figure 31A:
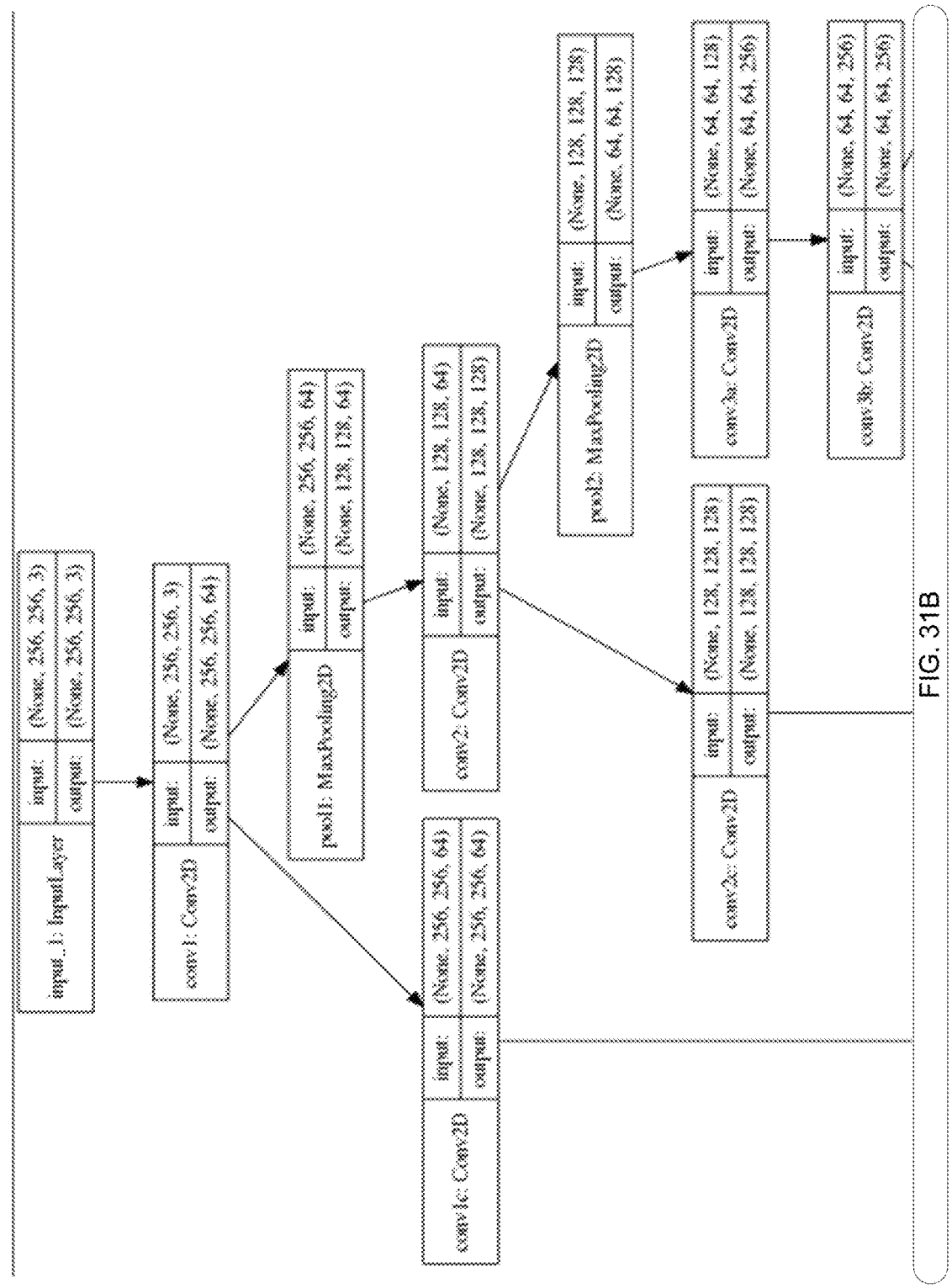

FIGS. 31A, 31B and 31C show another example neural network model used for segmentation and classification of facial images. For example, this may be Skip auto encoder based segmentation and classification (SA-SC) model.

Figure 32:
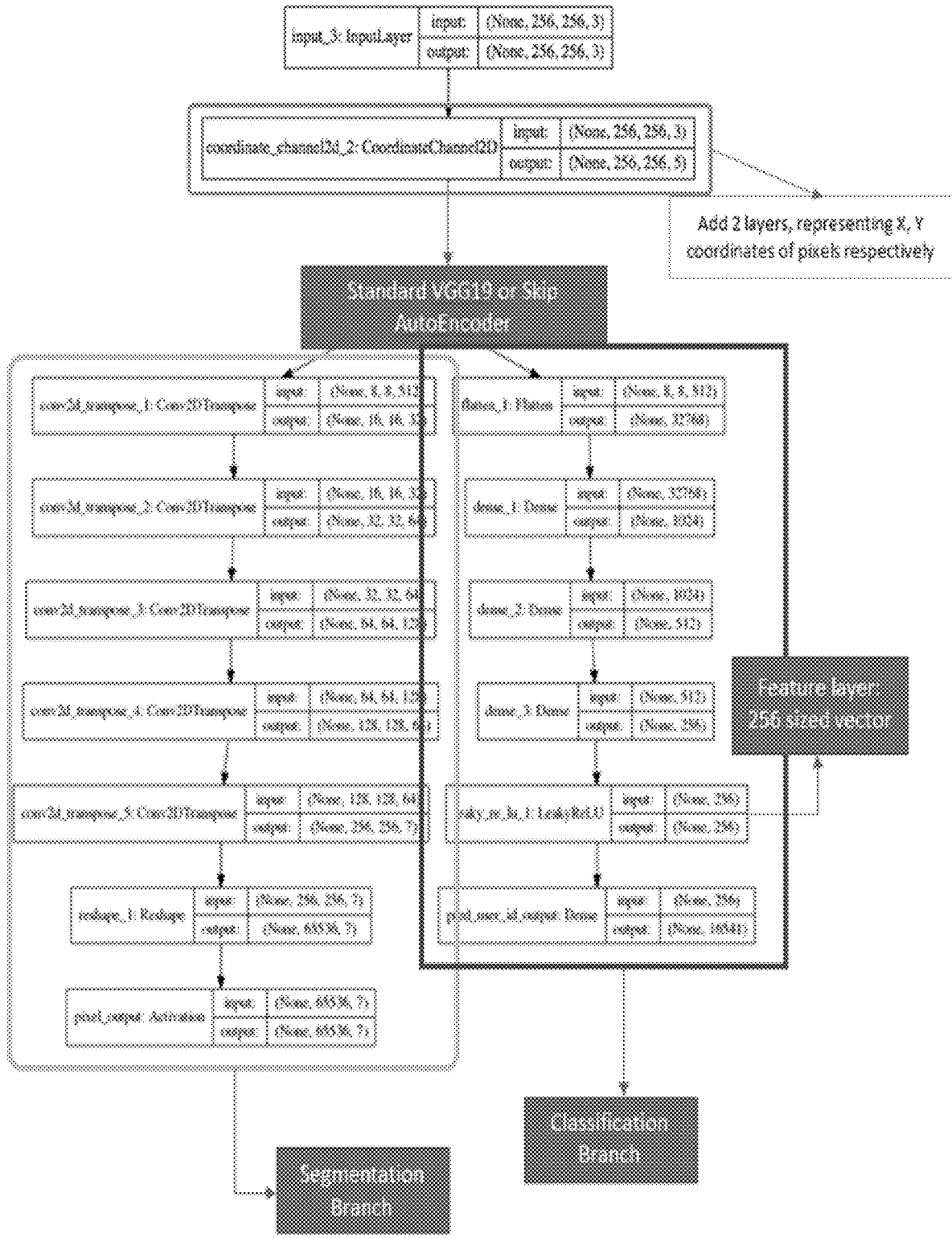
FIG. 32 shows yet another example neural network model used for segmentation and classification of facial images, according to some embodiments.

FIG. 32 shows yet another example neural network model used for segmentation and classification of facial images. For example, this may be a VGG-SC and SA-SC model with additional input of coordinate map. The initial input may be an image of size 256×256×3. Once the segmentation branch has generated x,y location coordinates of various face features (e.g. eyes, nose, lips, ears and so on), the coordinates may be fed into the standard VGG19 or Skip Autoencoder model as a second input, which can be used to, during the classification branch, generate the 256-bit vector, also referred to as a feature token or simply a token. This token may be sent for signing to a signing authority.

Segmentation branch reduces the categorical cross entropy loss (Ls) while converting data points from RGB domain to one-hot pixel domain. Classification branch reduces the SoftMax loss (Lc) while learning features to recognize faces. So a total loss (L)=Ls+Lc. The model may focus on letting the model learn more from important facial features and enhance the distance of distribution between various persons.

Figure 33:
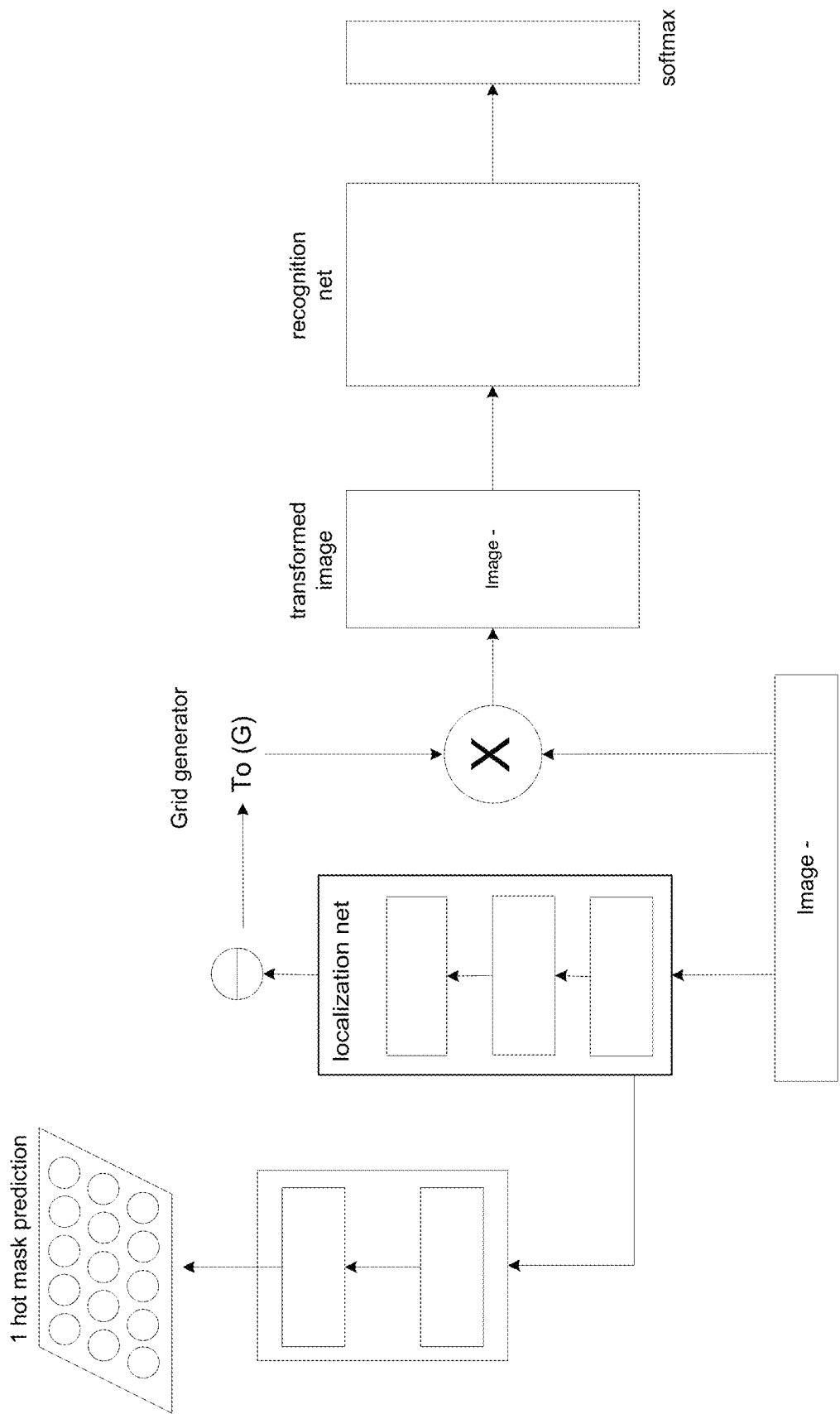
FIG. 33 shows a system block diagram of an example spatial transformer network (STN) to align faces, according to some embodiments.

FIG. 33 shows a system block diagram of an example spatial transformer network (STN) to align faces, which may get more robust features.

In some embodiments, depth domain may be added to train the network 2603 and train a 3D convolution network.

In some embodiments, a computer-implemented method 2700, show in FIG. 27, for facial image processing is disclosed herein. The method may be performed, at least in part, by a processor in a mobile device 2601. The method may include: at 2701, receiving, by a first neural network, one or more images or videos containing a face of a user. The images or videos may be taken by a camera 2602, which can be a camera on a user's mobile device or another portable electronic device (e.g. laptop). At 2702, processing the image, by the first neural network, to generate data sets representing location coordinates of one or more facial features of the face in the image. The facial features may also be referred to as facial landmarks, and may include one or more of: eyes, nose, lips, ears, and so on.

At step 2703, receiving, by a second neural network, the image and the location coordinates of one or more facial features of the face in the image, and processing the image and the location coordinates of one or more facial features of the face in the image, by the second neural network, to generate a token associated with the face.

At step 2704, a signing authority 2605 may verify identity of the user and sign the token with a signing algorithm, such as a public/private key pair.

At step 2705, the corresponding signed token is transmitted from the signing authority 2605 to the user's mobile device 2601, subsequently saved in a token database 2606 on the mobile device.

In some embodiments, additional attributes can be contained in the signed token that is stored on the phone, to form an enhanced token. For example, if a facial feature vector (i.e., a token) and an age attribute are stored the signed, enhanced token, then at a Point-of-Sale (POS), a particular picture of a face may be authenticated and verified to meet a particular age threshold.

In some embodiments, a token may be signed by different authorities and enhanced with different information to form corresponding enhanced tokens. For example, a person may register himself as a person who is over 21 years old. This person may be required to visit a Driver's License Office (e.g. a signing authority), which may take his image and generate a token in accordance with the embodiments disclosed herein.

The office may check his driver's license to confirm that he is over 21 years old. This office may then proceed to sign the token with enhanced information, e.g. birthday, name, address and so on, so that a signed enhanced token has embedded information regarding the user. The enhanced token may be signed with a public/private key system. The signed, enhanced token may then be stored on one or both of user's mobile device and a remote database.

The user may then, when visiting a bar and required to show proof of age, uses his phone to connect with the bar's POS system, which may take an image of him, generates a token thereof, and checks the user's mobile device and/or a remote database to see if the user is indeed over 21 based on the signed enhanced token.

In addition, a separate sign authority, such as a government office, may sign a token with enhanced information proving that a user is eligible to vote in one or more elections. The enhanced token may include information such as user's name, age, address, and nationality.

Referring now to FIG. 28, a process 2800 for verifying a user at a Point-of-Sale (POS) is illustrated. At step 2801, a user can scan a QR or bar code using a mobile device to associate the mobile device with the verification process. At step 2802, vendor POS takes a picture or image of user's face.

At step 2803, POS can extract one or more facial features of the face from each of the images or videos by processing through a first neural network the image or video to generate location coordinates of each of the one or more facial features.

At step 2804, POS can use the image and location coordinates to generate a token, for example using a second neural network.

If a user's mobile device is available, at step 2805, generated token is compared against signed tokens stored in the user's mobile device to check for and authenticate user's identity, by comparing the token from POS with one or more tokens in the user's mobile device and finding a best match.

At step 2806, if a user's mobile device is not available, or the device does not have a token database, POS may reach an external database (e.g. feature or token database) for the purpose of identity verification.

In another aspect, a system for facial image processing is provided. The system may include a portable electronic device (PDA), the PDA may include: a processor; a non-transitory computer-readable medium storing data representative of a first neural network and a second neural network; and one or more programs, wherein the one or more program are stored in the memory and configured to be executed by the processor, the one or more programs including instructions for: receiving, by the first neural network, an image containing a face; processing the image, by the first neural network, to generate data sets representing location coordinates of one or more facial features of the face in the image; receiving, by the second neural network, the image and the location coordinates of one or more facial features of the face in the image; and processing the image and the location coordinates of one or more facial features of the face in the image, by the second neural network, to generate a token associated with the face.

Figure 2:
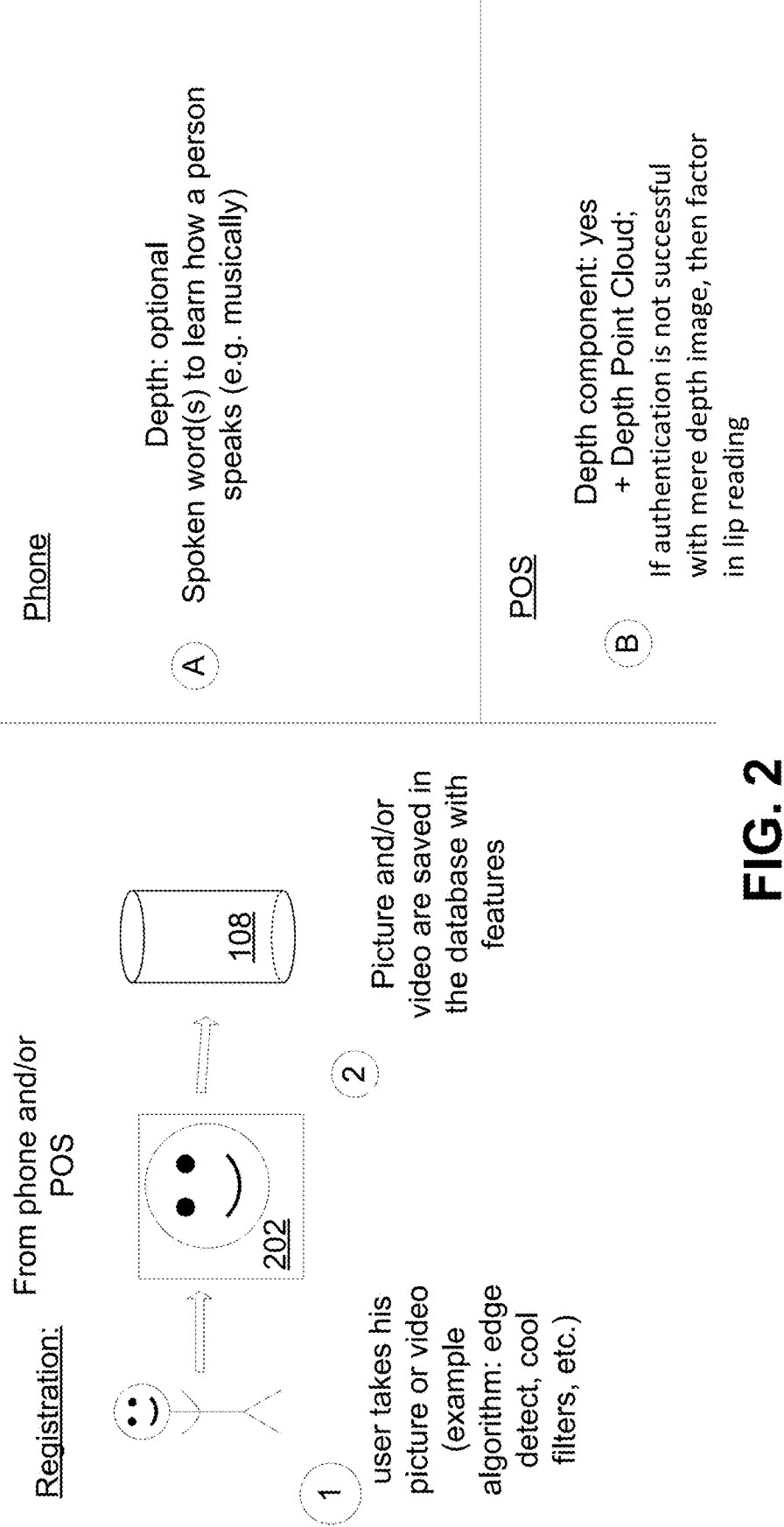
FIG. 2 shows an example registration process using the example facial recognition system, in accordance with one embodiment.

FIG. 2 shows an example registration process and subsequent verification process using system 100, in accordance with one embodiment. During registration, a user may use a mobile device to take a digital image or video 202 of himself. The user may also visit a Point-of-Sale (POS) to do the same. The mobile device or POS has a camera. The camera may be 2D or 3D. A 3D camera can capture images or videos with a depth component. A POS may be equipped with a 3D camera. A mobile device may have a 2D and/or 3D camera.

The image or video 202 may be transmitted to a data storage device 108. Data storage 108 may store the image or video 202 in a database. In some embodiments, the user image or video 202 may be processed by a video processing unit 111 of system 100, which may extract features from the image or video 202. The extracted features may be also stored in the database.

In some embodiments, instead of or in addition to images or videos of users, storage 108 may be configured to save extracted features from the images or videos.

In some embodiments, the user may, during the capturing of video 202, speak a word or phrase. The word may be provided by a vendor or a third party, and may include alphabets, numbers, and/or words. For example, the word may be "1A3CB" or "hello world."

System 100 may be able to process the video 202 and determine in real time or near real time that the user in the video 202 is a real human being, as opposed to a robot, an image, or a spoofing attack. For example, system 100 may execute algorithms to detect depth, edges, motion liveliness, facial movements, and/or filters of the video.

System 100 can then map and store the user's face in the video as a series of 2D or 3D images taken from the video 202, depending on if the camera capturing the video is a 2D or 3D camera. Each of the 2D or 3D images may include pixels, each pixel represented by a set of data indicating a respective value for each of red, blue, green (RGB) colours.

A set of data for a pixel in a 3D image may also include an additional value representing a depth component, which may contain information regarding a depth of the pixel in the 3D image. System 100 can also capture a user's facial movements, including lip movements and store in data storage 108. In some embodiments, extracted features of images depicting a user's facial movements including lip movements may be stored in data storage 108.

In some embodiments, system 100 may be configured to take multiple images of a person's face and convert the multiple images into pixelated masks, which may be an implementation of a point cloud. A point cloud may be a set of data points in 3D space measuring a large number of points on external surfaces of objects including a human face. The pixelated series of images may be further processed for user registration and/or verification purposes.

In some embodiments, system 100 may execute algorithms in machine-learning unit 113 to analyze a user's lip movements in the video 202 when speaking the provided word. The output from the machine-learning unit 113 may be stored as a feature in the database in data storage 108.

In some embodiments, a user may choose to register a 2D image or video of himself via a mobile phone, then proceed to complete the registration at a POS with a 3D camera. At the POS, system 100 may first validate that the person in front of the camera is a real person, instead of a robot, an image, or a spoofing attack, based on analysis of the 3D video being captured by the 3D camera.

For example, system 100 may validate that it is a real person based on a depth component of the 3D video captured. Next, system 100 may process the 3D video and compare it to the video data stored in data storage 108 based on a user profile that was created or updated at the time user registered himself with a 2D image or video. The system may compare various features of the two videos (i.e., the 2D video and the 3D video), such as facial features, facial movements, lip movements, eye movements, and so on. The system can at this stage, based on the comparison of the two videos, determine that the person appearing in the first video (i.e., the 2D video) is the same person appearing in the second video (i.e., the 3D video).

In some embodiments, system 100 may validate that it is a real person based on a depth component of the 3D video captured. Next, system 100 may process the 3D video and compare it to the video data stored in data storage 108 based on a user profile that was created or updated at the time user registered himself with a 2D image or video. In some cases, if authentication is not successful with a depth image, then facial movements such as lip movements may be required in order to authenticate the user.

In some embodiments, a user may be requested to speak a word provided to the user when the 3D video is being captured. The provided word may be the same word provided to the user while capturing the 2D video during the initial registration process with a mobile phone, if a word was provided to the user at all during the 2D video filming process. This way, system 100 can, through the machine-learning unit 113, further validate that the person appearing in the 2D video is the same person appearing in the 3D video, based on analysis of the lip movements of the user speaking the same word.

Once system 100 has validated that the user in the 3D video is a real person, and the same person as the user in the 2D video, system 100 can store the 3D video in data storage 108, and further associate the 3D video data to the user profile associated with the 2D video. In some embodiments, the initial features captured in the 2D video is augmented with the facial features presented in the 3D video, including, for example, facial movements, lip movements, depth component, and so on.

The user may then, as an option, make a one-time payment (OTP) to system 100 for registration.

Once successfully registered, the user is able to make payments using facial recognition through a POS or through a mobile device, for example, in accordance with the process described below.

Figure 3:
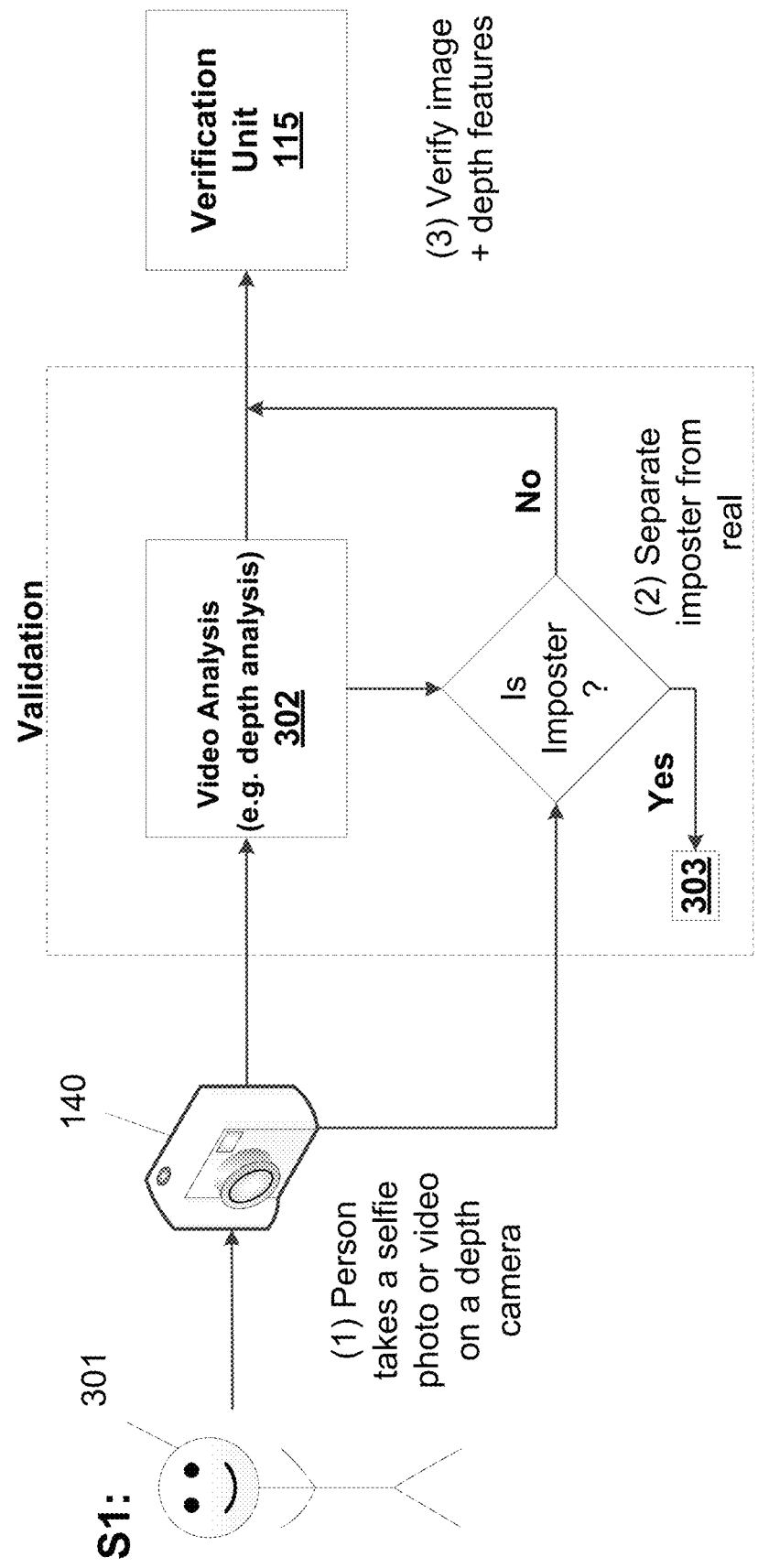
FIG. 3 shows an example user verification process using the example facial recognition system, in accordance with one embodiment.

Referring now to FIG. 3, which shows an example user verification process at a POS using system 100, in accordance with one embodiment. A user may wish to make payment for a purchase at a POS. The user may at step 301 may use or let a 3D camera 140 take a 3D image or video of himself for the purpose of authenticating identity and making a payment. The user may, in some embodiments, choose to take an image or video. In other embodiments, a pre-determined setting may determine if a user can take an image or video using camera 140 at a POS.

The camera 140 at a POS may be remotely connected to system 100 and send the captured image or video to system 100. The verification unit 115 on system 100 may receive the processed 3D image or video and verify whether the user appearing in the 3D image or video is the user in the user profile, based on previously stored image and/or video data associated with the user profile.

In some embodiments, verification unit 115 first determines, using video analysis at step 302, that the person appearing in the 3D video captured by camera 140 at a POS is a real person, instead of a robot or an imposter, based on features of the 3D video, such as depth component, facial features, lip movements, and so on. If the result of video analysis indicates that the person in the 3D video is actually an imposter, such as a spoofing attack, the system 100 may alert the user associated with user profile at step 303.

Otherwise, verification unit 115 can proceed to verify that the user appearing in the 3D image or video is the user in the user profile, based on previously stored image and/or video data associated with the user profile. The previously stored image and/or video data associated with the user profile may, include for example, facial features, facial movements, depth components of the facial features, and so on. Once system 100 has verified and authenticated the identity of the user in the 3D video, system 100 may proceed to trigger or request a payment in accordance with the user request.

Figure 4:
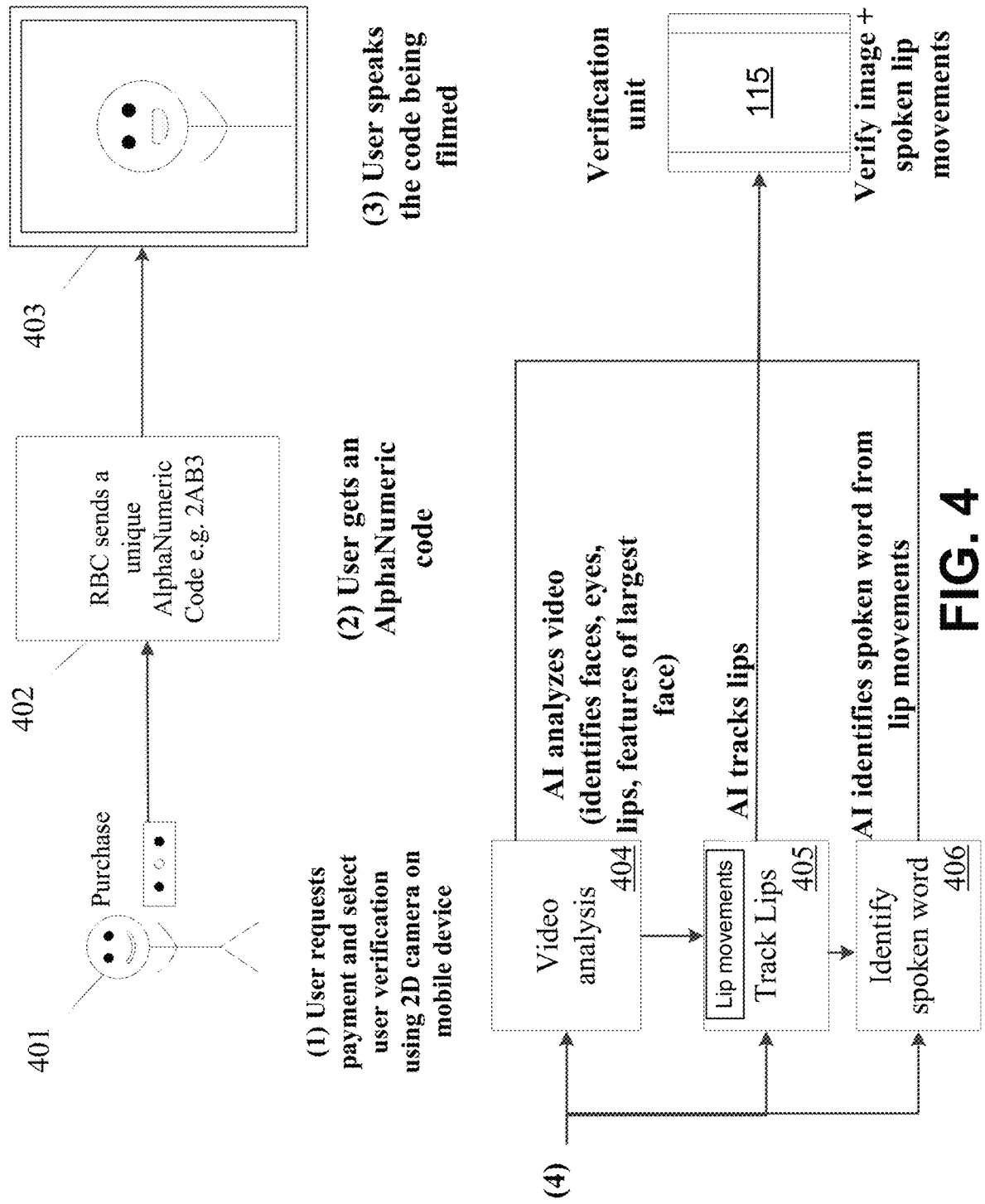
FIG. 4 shows an another example user verification process using the example facial recognition system, in accordance with one embodiment.

FIG. 4 shows an example user verification process at a mobile device using system 100, in accordance with one embodiment. The mobile device may be for example a cell phone, a tablet, or a laptop. A user at step 401 may request for a payment to be made for a purchase transaction. The user may select the 2D camera 130 on the mobile device to verify his user identity. At step 402, the user may be provided with a word, which may in some cases be a word or code including alphabetic and/or numeric characters, such as "2AB3". At step 403, the user may speak the word while being captured in video by the 2D camera. The captured video is then transmitted to system 100 for analysis.

At step 404, system 100 may analyze the video to determine if the person appearing in the video is the user in the user profile making the request for payment. In some embodiments, a machine-learning unit 113 may be utilized to analyze the video to identify face, eyes, lips, and other features of the video, such as features of the largest face. For example, lip movements may be tracked at step 405 and further analyzed at step 406 to identify a word being spoken by the user in the video.

Once system 100 has verified and authenticated the identity of the user in the 2D video, system 100 may proceed to trigger or request a payment in accordance with the user request.

Figure 5:
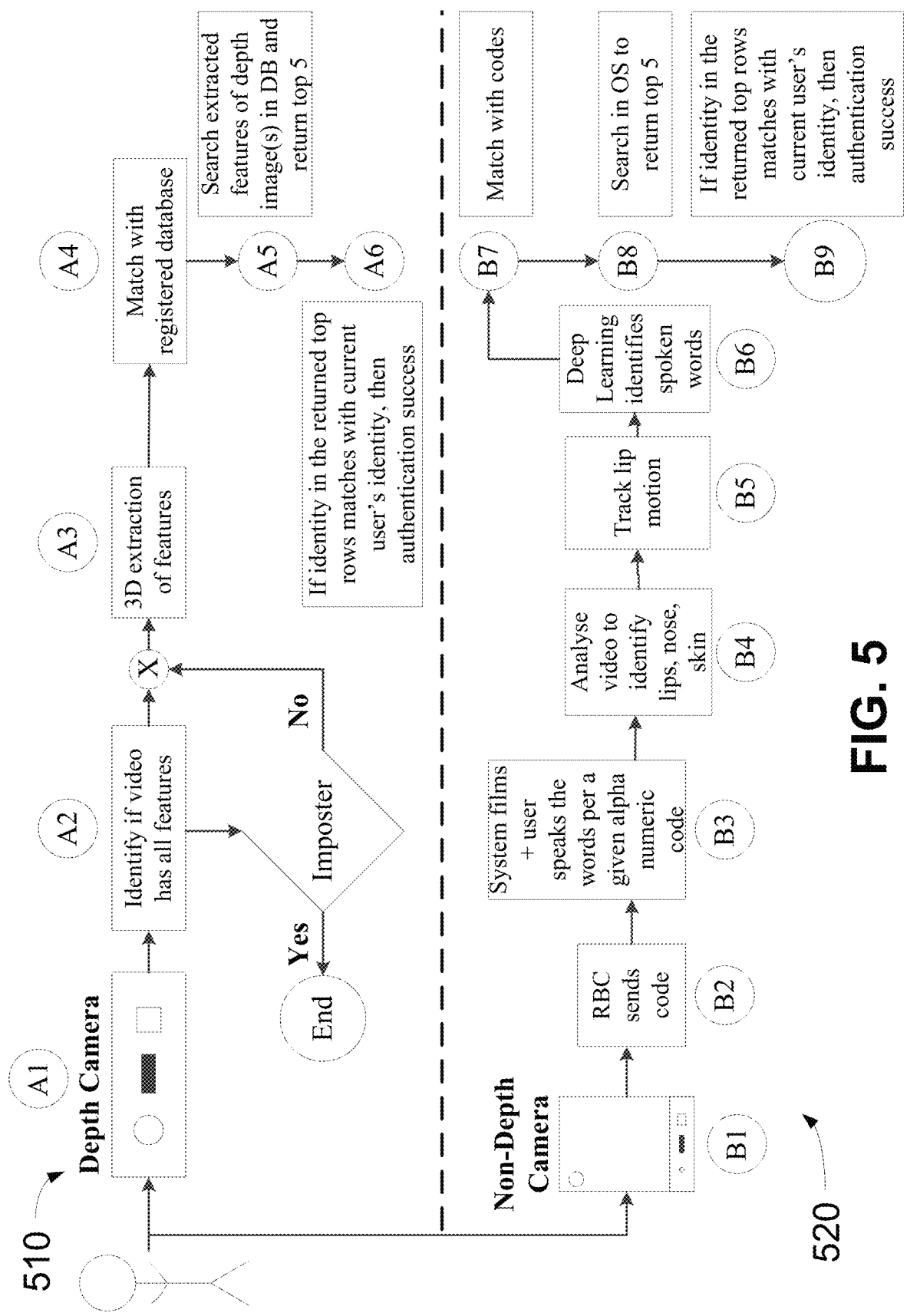
FIG. 5 shows another example process for user verification, in accordance with one embodiment.

FIG. 5 shows two example processes 510, 520 for user verification, in accordance with one embodiment. Process 510 is a process executed by system 100 for user verification with a 3D camera that is configured to capture 3D videos with a depth component.

At step A1, a 3D camera captures the user in a brief 3D video with depth component. At step A2, system 100 receives the 3D video, and analyzes features of the captured 3D video in order to determine if the video shows a real person or an "imposter", which means that the person appearing in the video may be a spoofing attack such as an image or a robot. Once system 100 determines that the person in the video is a real person, system 100 at step A3 may be configured to extract various features from the 3D video, such as facial movements, facial features, lip movements, depth component, and so on. At step A4, system 100 tries to match the person appearing in the 3D video with a user in a registered database. At step A5, system 100 may search in the database of video data and return the top 5 results (i.e. 5 users) that are the best matches based on the extracted features of the 3D video. For example, system 100 may search features extracted from depth images or videos in the database and return the top five results. System 100 at step A6 may perform a video analysis in depth and determine if the person appearing in the 3D video is one among the top five results returned in step A5, and if so, then the user verification and authentication is a success, in which case the requested payment may be authorized. For example, at step A6, if a user profile in the returned top five results or rows matches with the results from the video analysis, then the authentication step is deemed to be a success.

Process 520 is a process executed by system 100 for user verification with a 2D camera that is configured to capture 2D videos.

At step B1, a 2D camera captures the user in a brief 2D video. At step B2, system 100 receives the user request for user verification and sends a code (or word) to the user. At step B3, the 2D camera films the user speaking the given code, which may be alphabetic and/or numeric. At step B4, system 100 may be configured to extract various features from the 2D video, such as facial movements, facial features, nose, skin, and so on. At step B5, system 100 tracks and analyzes lip movements of the user during the time the user is heard speaking the code on video.

At step B6, system 100 may, through deep learning unit or module, identify a spoken code based on the user's lip movements. At step B7, system 100 may match the identified code with the code that has been previously provided to the user and if the match of codes is successful, system 100 may at step B8 search in the database of video data and return the top 5 results (i.e. 5 users) that are the best matches based on the extracted facial features of the 2D video. System 100 at step B9 may perform a video analysis in depth and determine if the person appearing in the 2D video is one among the top five results returned in step B8, and if so, then the user verification and authentication is a success, in which case the requested payment may be authorized. For example, at step B9, if a user profile in the returned the top 5 results matches with the results from the in-depth video analysis, then the authentication step is deemed to be a success.

In some embodiments, lip reading analysis may compliment the facial recognition process in the process of authenticating a user.

Figure 6:
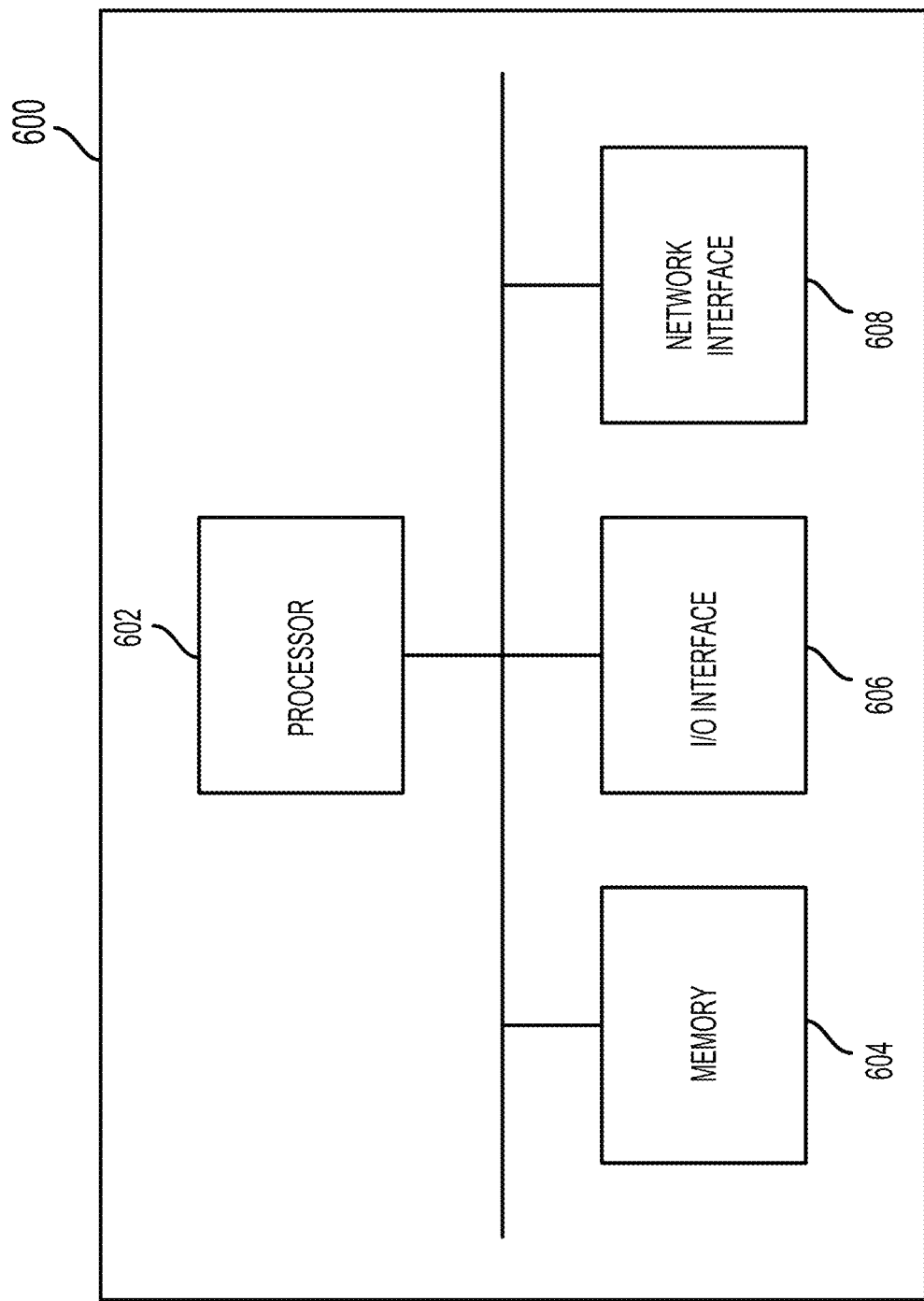
FIG. 6 is an example block diagram of an example computing device, according to some embodiments.

FIG. 6 is a schematic block diagram of an example computing device 600 implementing system 100, according to some embodiments. As depicted, computing device 600 includes at least one processor 602, memory 604, at least one I/O interface 606, and at least one network interface 608.

The computing device 600 may be configured as a machine-learning server adapted to dynamically maintain one or more neural networks.

Each processor 602 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 604 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 606 enables computing device 600 to interconnect with one or more input devices, such as a keyboard, mouse, camera, touch screen, and a microphone, or with one or more output devices such as a display screen and a speaker.

A networking interface 608 may be configured to receive and transmit data sets representative of the machine-learning models, for example, to a target data storage or data structure. The target data storage or data structure may, in some embodiments, reside on a computing device or system such as a mobile device.

FIG. 7 shows an example process 700 performed by system 100. At step 701, a system may receive a first video of a user, the first video being two-dimensional. At step 702, the system may analyze the first video to obtain a first set of profile data based on a facial movement of the user in the first video.

At step 703, the system may receive a second video of a user, the second video being three-dimensional and having a depth component.

At step 704, the system may determine the user in the second video is the user in the first video based on the first and second videos. At step 705, the system may analyze the second video to obtain a second set of profile data based on a facial movement of the user in the second video. At step 706, the system may store the first and second sets of profile data in the user profile. At step 707, the system may receive a third video of a user. At step 708, the system may analyze the third video. At step 709, the system may verify that the user in the third video is the user in the user profile based on the first or second set of profile data.

In some embodiments, the facial movement of the user in the first or second video may be a lip movement.

In some embodiments, the second set of profile data may include data relating to the depth component of the second video.

In some embodiments, the data relating to the depth component of the second set of profile data may be used to augment the first set of profile data.

In some embodiments, the depth component of the second video may include information regarding a depth of a pixel in an image from the second video for each pixel in the image.

In some embodiments, the lip movement in the first video is of the user speaking a word and the lip movement in the second video is of the user speaking the same word.

Figure 8:
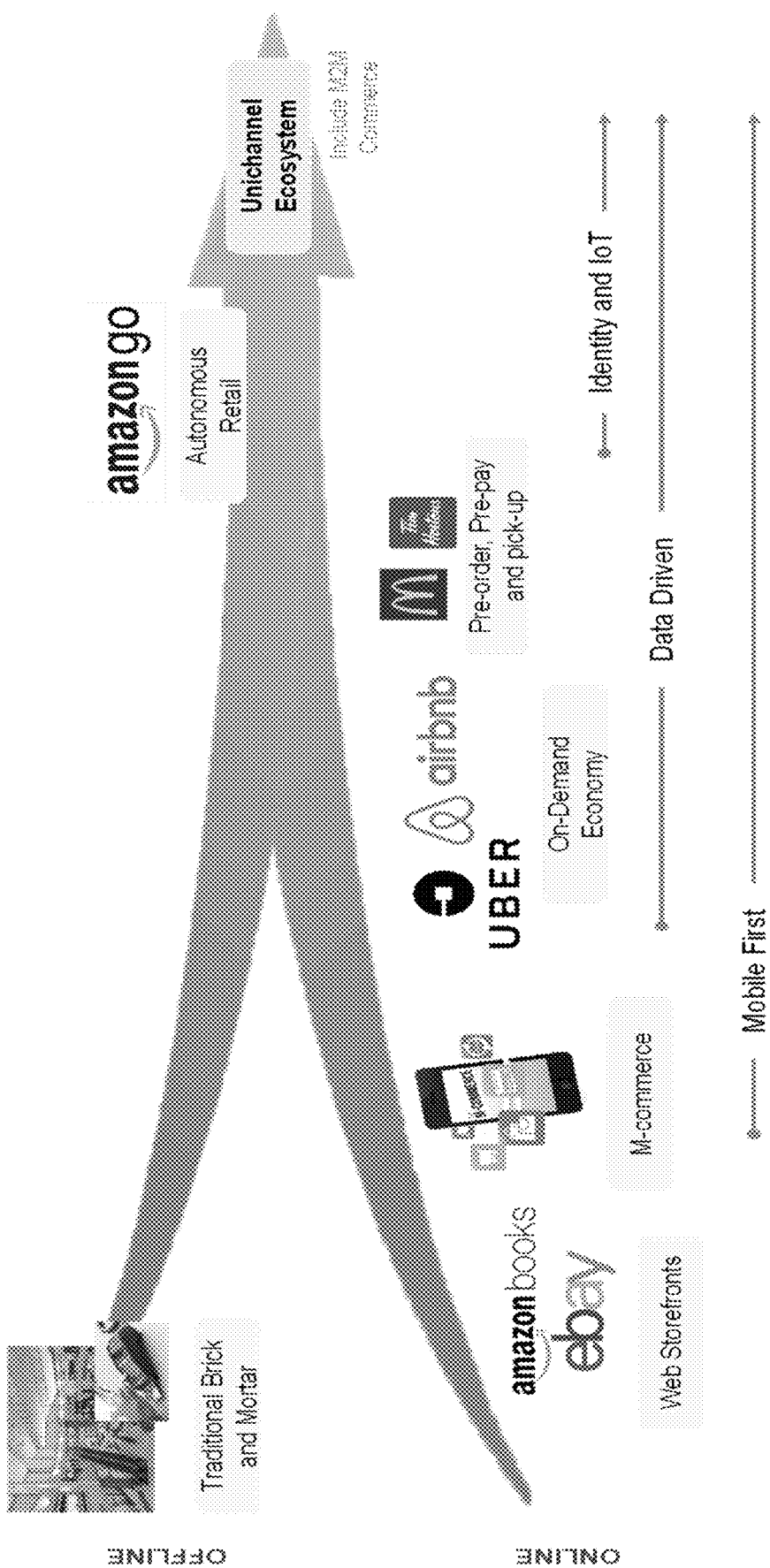
FIG. 8 is an example uni-channel online ecosystem, according to some embodiments.

FIG. 8 is an example uni-channel online ecosystem, according to some embodiments. As shown, eCommerce may evolve into a uni-channel ecosystem that brings online, offline, logistics, data, and identity together. But first, the offline model may need to be re-modernized to deliver the same seamless shopping experience as online.

Figure 9:
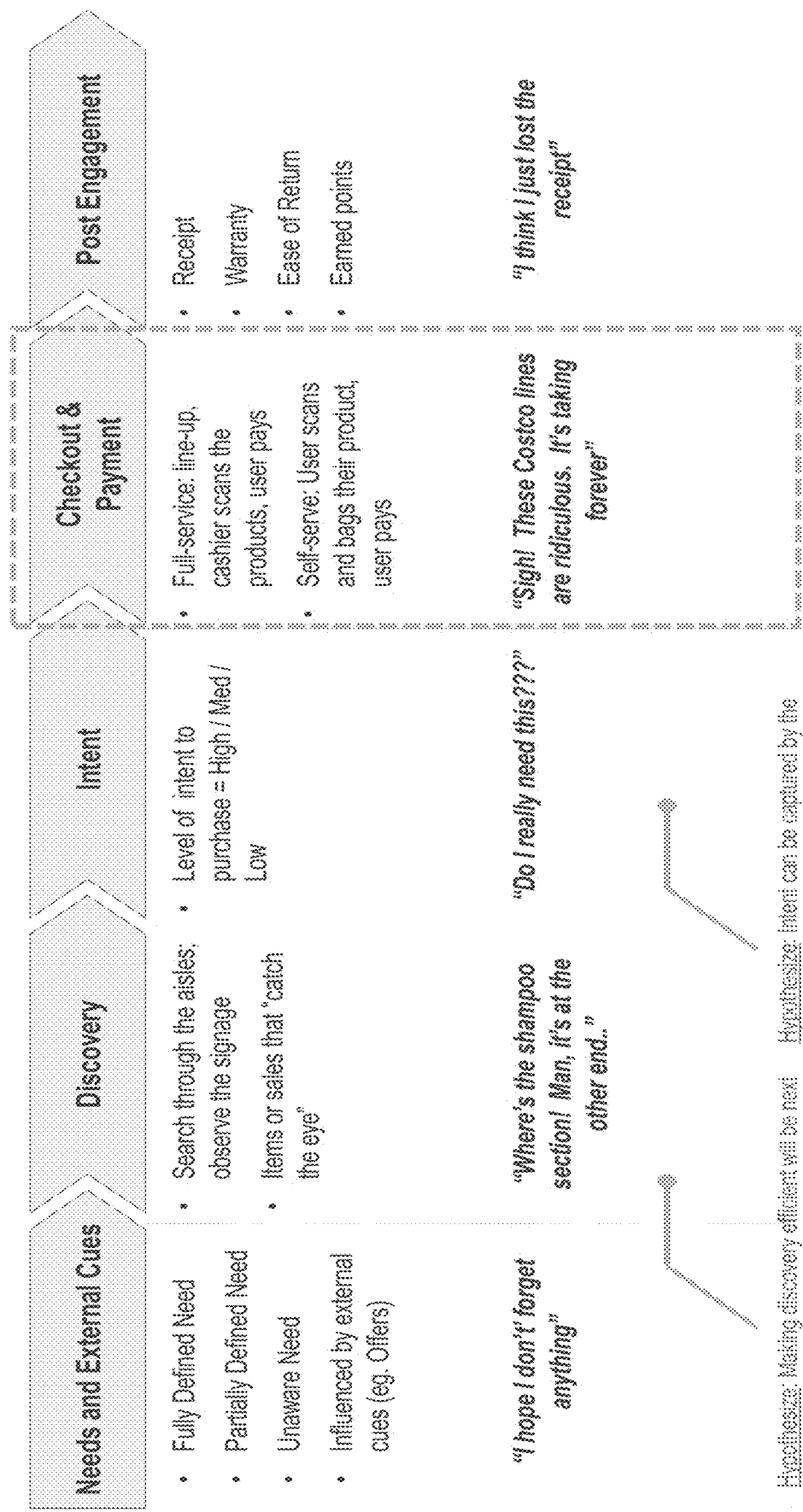
FIG. 9 is an example flow chart of an in-store model for a customer, according to some embodiments.

FIG. 9 is an example flow chart of an in-store model for a customer, according to some embodiments. A few major ecosystem players may focus on autonomous retail by tackling the physical checkout with a "cashier-less" POS, which removes the waiting line and makes payments invisible. These players may utilize facial recognition and Internet-of-Things (IoT) to achieve this experience, and may collect more user data as well as identity information.

For example, at FutureMart by Alibaba, customers may enter the store and use facial recognition to provide identification. The customer may then scan a QR code with an Alibaba mobile application to shop. A custom application offers discounts for smiling and thereby improving facial identity of the user. Facial recognition and RFID at the exit may then recognize the customer and the product.

For another example, AmazonGo lets a customer scan a QR code with the AmazonGo app to enter the store. Weight sensors and cameras automatically detect when products are taken off or returned to the shelves, and keep track of the user's virtual cart. No checkout is required; a customer can simply exit the store and the payment may be charged to the card on file.

For yet another example, at BingoBox by WeChat, a customer can scan a barcode with the WeChat app to access the store. Products are labeled with an RFID tag. At checkout, a user places products on a self-checkout machine, which reads the tags, and pays using a custom wallet application. Image recognition may be used to automatically recognize a user if items are purchased.

Figure 10:
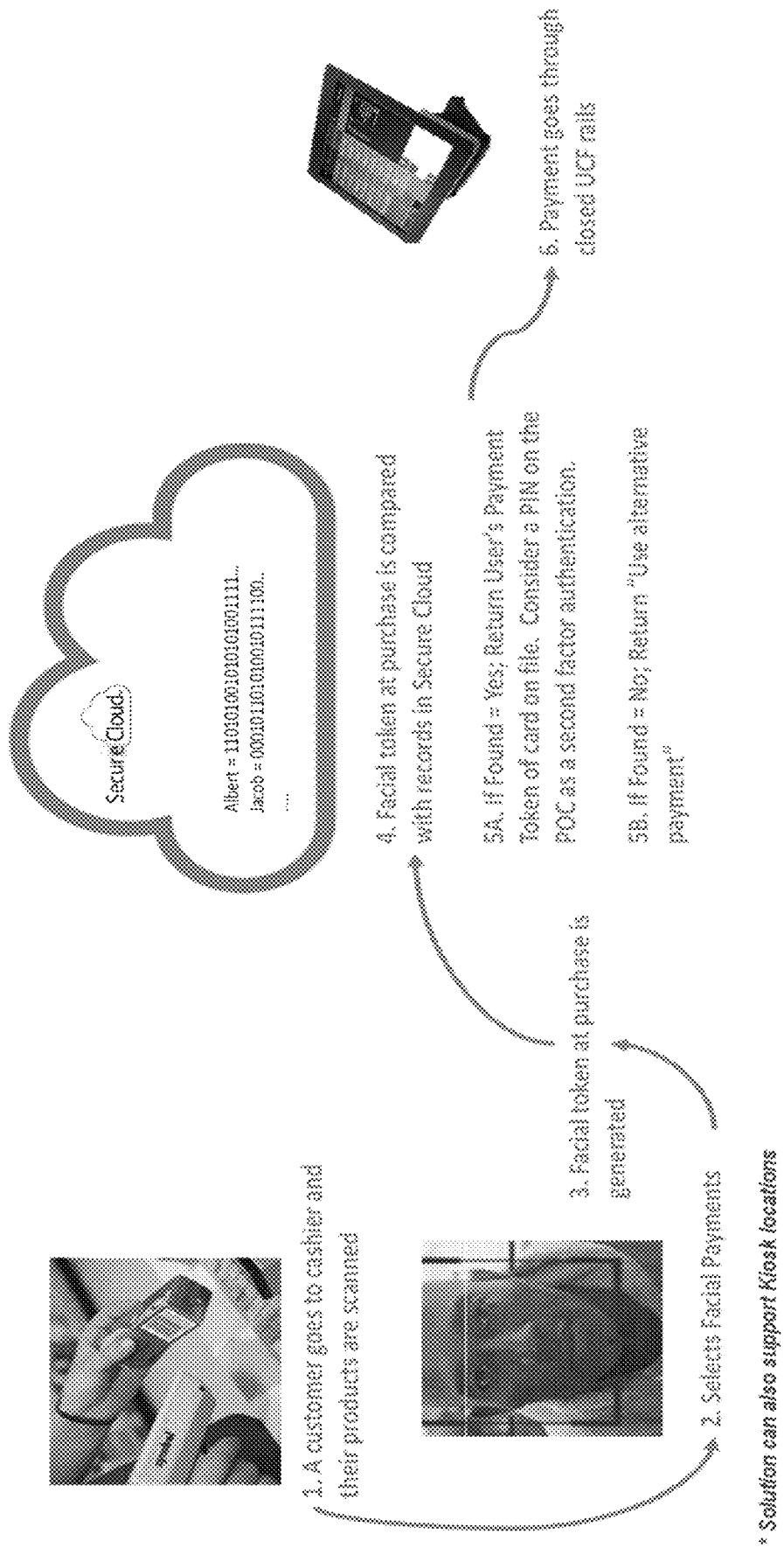
FIG. 10 is an example use case of using facial recognition at a Point-of-Sale (POS), according to some embodiments.

FIG. 10 is an example use case of using facial recognition at a POS, according to some embodiments. At step 1, a customer goes to a cashier and their products are scanned; at step 2, payment using facial recognition may be selected; at step 3, a facial token (which may also be referred to as facial identity token) of the customer may be generated; at step 4, a facial token of the customer may be compared with records in a secure cloud storage; at step 5A, if the facial token is found in the records, the system can return the customer's payment information (e.g. payment token of the customer's card on file) to complete the purchase transaction; at step 5B, if the facial token is not found in the records, then no payment will be made, and alternative payment method may be selected; at step 6, a payment may go through closed UCF rails.

FIG. 11 shows that 2D facial recognition cannot distinguish similar faces, and that current facial recognition technology can be easily spoofed. Today, computer vision is used for facial recognition to authenticate consumers. However, industry offerings are all based on 2D images. This can be easily spoofed, which would lead to problems using 2D facial recognition for financial transactions. Therefore, 3D facial feature extraction and matching may be used with facial movements (e.g. lip movement) to fortify the validation of a video of a customer's face, while compensating for 2D cameras in existing mobile devices.

FIG. 12 shows example capabilities of a facial recognition system, according to some embodiments, such as processes involving pixel masks, lip movement, 3D depth video analysis, and facial identity tokens. Generating a pixel mask means applying an AR face mask to a user's face via a mobile device extract a user's 2D facial features while gamifying the process.

Artificial Intelligence (AI) may extract and interpret the user's lip movement against provided words as a way to validate the identity of the user. 3D depth video analysis involves extracting and utilizing a user's depth facial features in situations where a depth camera is available. Facial identity tokens or facial tokens involve extracted features (e.g. 2D, lip movement, 3D) which may be encrypted and stored as a string in a secure database.

Lip movement, for example, can be read using data that is based, for example, on a data set, such as grid audio visual corpus for speech perception. This example dataset contains 1000 short videos of 2 seconds each, recording 34 people. It also contains the corresponding ground truth (the words are spoken by each person).

Using 3D convolutional neural networks, which takes into account the audio. In an example use case, the audio is not taken into consideration. Applicant tested the approach with the LipNet™ model, Keras™ and TensorFlown™ implementation for sentence detection.

Figure 57:
FIG. 57 is an example pseudocode for facial recognition, according to some embodiments.

In this approach, features were taken representing various parts of the lip region, and the model was executed for the entire dataset to generate a log file with utterances both predicted and target (labelled) values. Phrase similarities were obtained for each video, by determining the similarities measures: cosine, Euclidian, Jaccard distances. FIG. 57 includes sample code for conducting lip movement analysis, and FIG. 57 also includes sample output scores including cosine similarity and Jarrard Distances, according to some embodiments.

Alternate, different code is possible and FIG. 57 is provided as an example.

Figure 13:
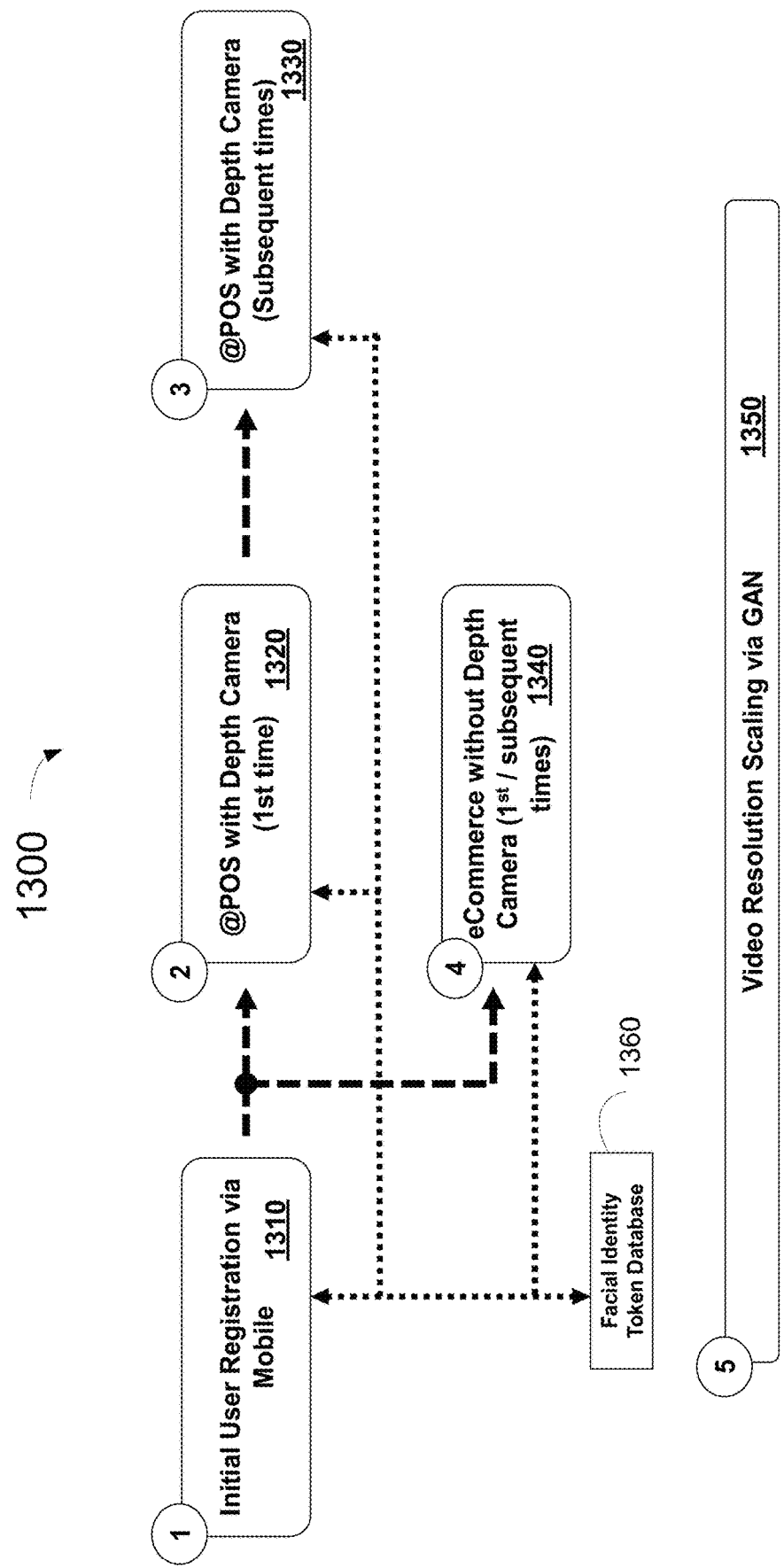
FIG. 13 shows an example user flow chart of a facial recognition system, according to some embodiments.

FIG. 13 shows an example user flow chart 1300 of a facial recognition system, according to some embodiments. At step 1310, an initial user registration is completed via mobile device. At step 1320, a customer may use a depth camera, for the first time, at a POS. At step 1330, a customer may use a depth camera in subsequent times to verify their identity and complete a transaction. Step 1340 is when a customer makes a transaction using eCommerce online, without a depth camera. facial identity token database 1360 may be used to store user's initial facial recognition data supplied through the registration process 1310. At step 1350, as an optional step, video resolution scaling may be formed via Generative Adversarial Networks (GAN).

Figure 14:
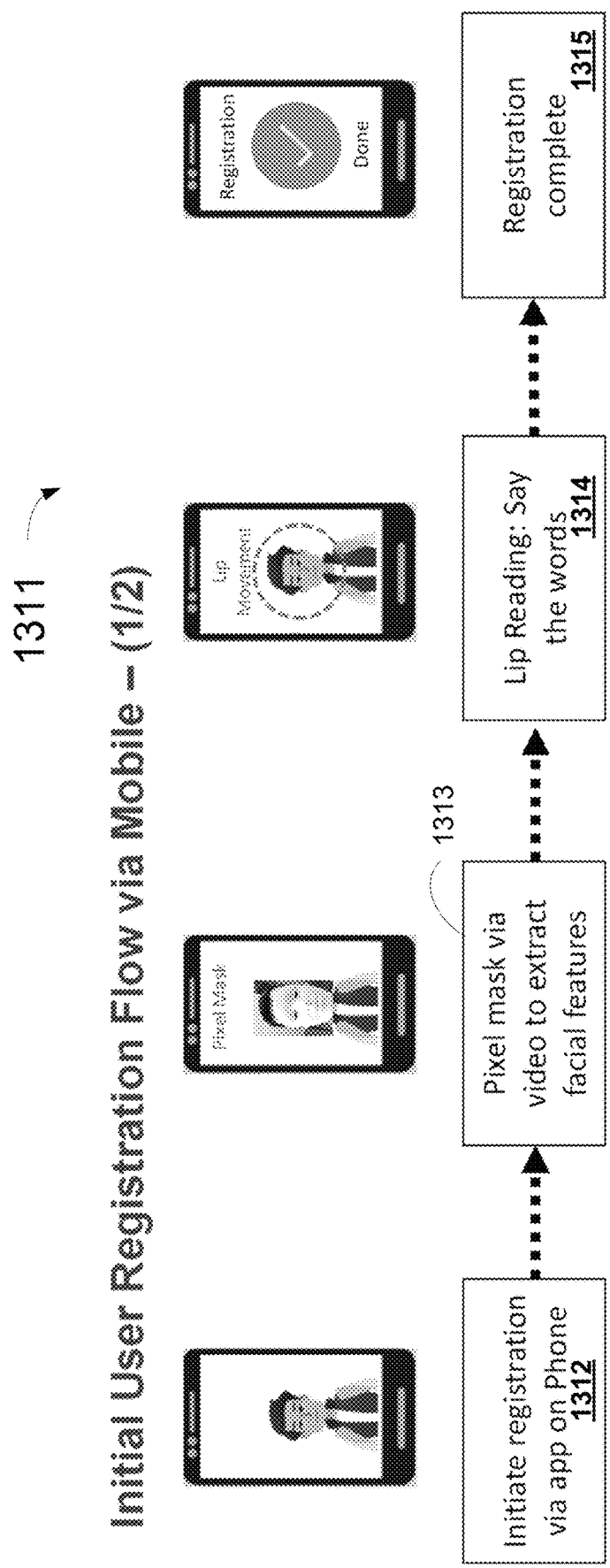
FIGS. 14 and 15 show an example initial user registration process using a mobile device, according to some embodiments.
Figure 15:
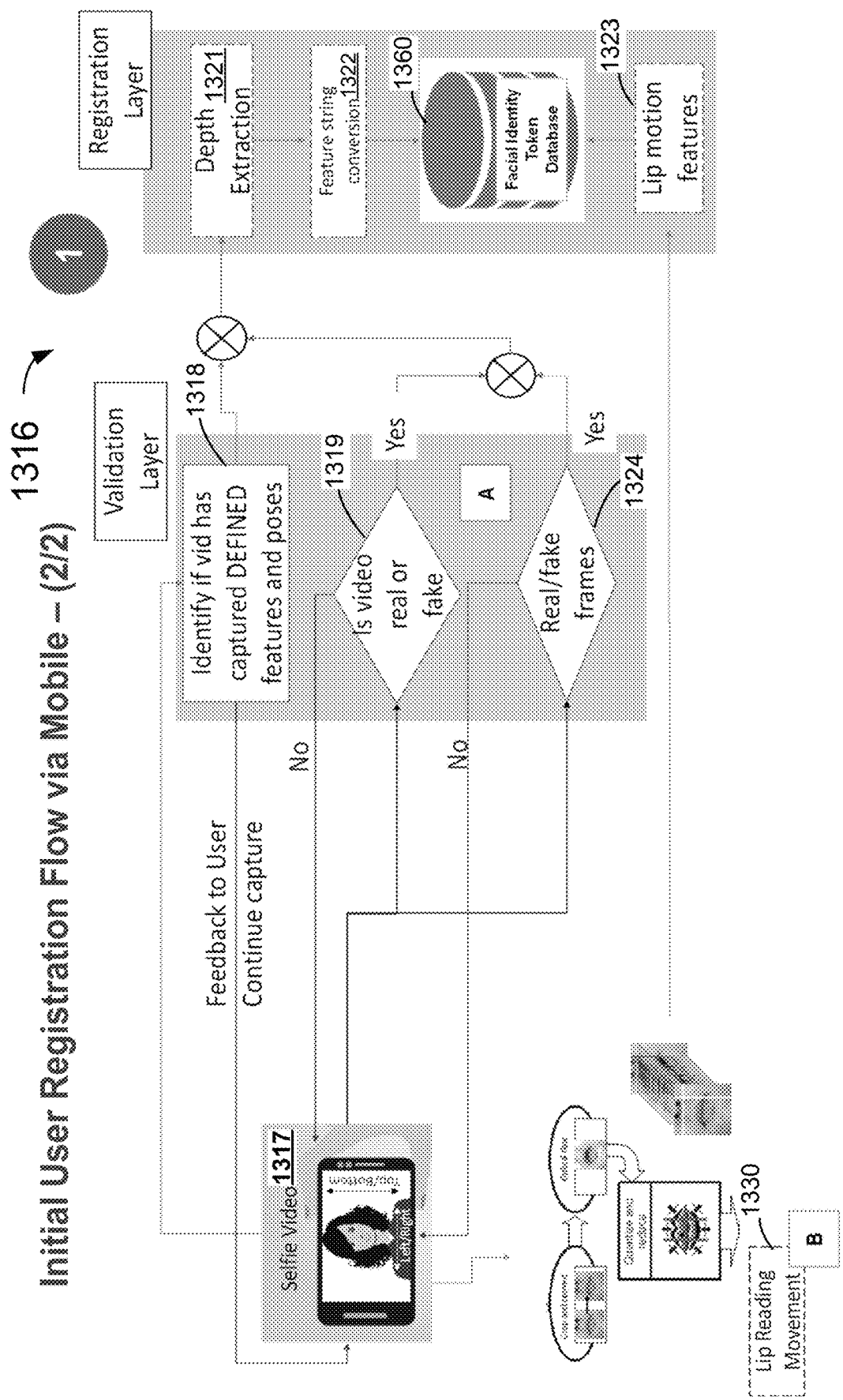

FIGS. 14 and 15 shows example initial user registration processes 1311 and 1316 using a mobile device, according to some embodiments.

At step 1312, a user may begin a registration process through a mobile device; at step 1313, the user may take a video of his or her own face to generate a pixel mask, a process which involves generating an AR-based mask that gamifies the process of extracting 2D facial features (e.g. distance between eyes, etc.) and the system may check if the video is real or fake.

At step 1314, while taking a video of his own face, the user may say out loud a set of provided words and the system would capture their lip movement. Saying out loud the provided words is an approach similar to a challenge response, and may be used to verify the user is not a robot or an image.

At step 1315, registration is complete, in which case the system may map and store in the facial identity token database: (i) the user's face as a 2D token and (ii) output from the AI that captures the way the user moves his lips based on the phonemes pronounced.

At step 1317, a selfie video may be taken by the user.

t step 1318, which may be part of a validation layer, the system may identify if the video as captured has sufficiently defined features and poses. If not, there may be a feedback to the user to continue take or capture the video.

At step 1319, the system may determine if the video is real or fake.

At step 1324, the system may determine if the video frames are real or fake. If the video passes the validation process, then a registration process or layer may be performed by the system.

At step 1321, a depth extraction may be performed. At step 1322, feature strings may be converted and stored into facial identity token database 1360.

At the same time validation is being processed, lip reading movement 1330 may be performed by the system. At step 1323, lip motions from lip reading movement process 1330 may be stored into facial identity token database 1360 as well.

Figure 16:
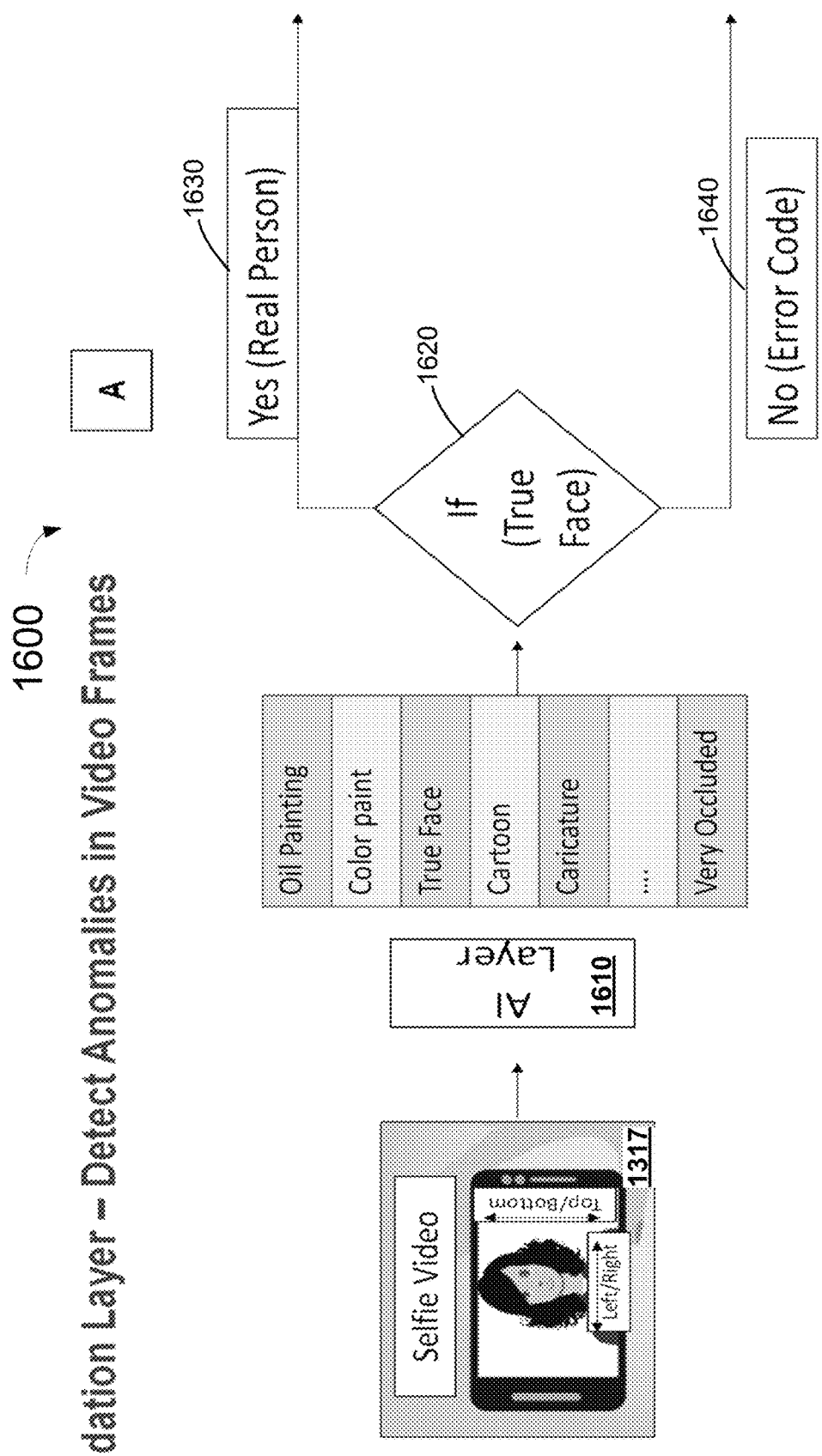
FIG. 16 shows an example schematic diagram of a validation process by a facial recognition system, according to some embodiments.

FIG. 16 shows an example schematic diagram of a validation process 1600 by a facial recognition system, according to some embodiments. AI layer 1610 can generate a dataset of true images and their false images (includes cartoon, color paint, oil painting images, picture of photograph, picture of laptop or computer screen, etc.) based on video 1317. The database of true images and false images may help an AI algorithm 1620 to detect true image 1630 from false images 1640. This process may be performed on each video frame to detect spoofing.

Figure 17:
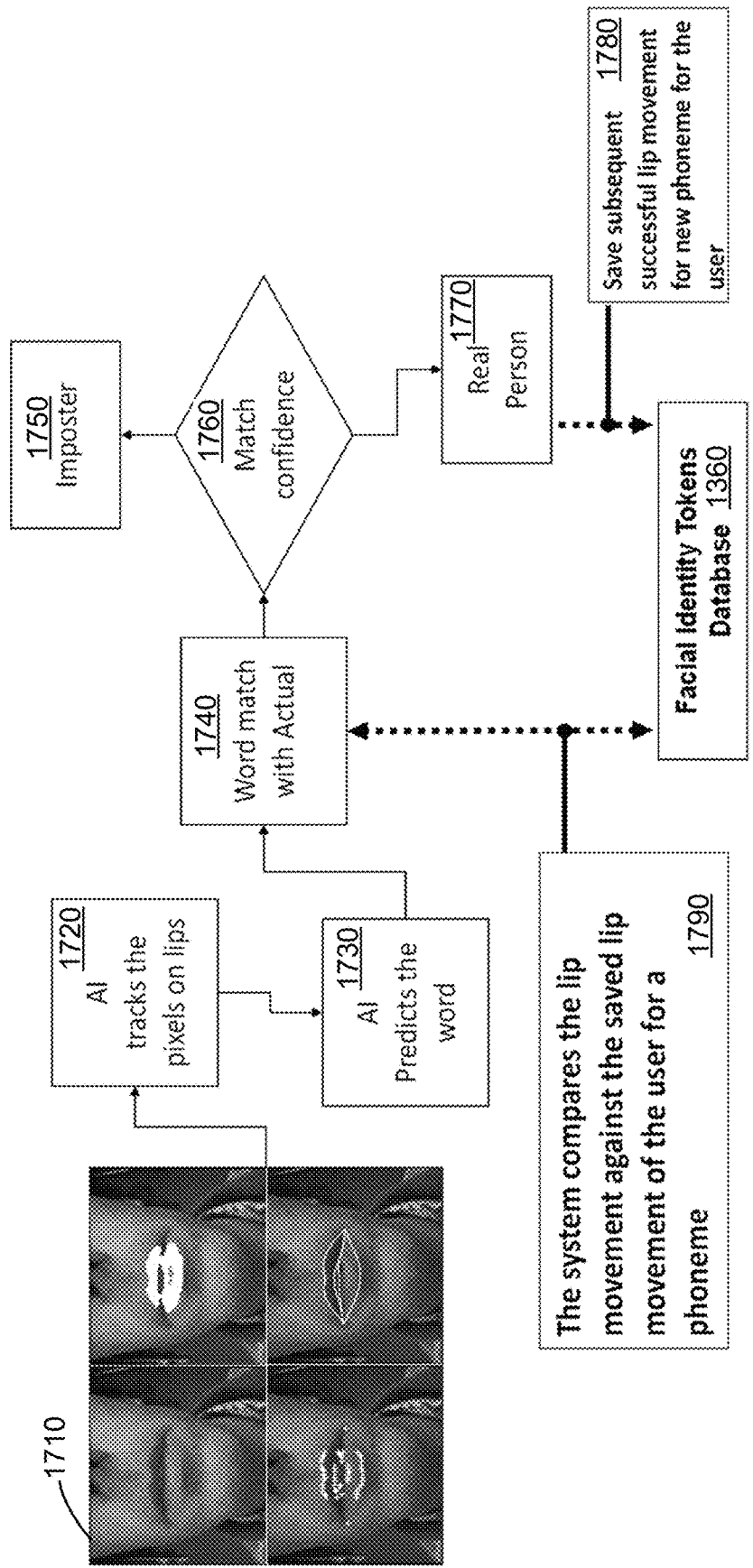
FIG. 17 shows an example schematic diagram of a verification process by a facial recognition system, according to some embodiments.

FIG. 17 shows an example schematic diagram of a verification process 1700 by a facial recognition system, according to some embodiments. Video frames 1710 showing various lip movements of a user may be sent to AI algorithm at step 1720 to track the pixel on lips.

At step 1730, the trained AI algorithm may predict a word spoken by the user in the video. At step 1740, the predicted word is compared to the provided word (i.e. actual word) and a determination is made as to if they match. At step 1760, a match confidence score may be generated. If the score is too low, the person in the video may be determined to be an imposter at step 1750.

If the score is above a certain threshold, at step 1770, then the person in the video may be determined to be a real person matching the provided identity. The system may compare the lip movement against a saved data set of previously captured lip movements of the user for a phoneme at step 1790 and save the phoneme to the facial identity token database 1360. At the same time, the system may save subsequent successful lip movements for new phonemes for the user at step 1780.

Figure 18:
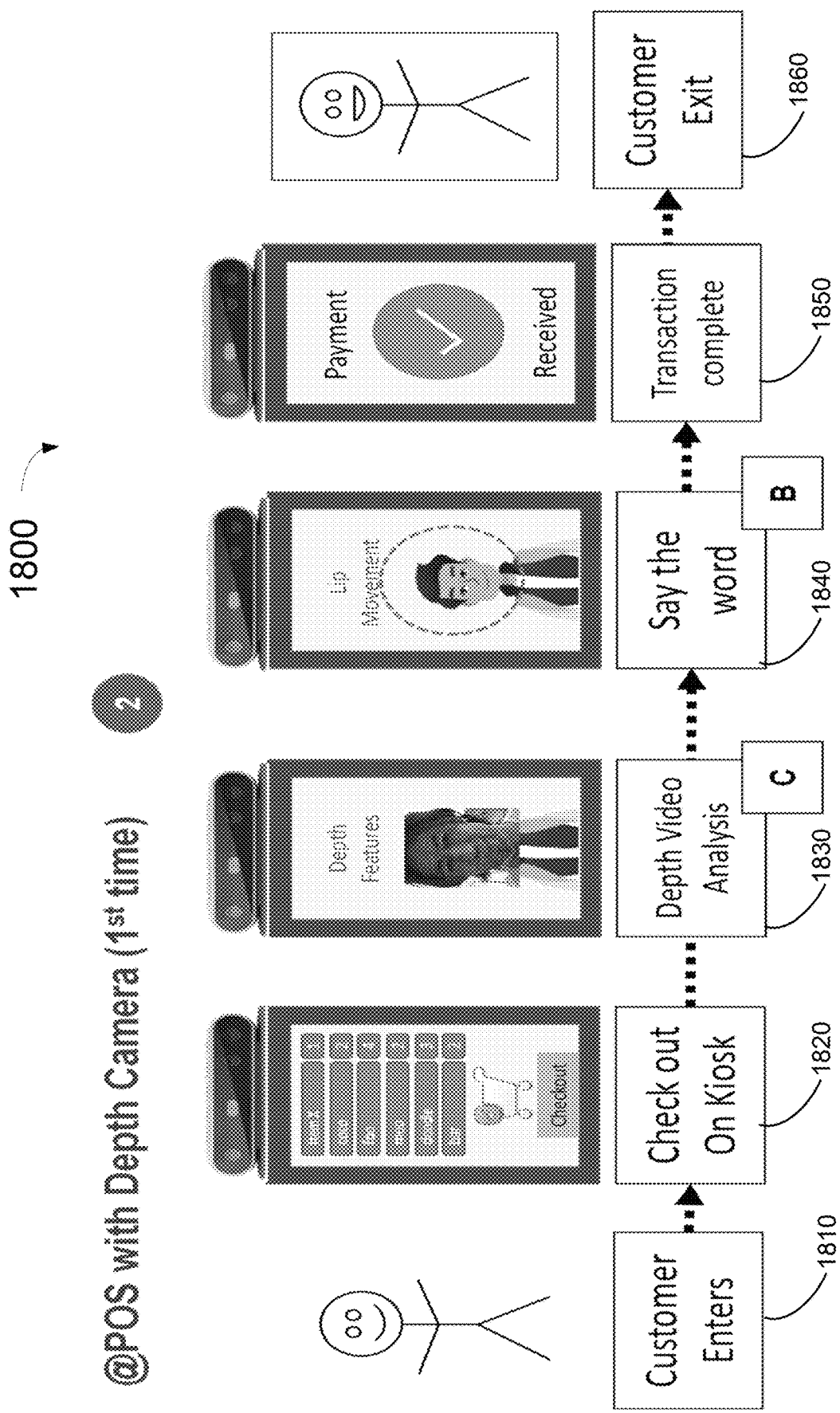
FIG. 18 shows an example transaction process with a depth camera performed by a facial recognition system, according to some embodiments.

FIG. 18 shows an example transaction process 1800 with a depth camera performed by a facial recognition system, according to some embodiments.

At step 1810, a customer enters a store; at step 1820 the customer may check out via a kiosk; at step 1830, the system may validate that the customer is a person based the depth component of the depth video, and extract their depth facial features, check the video taken by the depth camera, and compare the 3D video to the 2D facial identity token stored at initial registration via mobile device.

At step 1840, if the system finds a match for the 3D video and the match confidence score is sufficiently high, then a challenge word is provided to the user to speak into the depth camera. Upon the user saying the challenge word, the AI algorithm may validate that it is the same person based on lip movement. At step 1850, if validated, the transaction may be completed. At step 1860, the customer may exit the store with goods.

As an optional process, upon validation success, the initial facial features captured during registration on the phone may be augmented with the facial features of the depth video, and a payment token tied to the user may be passed to the payment network for completing the transaction.

Figure 19:
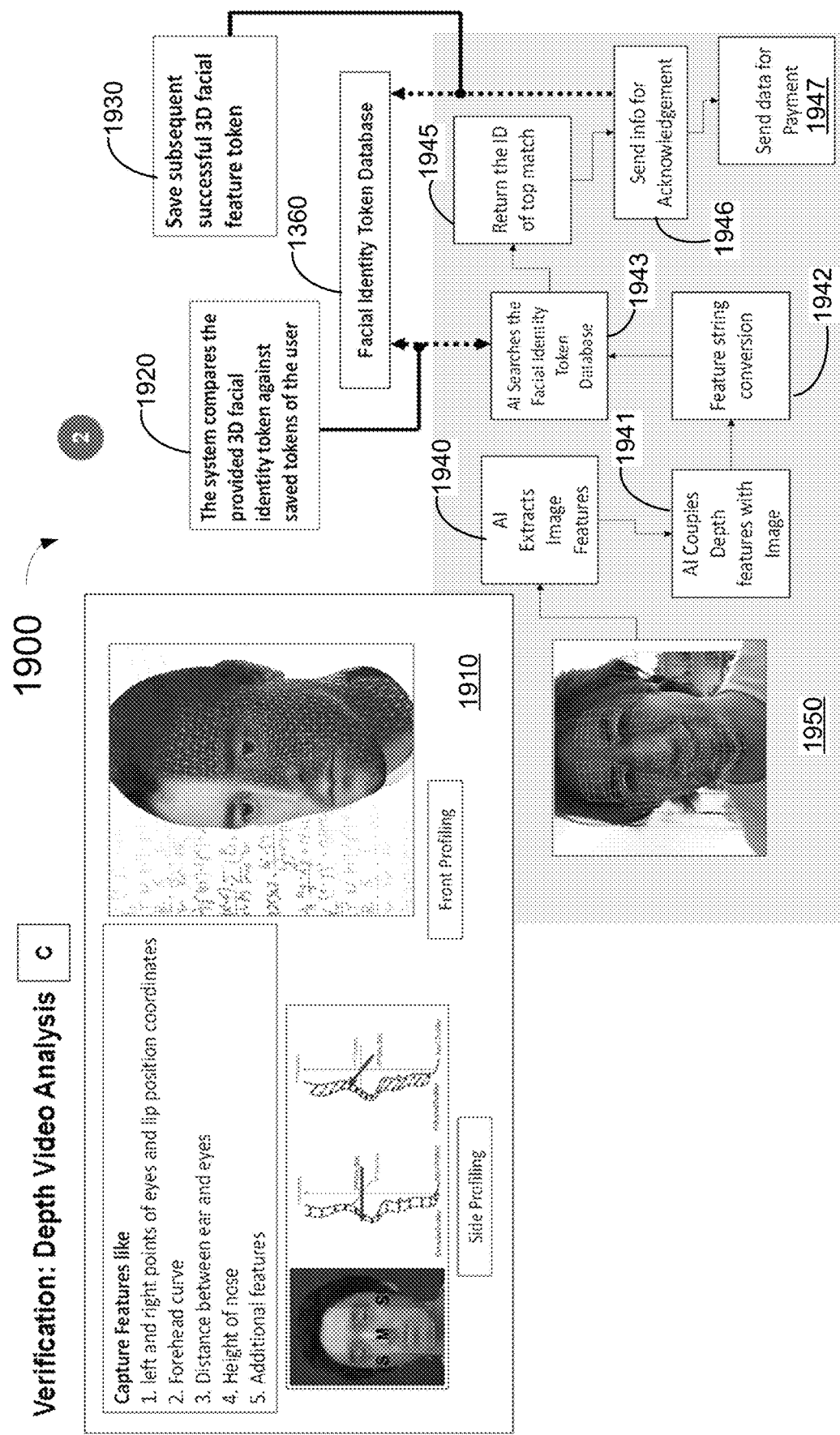
FIG. 19 shows an example schematic diagram of a verification process by a facial recognition system, according to some embodiments.

FIG. 19 shows an example schematic diagram of a verification process 1900 by a facial recognition system, according to some embodiments.

As shown at step 1910, a video taken by a 3D depth camera may extract features such as the lateral and medial position coordinates of both eyes, the lateral-position coordinates of the lips, forehead curvature, the distance between an ear and the eyes, the height of nose, and other additional features.

At step 1920, the system may compare the provided 3D facial identity token against saved tokens of the user from the facial identity token database 1360. Subsequent successful 3D facial tokens may be saved onto the facial identity token database 1360 at step 1930.

At step 1940, the AI algorithm may extract image features 1950 from a human face shown in the video. At step 1941, the AI algorithm may couple depth features with images, and at step 1942, perform a feature string conversion. At step 1943, the AI may search the facial identity token database 1360, and return the ID of the top match at step 1945.

At step 1946, information may be sent to acknowledge that a match is found for the 3D video; and at step 1947, the system may send payment data tied to the ID of the top match to complete the transaction.

Figure 20:
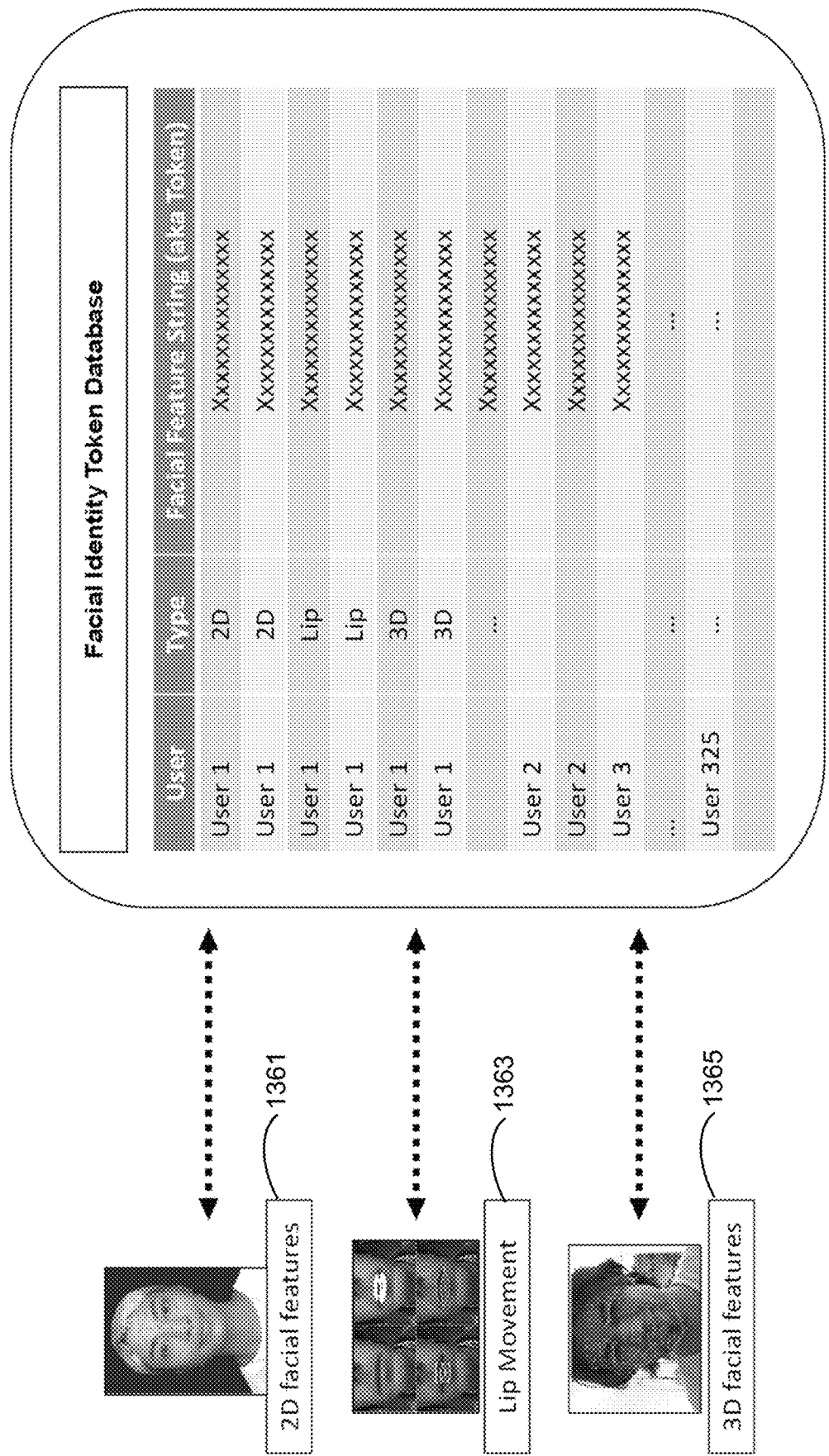
FIG. 20 shows an example facial identity token database of a facial recognition system, according to some embodiments.

In some embodiments, if a user has already completed initial registration, and is at a POS with depth camera, the system may perform the following steps:
1. The system will validate that it's a person based the depth component of the depth video
2. The system checks the video taken by the depth camera and compares it to the fully-registered 3D facial depth identity token stored
3. (Optional)—Lip movement verification or OTP
4. Upon successful recognition, payment goes through
5. the successfully recognized 3D facial depth identity token are saved in the database for future use In some embodiments, if a user is conducting eCommerce transactions without a depth camera, (e.g. the user may be using a laptop or a tablet to make a payment using facial recognition) the system may perform the following steps:
1. After checkout, the system will record a video of and provide words for the user to say out loud
2. The system will check the video taken as well as track the lip movements and determine if the lip movements match the words provided
3. (Optional)—OTP
4. Upon successful recognition, payment goes through
5. The successfully recognized 2D facial depth identity and lip movement tokens are saved in the database for future use FIG. 20 shows an example facial identity token database 1360 of a facial recognition system, according to some embodiments.

The database may store 2D facial features 1361, lip movements 1363 and 3D facial features 1365. At registration via mobile devices or the first time using a depth camera, the extracted facial features (2D and/or 3D) or lip movements associated with specific phonemes may be converted into a string and recorded in the database under the user.

At a POS with a depth camera or during eCommerce via a non-depth camera, the extracted facial features may be again converted into a string and a lookup of the facial identity token database is initiated to find the matching user. The matched user may have an attached payment token that is used to initiate a payment transaction.

In some embodiments, some or all of the facial recognition feature strings may be encrypted using a hardware security module.

FIG. 21 shows an example GAN neutral network algorithm 1350 implemented as part of a facial recognition system, according to some embodiments.

GAN 1352 is a deep learning algorithm that may be trained to upscale the frames of a video. Advantages of GANs include, for example, low bandwidth usage, minimal or no lag or interruptions, and better image reconstructions.

In some embodiments, a browser plugin that can use the algorithm to generate and render a better quality video. The image and video quality of offline samples may be enhanced by implementation of GANs within the facial recognition system. Runtime video may also be enhanced in a GPU accelerated environment. (e.g., ATMs). Human tracking and human-object interaction may be implemented in these enhanced videos. (e.g., surveillance video logs from cameras and finding unusual activity).

Figure 22:
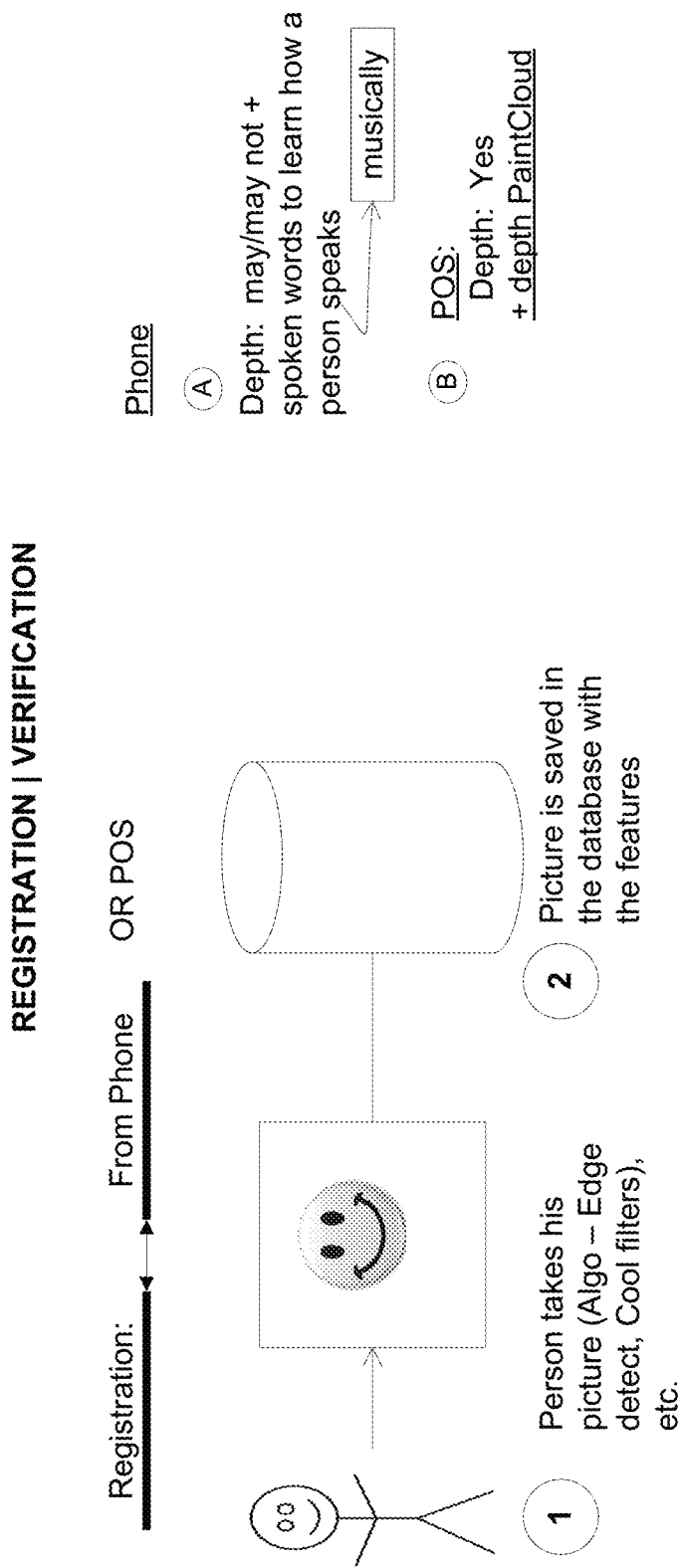
FIG. 22 shows an example registration process using the example facial recognition system, according to some embodiments.

FIG. 22, similar to FIG. 2, shows an example registration process using the example facial recognition system, in accordance with one embodiment.

Figure 23:
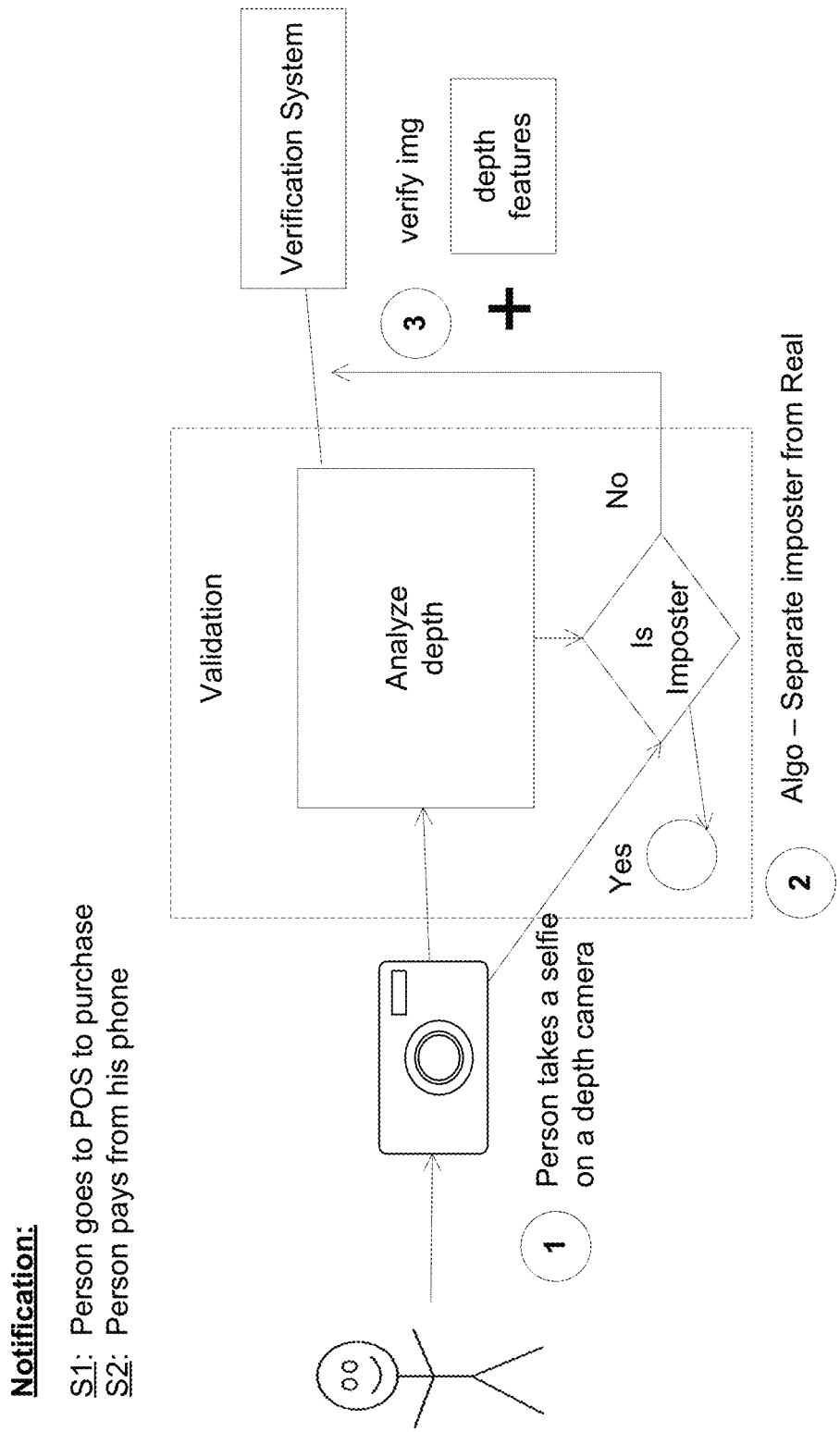
FIG. 23 shows an example user verification process using the example facial recognition system, according to some embodiments.

FIG. 23, similar to FIG. 3, shows an example user verification process using the example facial recognition system, in accordance with one embodiment.

Figure 24:
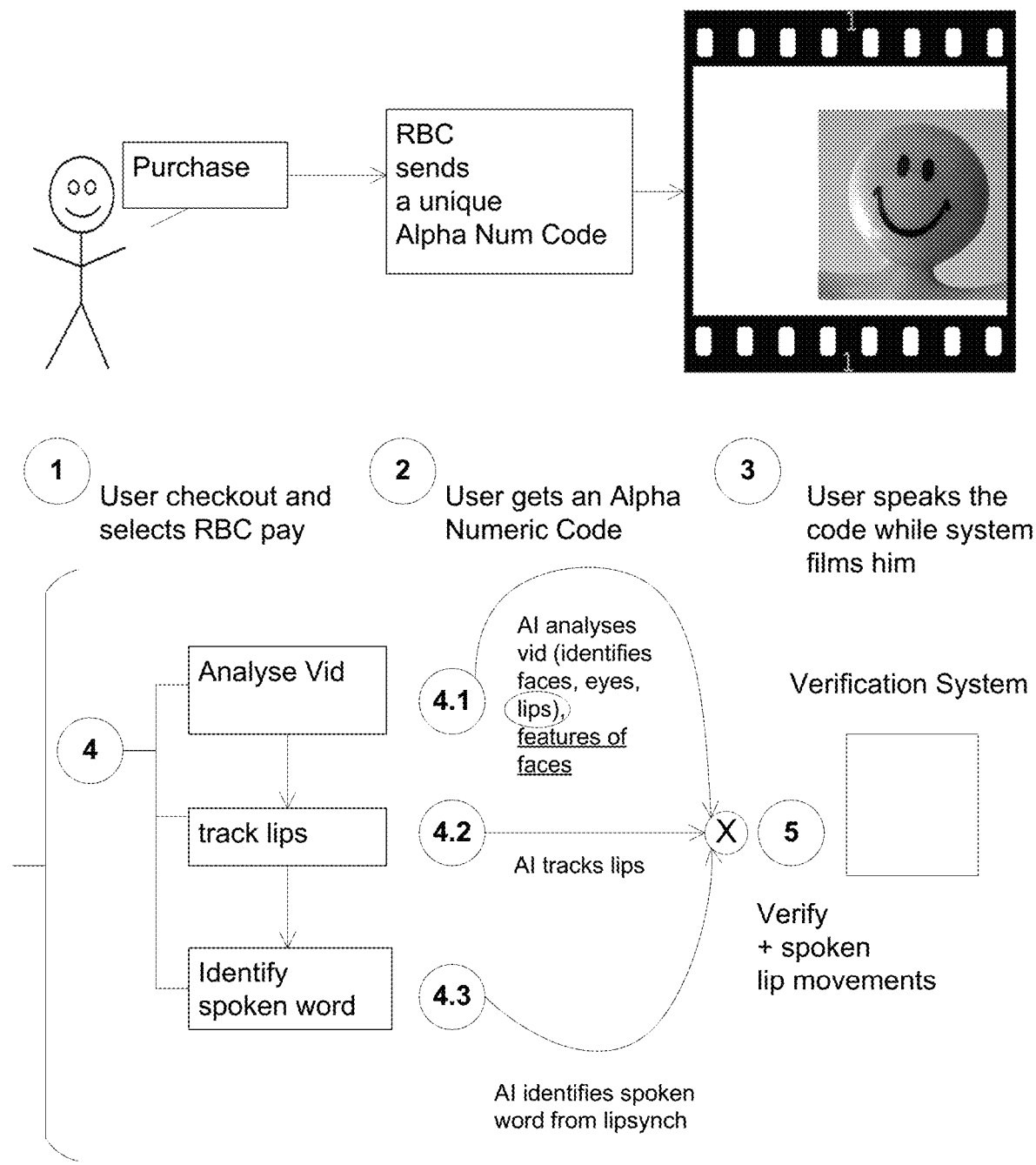
FIG. 24 shows another example user verification process using the example facial recognition system, according to some embodiments.

FIG. 24, similar to FIG. 4, shows an another example user verification process using the example facial recognition system, in accordance with one embodiment.

Figure 25:
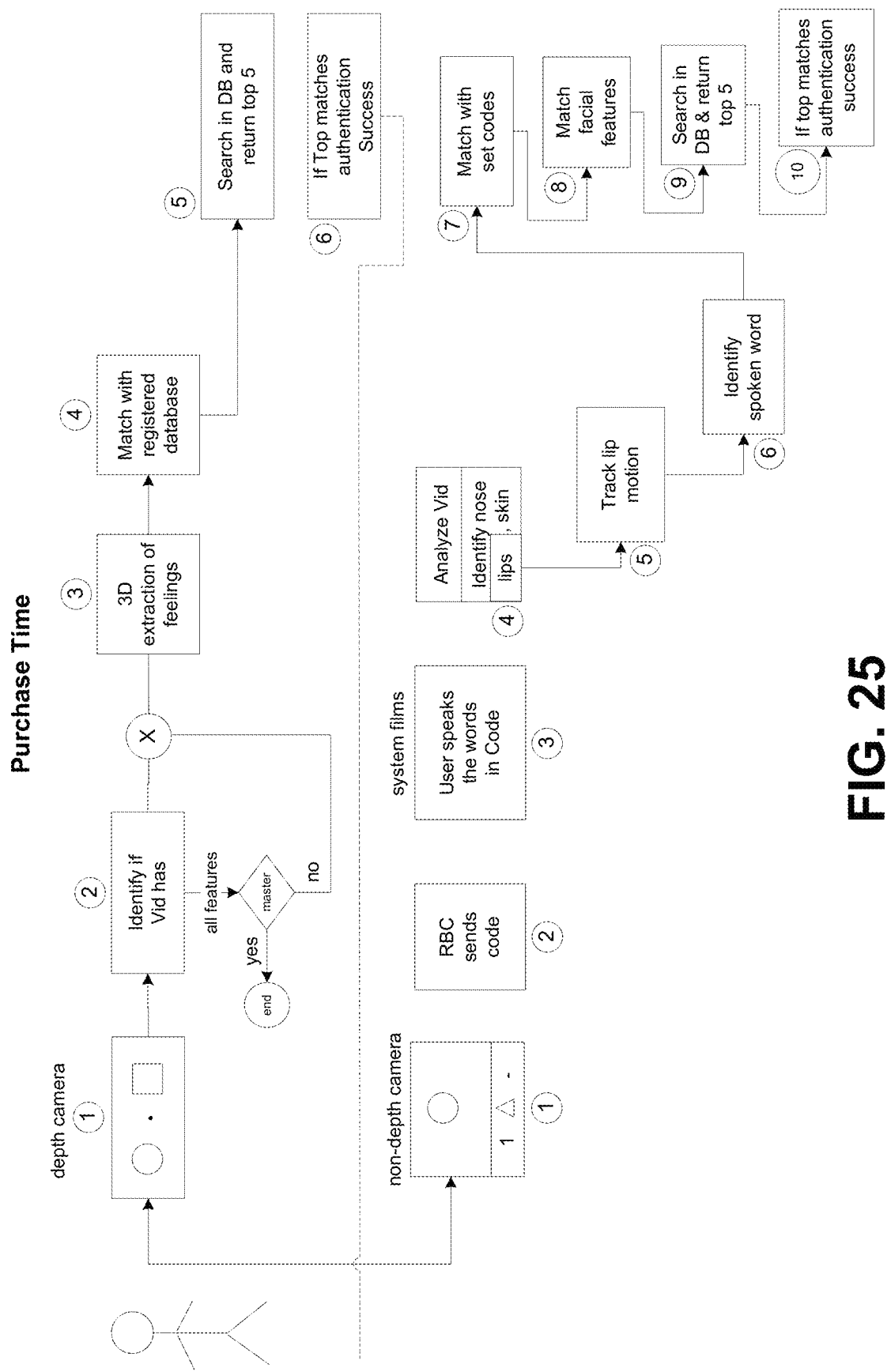
FIG. 25 shows another example process for user registration and verification, according to some embodiments.

FIG. 25, similar to FIG. 5, shows an additional example process for user verification, in accordance with one embodiment.

Usage Examples

A series of different implementation use cases are described in accordance with the method diagrams of FIGS. 34-37.

These examples are provided as non-limiting examples, and describe how aspects described in various embodiments herein operate in concert to implement practical devices that are utilized in regard to authentication using secure tokens.

The authentication utilizes multiple technologies to implement an improved authentication process where an individual's personal information is encapsulated into transformed digitally signed tokens, which can then be stored in a secure data storage (e.g., a "personal information bank") 108.

The digitally signed tokens can include blended characteristics of the individual (e.g., 2D/3D facial representation, speech patterns) obtained, for example, from a video processing unit 111, a facial recognition unit 117, etc. that are combined with digital signatures obtained from cryptographic keys (e.g., private keys) associated with corroborating trusted entities (e.g., a government, a bank) or organizations of which the individual purports to be a member of (e.g., a dog-walking service).

A separate secure data storage 109 can store a private key associated with the individual on the individual's mobile device 100, which is utilized with a paired public key for validating and signing tokens that are provided from the mobile device 100.

The digital signatures stored on data storage 108, for example, can then be used for validation against public keys associated with the corroborating trusted entities or the organizations of which the individual purports to be a member of (e.g., banks, hospitals, governmental organizations). In some embodiments, devices that are interoperating with the mobile device 100, such as door lock controllers, bike rental terminals, etc., may store a series of public keys on local memory such that the public keys can be used to validate signatures from the corroborating trusted entities. For example, the bike rental terminals can store the public keys of a bank which can then be used to establish veracity of tokens provided by mobile device 100, in accordance with embodiments described herein.

The secure data storage storing the digitally signed tokens can, for example, be resident or coupled with a mobile computing device of the individual, such that when one or more data sets representing one or more biometric verification credentials are received, for example, from a 2D facial picture from a camera of mobile device 100, or challenge words spoken on a recorded audio file captured on a microphone of mobile device 100, the data subset representing a constrained set of features identifying an individual can be extracted. The size of the constrained set of features may be modified, for example, to modify levels of security or to ensure ease of processing where computing resources are limited (e.g., a slow mobile device).

The constrained set of features can be used for a one-way transformation (e.g., based on a cryptographic hash) in combination with one or more cryptographic keys to generate a digitally signed token, and the digitally signed token can be stored in a data storage 108 resident on the mobile computing device (e.g., a secure enclave or accessible only through a set of secure processing components and/or pathways).

The digitally signed token, when processed by a third party computing device, such as a bike rental terminal, a door lock, indicates that one or more characteristics of the individual are verified in accordance with one or more parties associated with each cryptographic key of the one or more cryptographic keys, and in some embodiments, the digitally signed token can be compared against captured information by the third party computing device to assess veracity as between the captured information and the digitally signed token.

The comparison and provisioning of the digitally signed token may be using the U-Prove mechanism, in some embodiments. Other types of analyses are possible, and U-Prove is preferred in some embodiments as the token does not need to be transmitted back to a central authority.

For example, a facial recognition scanner can be provided in the context of a bike-sharing or a smart door lock, which takes a picture or a 3D representation of a face of the individual.

This picture or the 3D representation is converted into a feature representation. The individual then utilizes the mobile device to adduce the digitally signed token as a "deposit token", which is then received in relation to a challenge request mapping the picture or a 3D representation of a face of the individual against the available characteristics of the digitally signed token.

FIG. 34 is an example method diagram of an enrollment example, according to some embodiments.

In this example, the enrolment includes a "basic enrolment" that may be suitable for convenient, low security tokens, for example, providing access to a gym. A mobile application resident on mobile device 100 takes a picture of an individual's face, which is then processed on video processing unit 111 and an extraction is performed to, for example, extract a 256-dimension vector from the facial imprint.

Accordingly, the features are extracted and a token is generated, for example, signed using the private key stored on secure data storage 109. When the individual seeks access to the gym, the mobile device 100 can provide the token through a wireless transmission method and a corresponding terminal or scanner (e.g., a facial scanner) can take the token, compare it to a captured face, for example, using a neural network, and admit entry if a sufficiently high confidence score is achieved.

Additional security can include challenge words or phrases, which are also combined and blended into the token. Multiple tokens can be generated, directed to different aspects of the characteristics associated with the individual (e.g., device type "Android", has app "Minesweeper").

Figure 35:
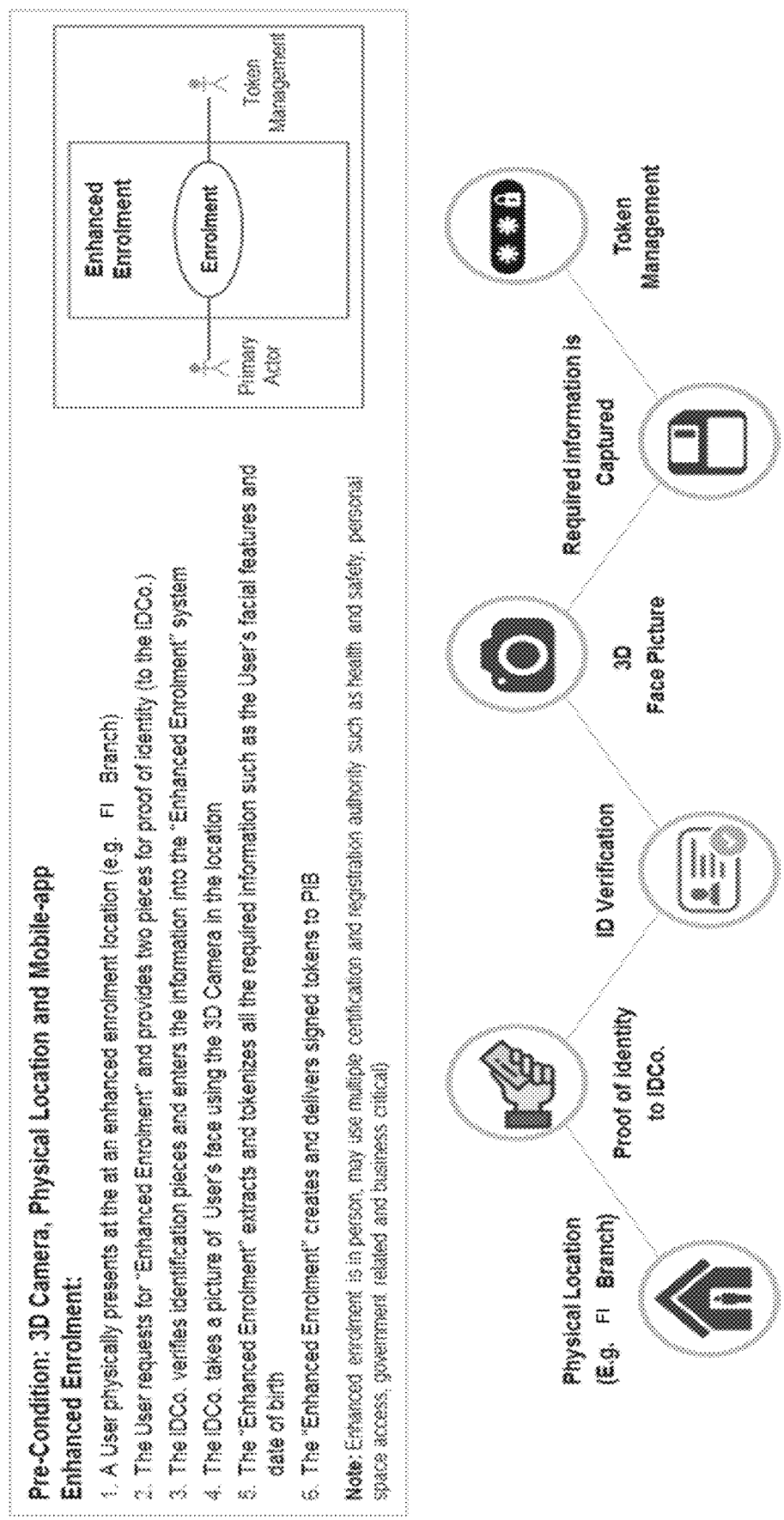
FIG. 35 is an example method diagram of an enhanced enrollment example, according to some embodiments.

FIG. 35 is an example method diagram of an enhanced enrollment example, according to some embodiments. In this example, the individual presents him/herself at a higher security location (virtual or physical) and provides proof of identity. The identifier reviews the identification and based, for example, on a picture taken at the location, a token is generated and stored in the personal information bank (e.g., 108).

The token is signed with one or both of the corroborating entity's private key and/or the individual's private key on secure data storage 109. The token can then be provided to other parties to validate characteristics of the individual, and a challenging entity can further validate the corroboration of the trusted entity through the use of the public key associated with the trusted entity. This is particularly, useful, for example, in relation to higher security enrollments, such as health and safety, personal space access, and government/business critical functions.

The trusted entity can also track other information in tokens that are validated by the trusted entity, such as validating whether the individual is of drinking age, an income level associated with the individual (e.g., has >$5K USD per year in income), whether the individual has car insurance and/or how long the car insurance is valid for, etc. These tokens may include only the information that is necessary for meeting a validation challenge, as opposed to providing other information, such as policy numbers, an actual age, etc. The token can also be used to validate aspects of the individual, such as speech patterns, that a particular face template corresponds to the picture taken at the trusted facility, etc. For validation and to meet a challenge request, the individual may select (or the mobile device 100 may select) a subset of tokens that together meet the challenge request (as opposed to providing all tokens).

Figure 36:
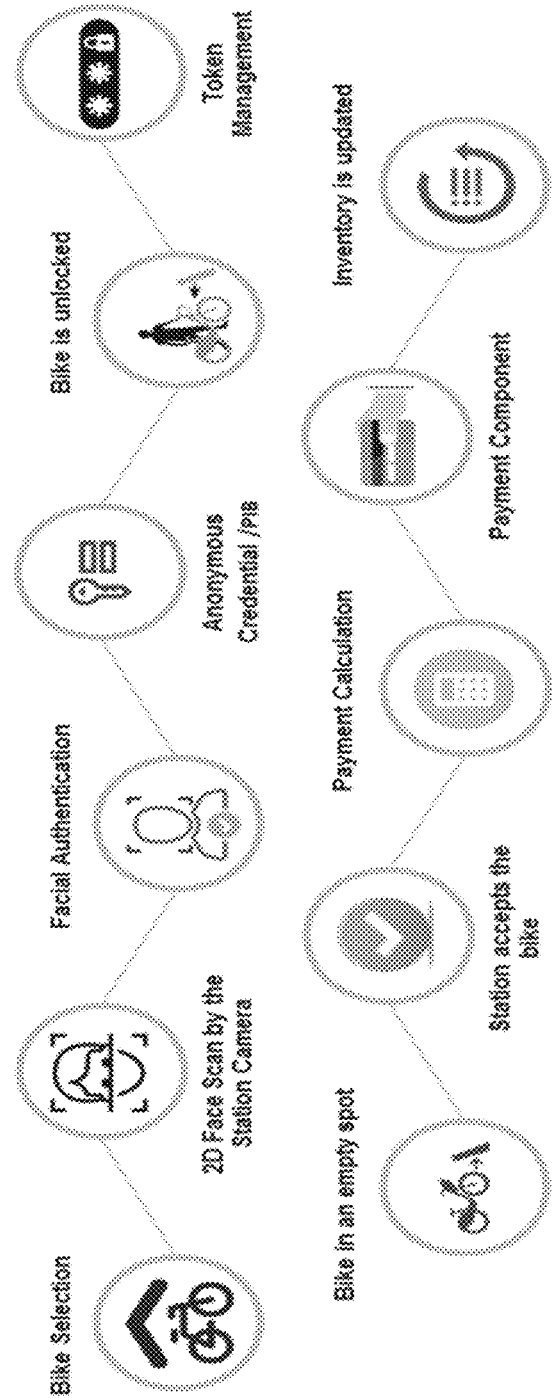
FIG. 36 is an example method diagram of a touchless rental bike example, according to some embodiments.
Figure 37:
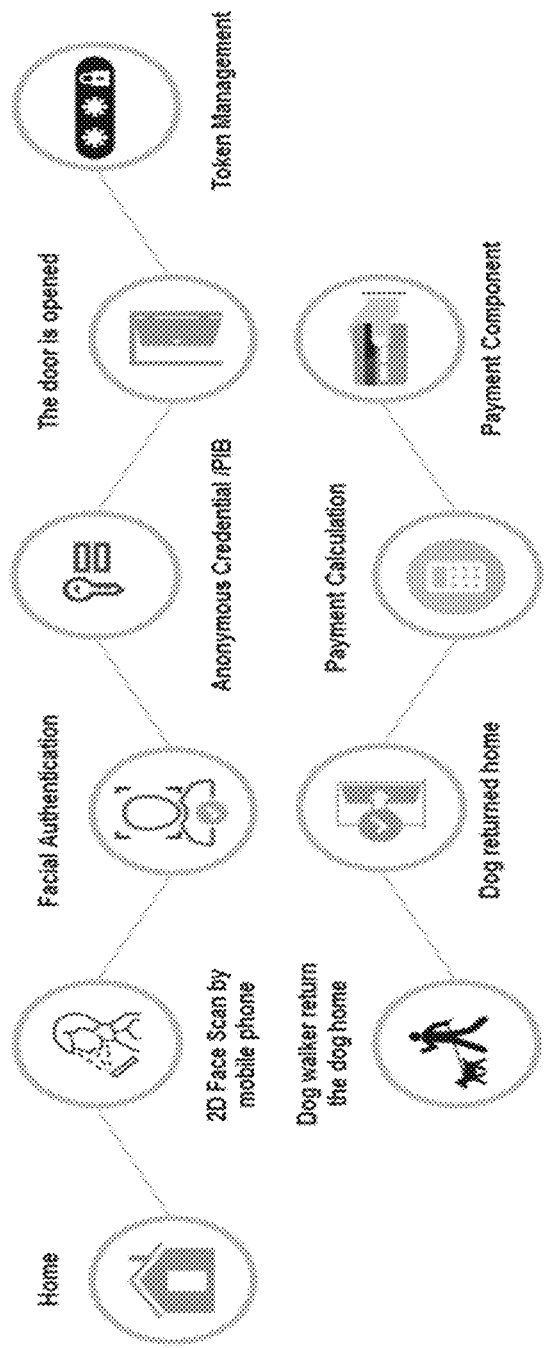
FIG. 37 is an example method diagram of a service provisioning example, according to some embodiments.

FIGS. 36 and 37 are directed to examples where the token is used for commercial transactions.

In these examples, if the third party device is satisfied that the captured picture or a 3D representation of a face of the individual is corroborated by the available characteristics of the digitally signed token, the third party device may then provision access (e.g., unlock a bicycle or unlock a door).

FIG. 36 is an example method diagram of a touchless rental bike example, according to some embodiments.

In this example, a bike is selected at a station, and the station may have a terminal having a station camera. The face of the renter is scanned, and the token is provided for verification by the terminal (e.g., through a request process where a request screen is prompted and an affirmative action causes the mobile device 100 to provision one or more tokens). The verification allows the terminal to assess that the individual is indeed present at the location prior to starting the bike rental, and other tokens or other aspects can also be validated. For example, the bike rental may require that the person has a signed token signed either by the bike rental company (e.g., Bikes-r-us signed your token so it can correspond to a valid account), or a financial institution that indicates that the individual has insurance and has an income>5K USD/year so that a damage deposit can be waived.

A new tracking token may be generated that tracks when an access was provisioned, and in response to a signal indicating an event at a future time (e.g., when bicycle was returned), the new tracking token may be used to process a financial transaction in relation to the event (e.g., pay for the bike rental for a duration of time).

FIG. 37 is an example method diagram of a service provisioning example, according to some embodiments. The service being provided is an example dog-walking service. In this example, similarly, the face of the dog walker is scanned, and the token is provided for verification by the terminal. The verification allows the terminal to assess that the individual is indeed present at the location prior to starting the dog walking, and further, a public key can be compared against to ensure that the dog walker is employed by a dog walking company. Location tracking can further be corroborated against GPS coordinates, QR codes provided on a door, etc.

When access is provisioned by unlocking the door, the dog walking transaction begins and similarly, a new tracking token may be generated that tracks when an access was provisioned, and in response to a signal indicating an event at a future time (e.g., when dog was returned), the new tracking token may be used to process a financial transaction in relation to the event (e.g., transfer funds to the dog walker or mark the transaction complete so the dog walker is paid).

Figure 38:
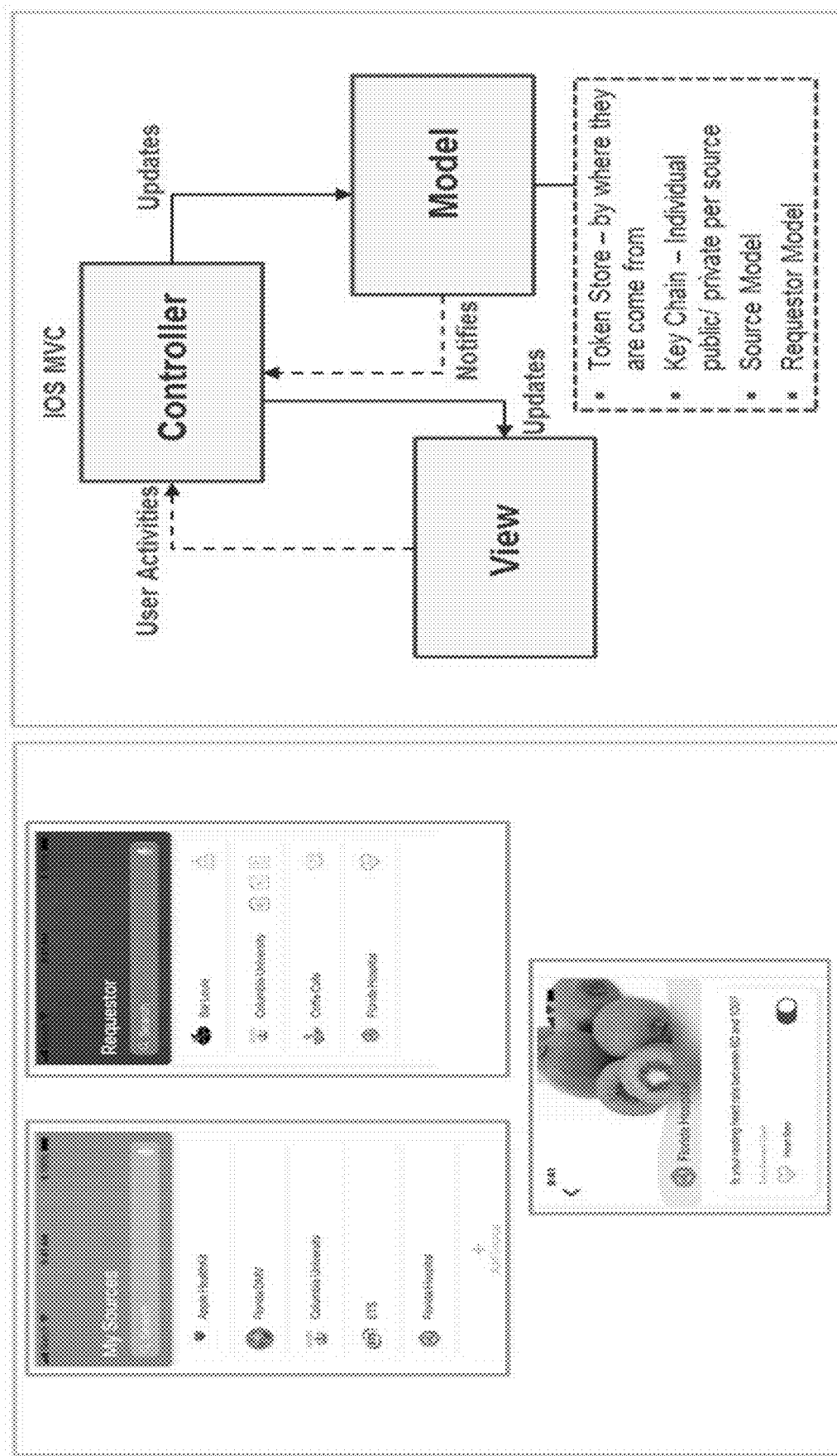
FIG. 38 is an example architecture for controlling a user interface, according to some embodiments.

FIG. 38 is an example architecture showing a model-view-controller that is used as a framework for controlling a user interface on mobile device 100 for interacting with requestors for the token. In particular, the controller interacts with user interface elements present on device 100 to determine which tokens or which aspects of tokens to present. The controller of the architecture of FIG. 38 controls interfaces, for example, provided in FIGS. 39-54.

FIGS. 39-54 are screenshots showing example interfaces screens on a mobile device in accordance with a series of interactions whereby the digitally signed tokens are utilized in validating characteristics of the individual, according to some embodiments.

Figure 39:
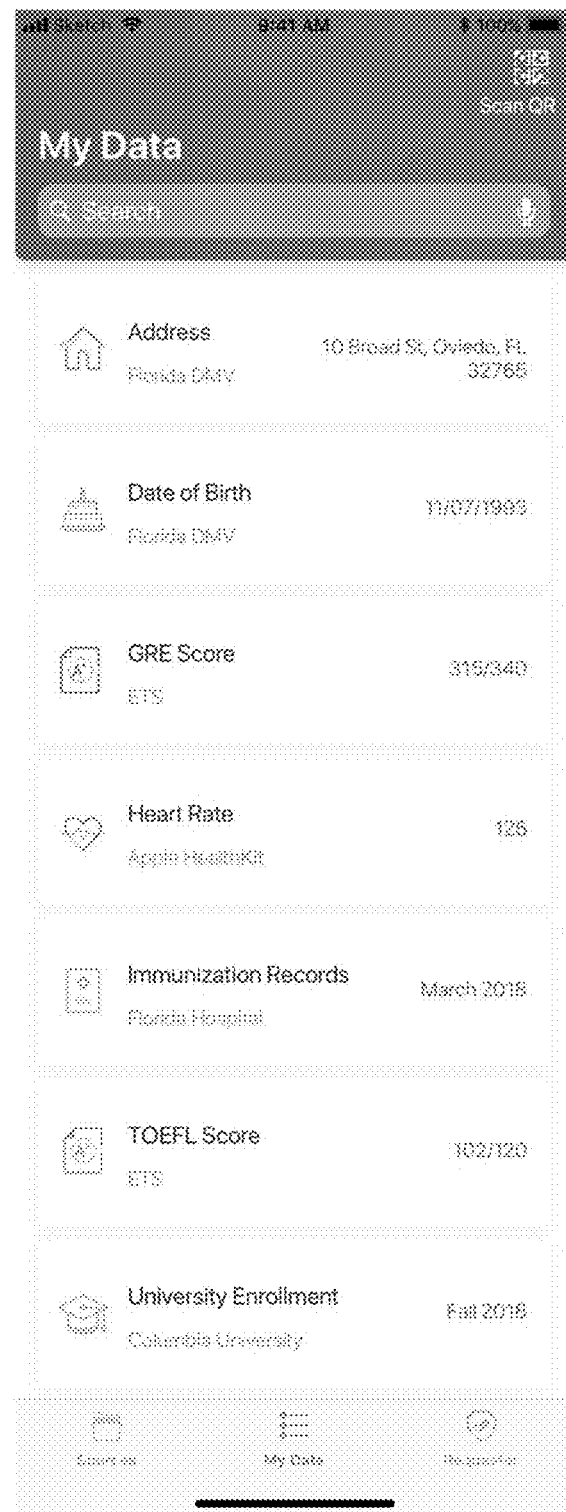
FIGS. 39-54 are screenshots showing example interfaces screens on a mobile device in accordance with a series of interactions whereby the digitally signed tokens are utilized in validating characteristics of the individual, according to some embodiments.

FIG. 39 is a screenshot showing a screen of available data elements that can be stored on a user's portable device.

Figure 40:
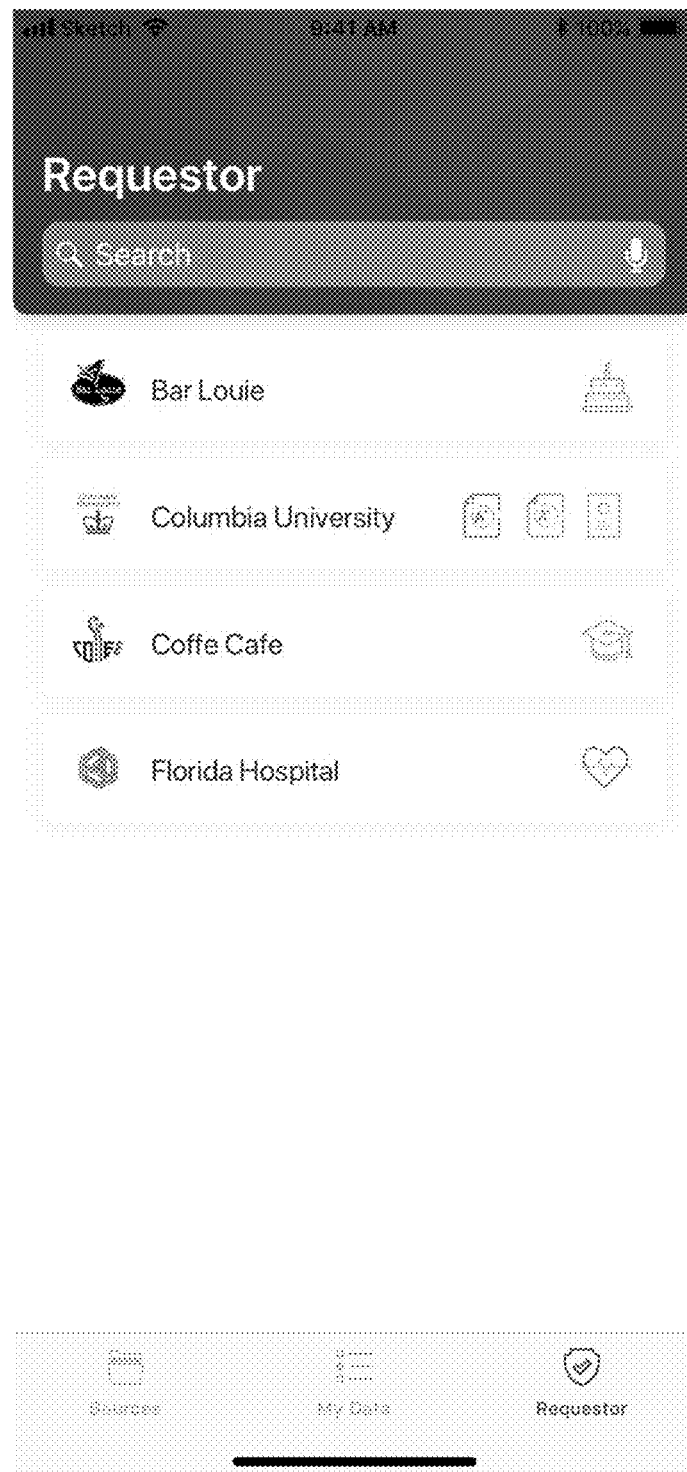

FIG. 40 is a screenshot showing a screen indicating various credential requestor parties.

Figure 41:

FIG. 41 is a screenshot of a quick response (QR code) that can be used for interacting with a computing device of the credential requestor parties.

Figure 42:
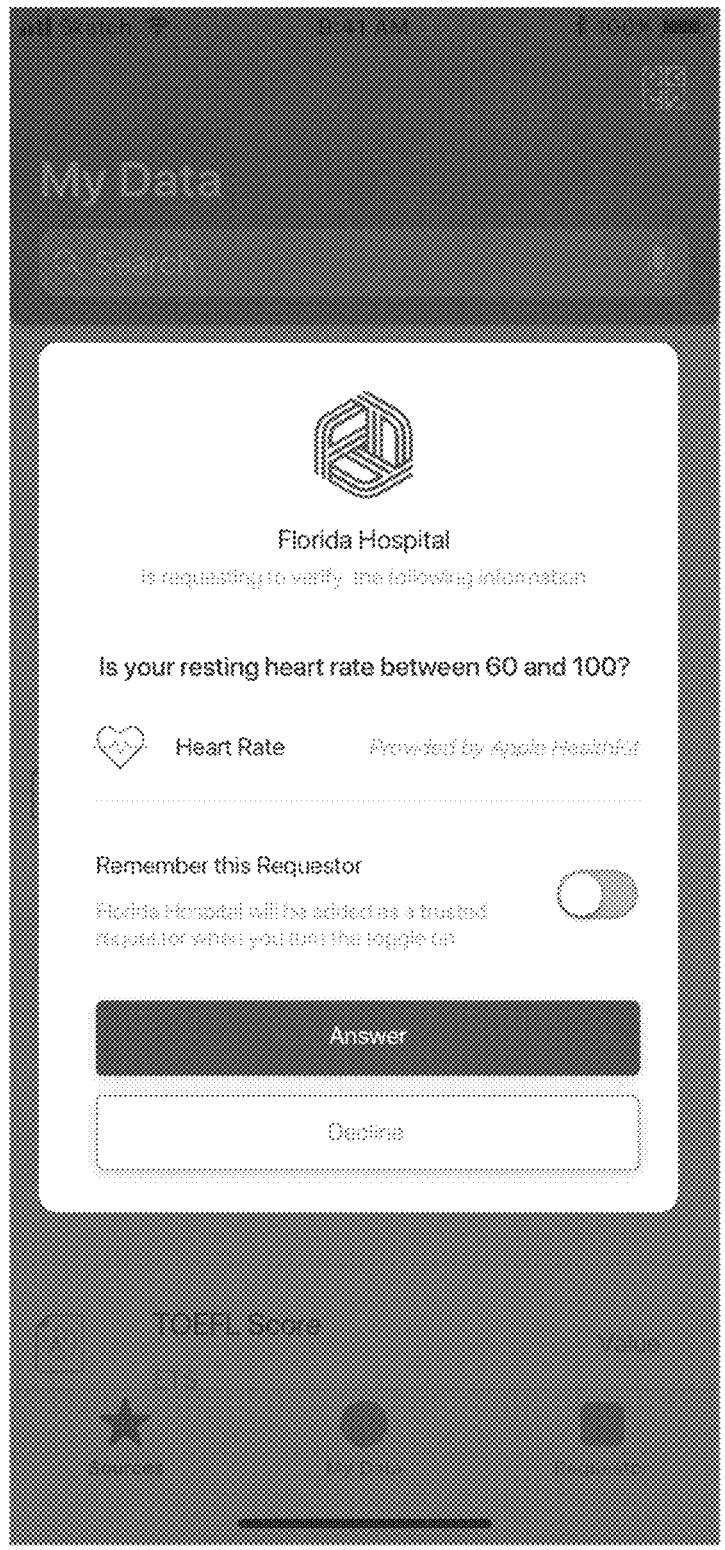

FIG. 42 is a screenshot of a requestor page indicating the type of information being requested.

Figure 43:
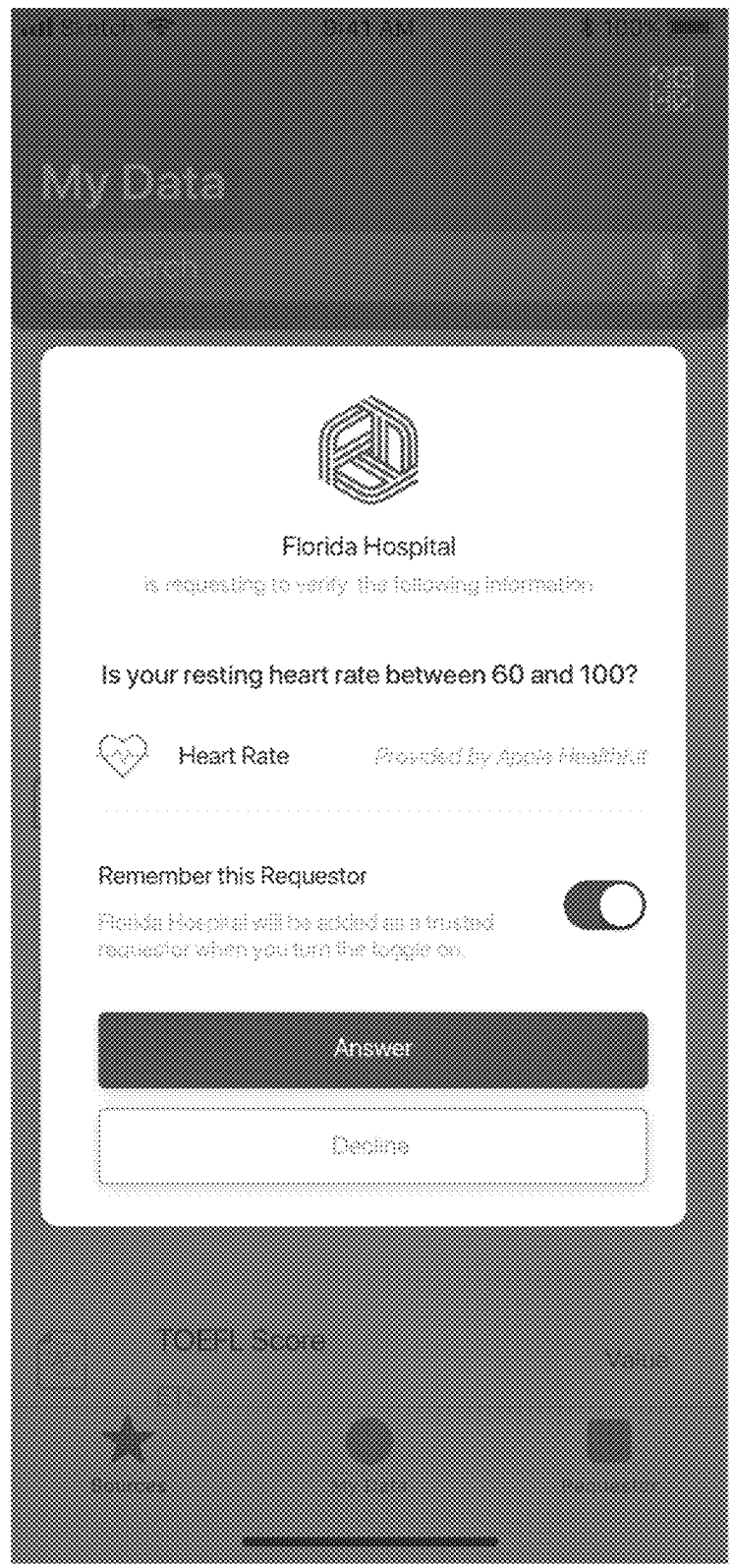

FIG. 43 is a screenshot of a requestor page indicating the type of information being requested, showing a toggle bar widget element being selected.

Figure 44:
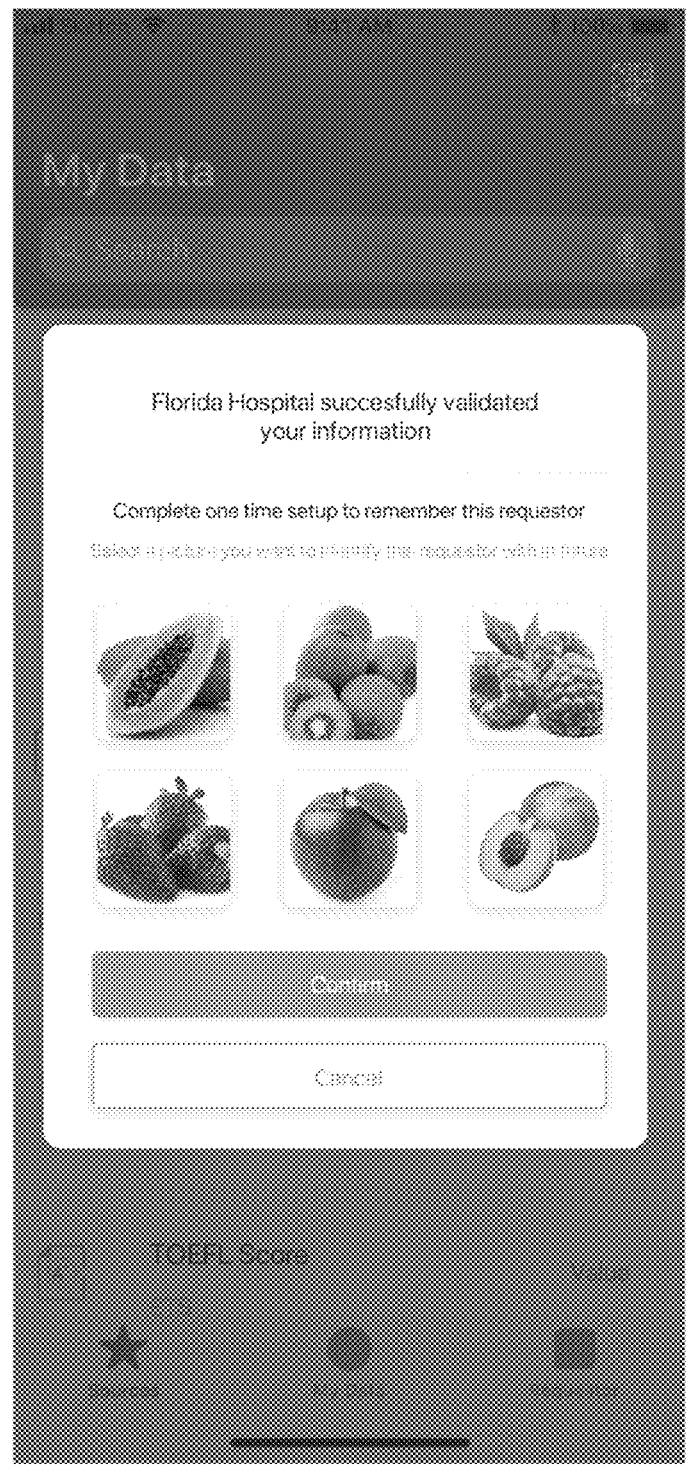

FIG. 44 is a screenshot of a page indicating that a requestor was able to validate information from the individual.

Figure 45:
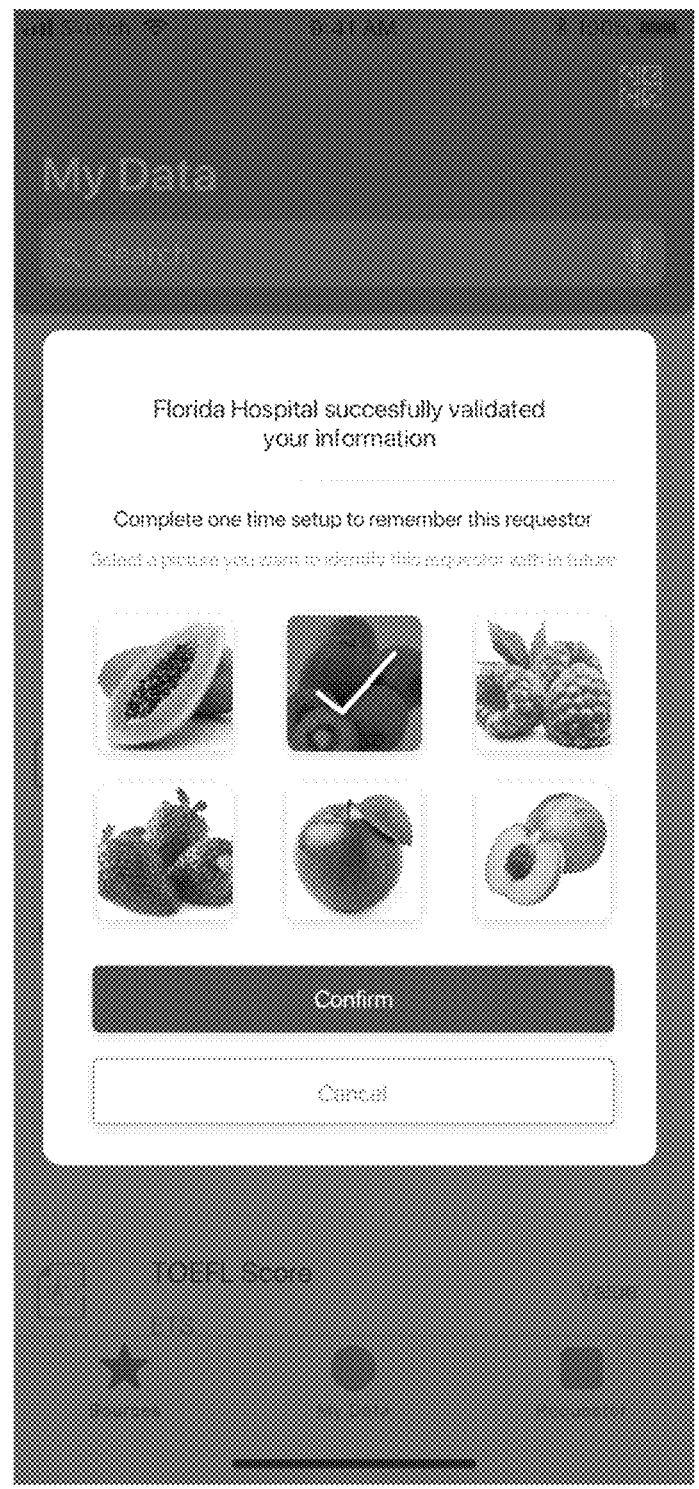

FIG. 45 is a screenshot of a page indicating that a requestor was able to validate information from the individual.

Figure 46:
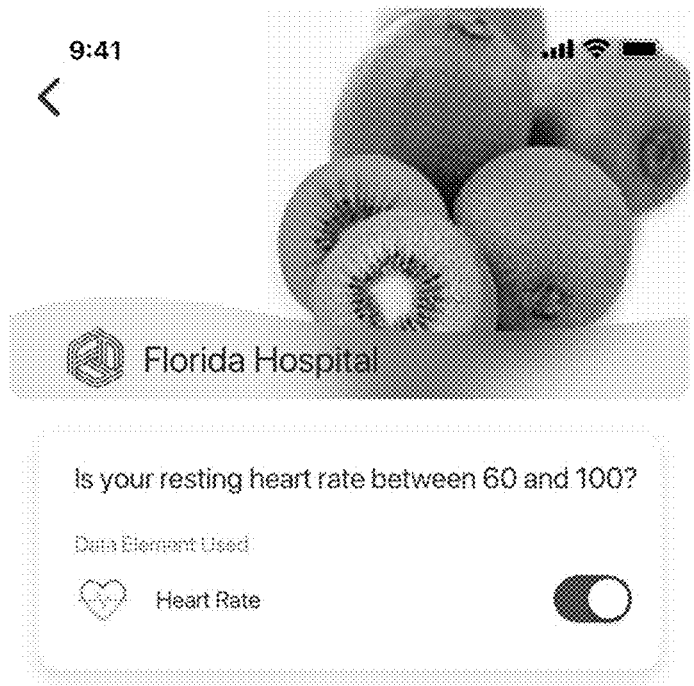

FIG. 46 is a screenshot of a page showing another request.

Figure 47:
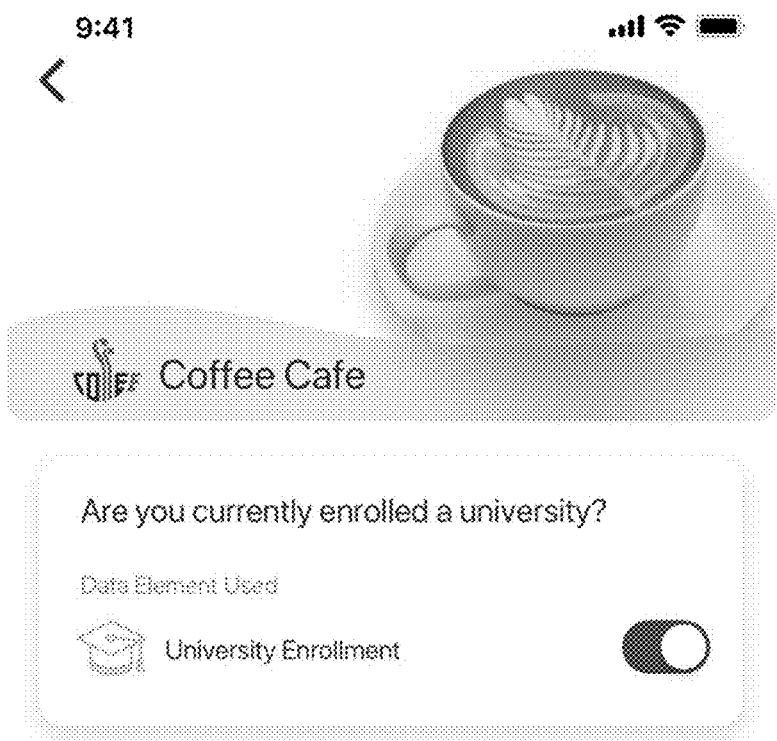

FIG. 47 is a screenshot of a page showing an alternate request.

Figure 48:
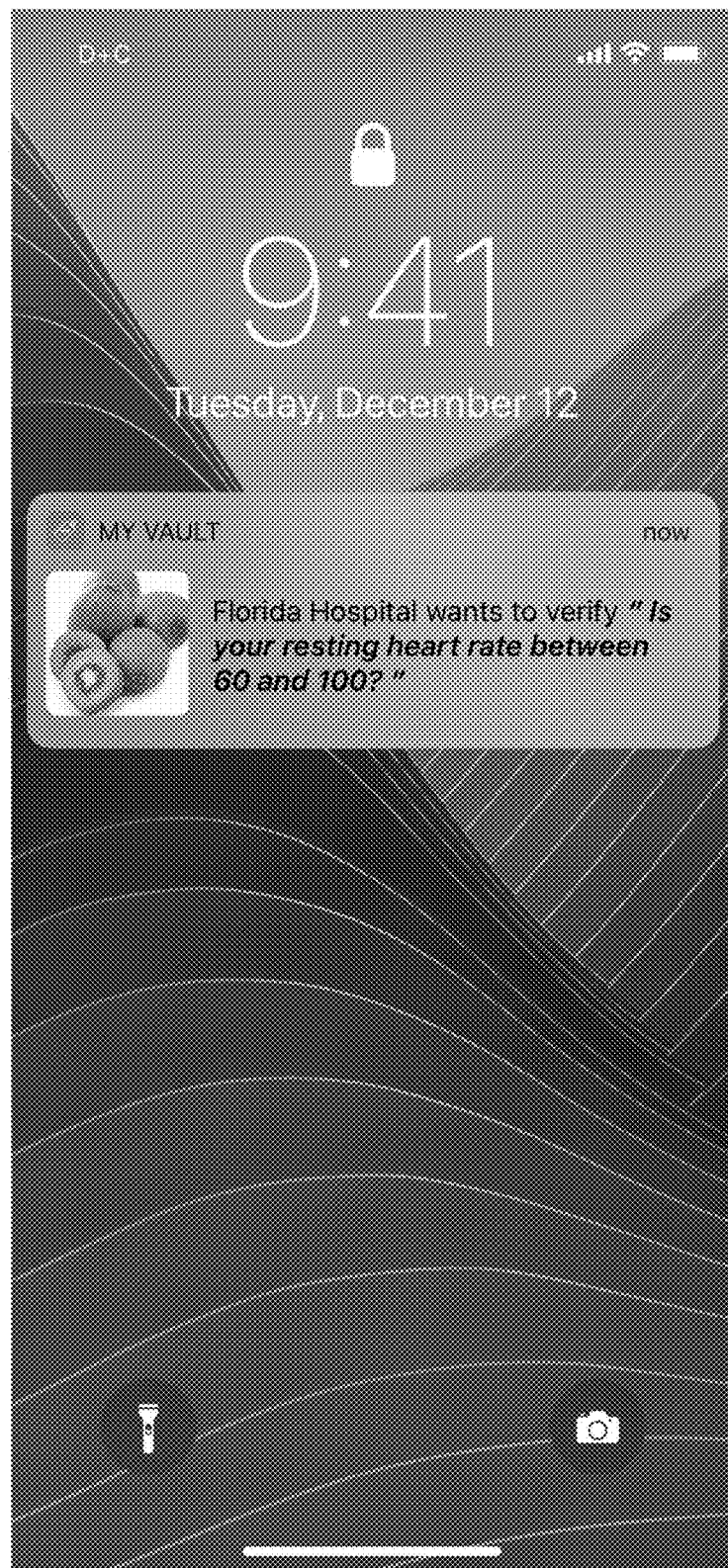

FIG. 48 is a screenshot of a page showing an alternate request.

Figure 49:
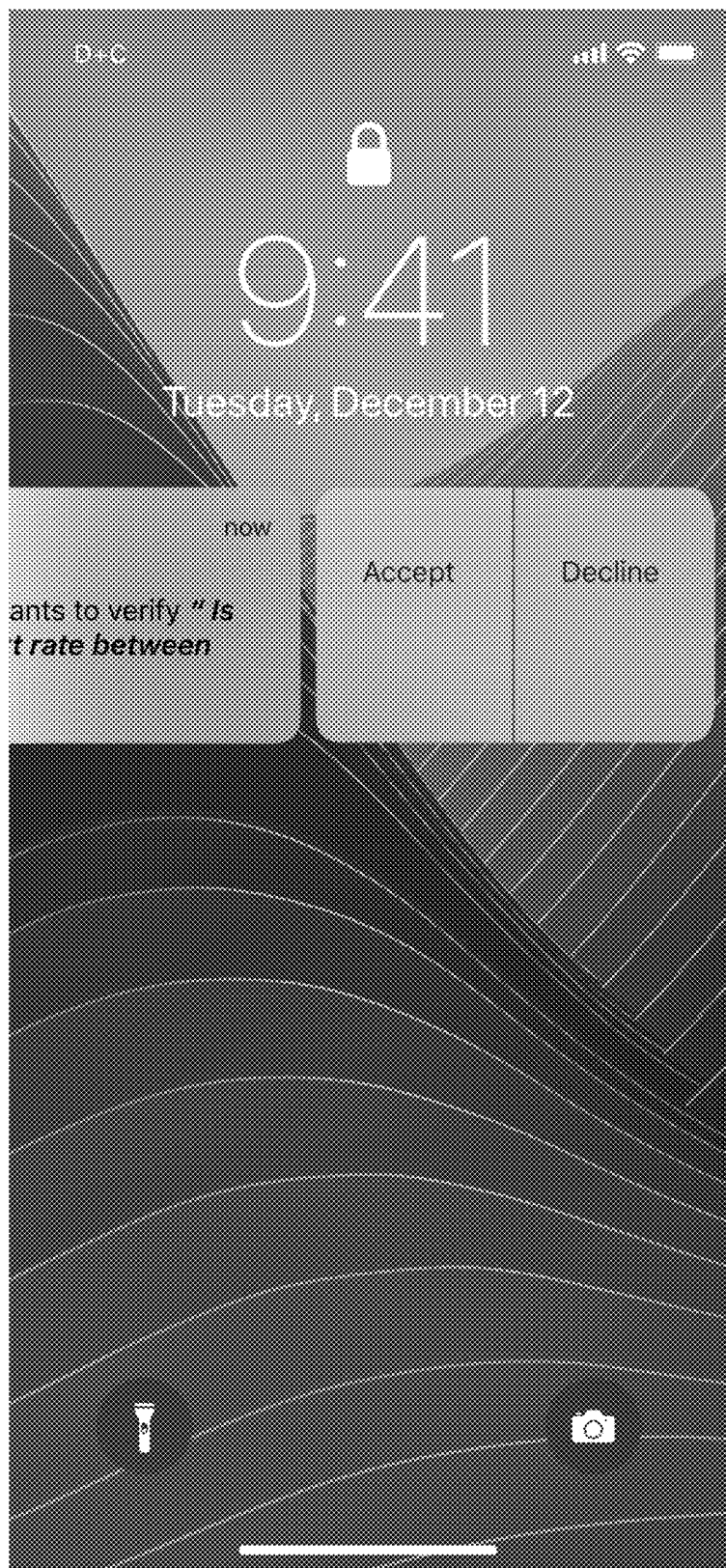

FIG. 49 is a screenshot of a page showing a widget for accepting or declining a request.

Figure 50:
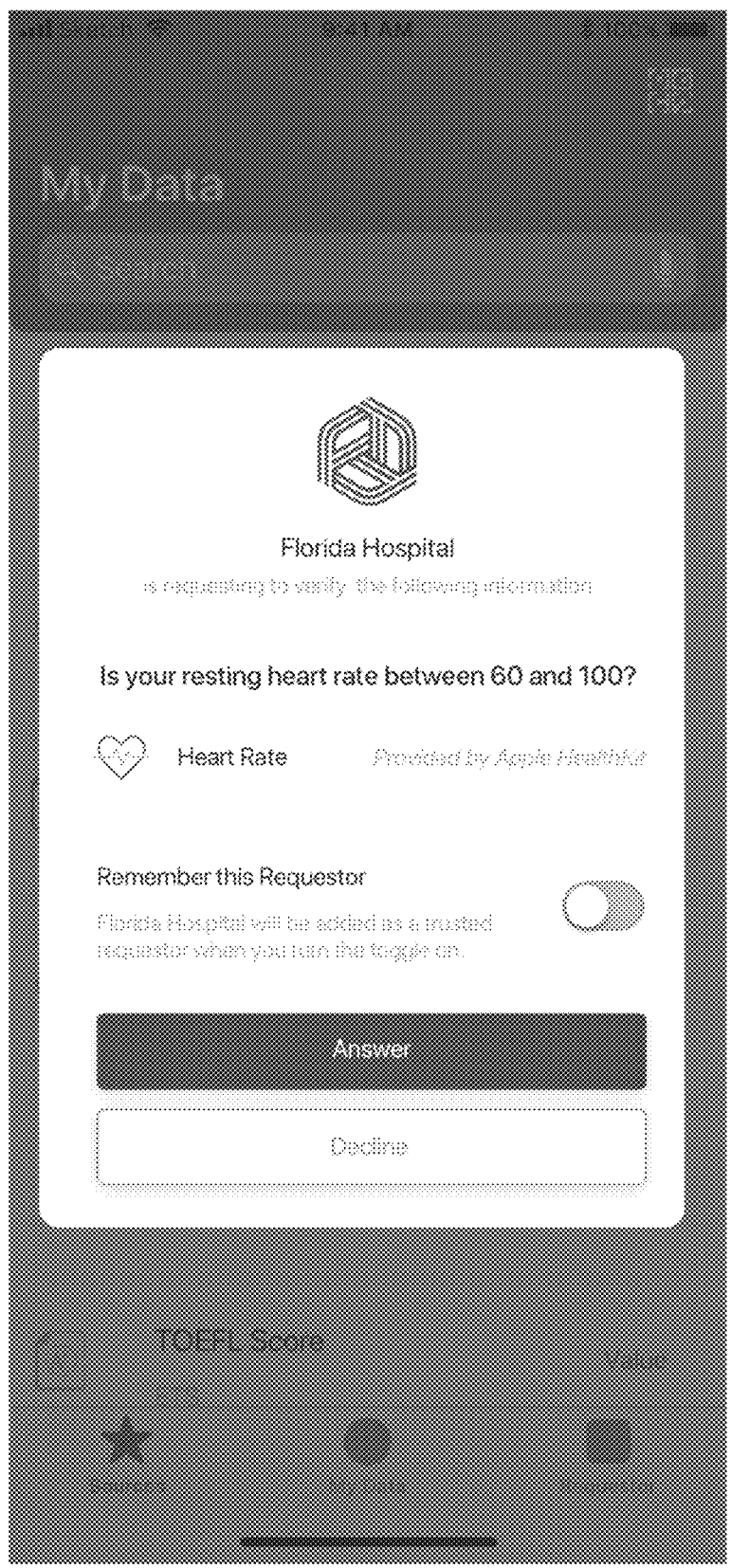

FIG. 50 is a screenshot of a page showing another request.

Figure 51:
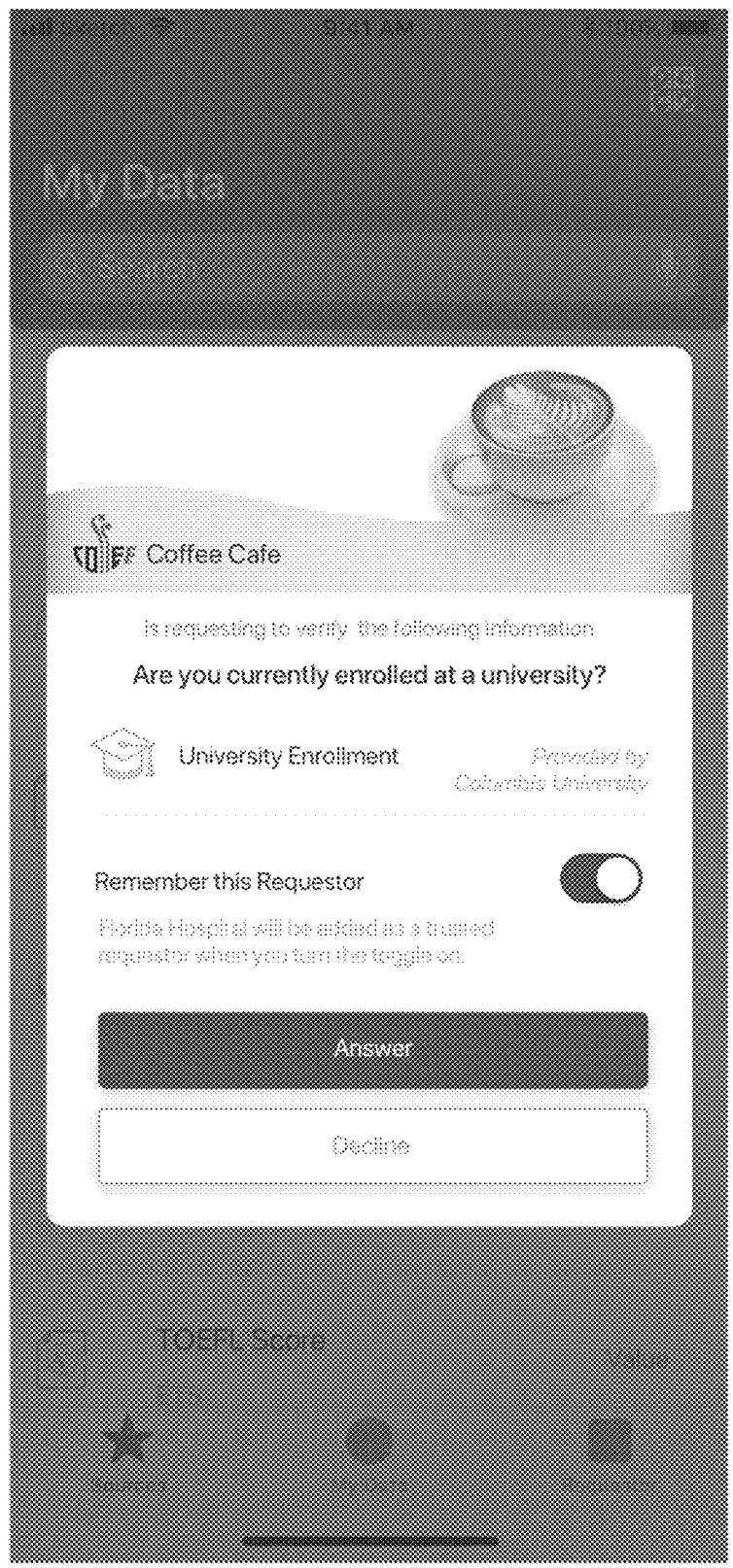

FIG. 51 is a screenshot of a page showing a request, that can be used, for example, to obtain a discount at the coffee shop.

Figure 52:
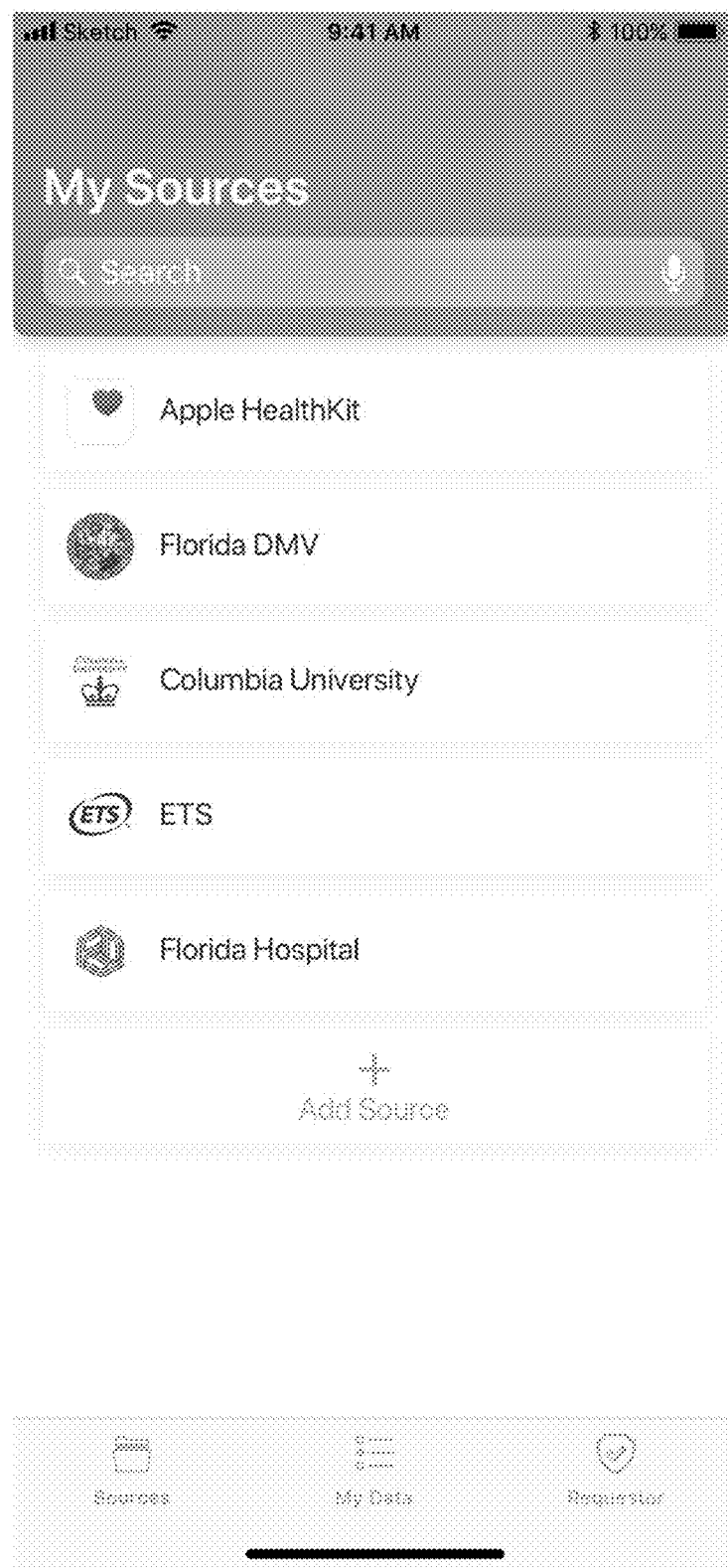

FIG. 52 is a screenshot showing sources of issuer identities.

Figure 53:
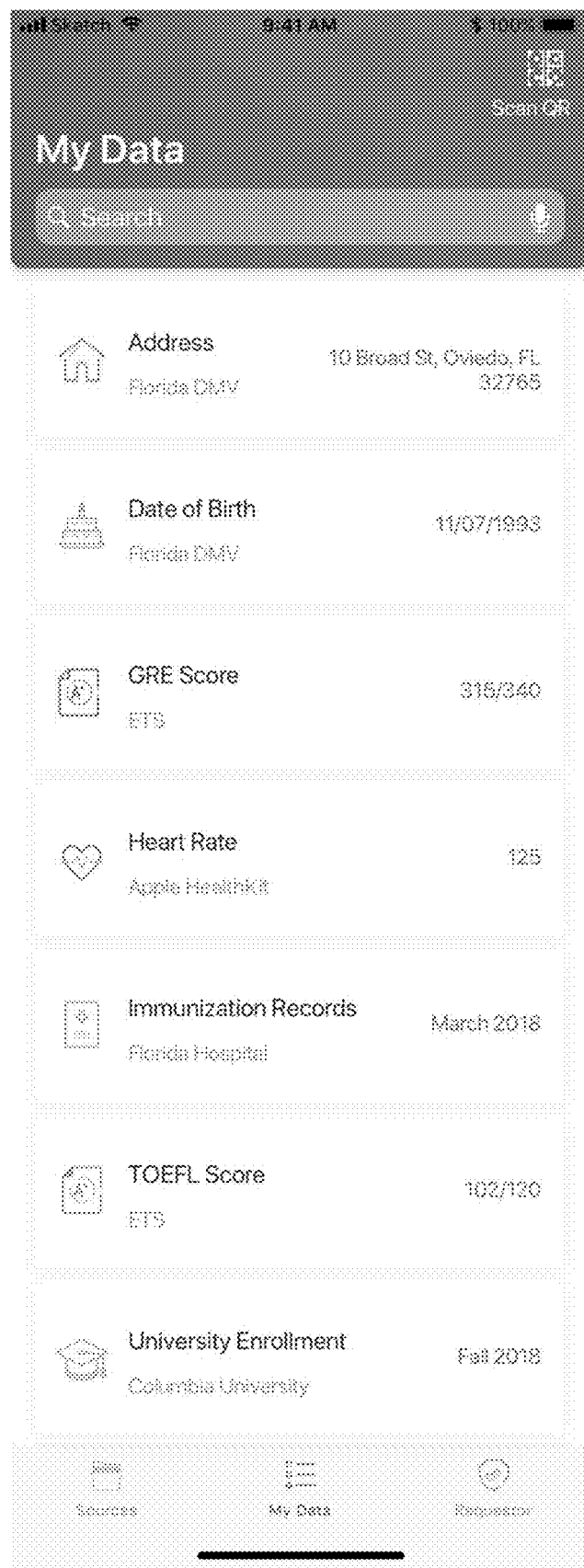

FIG. 53 is a screenshot showing a summary page of details.

Figure 54:
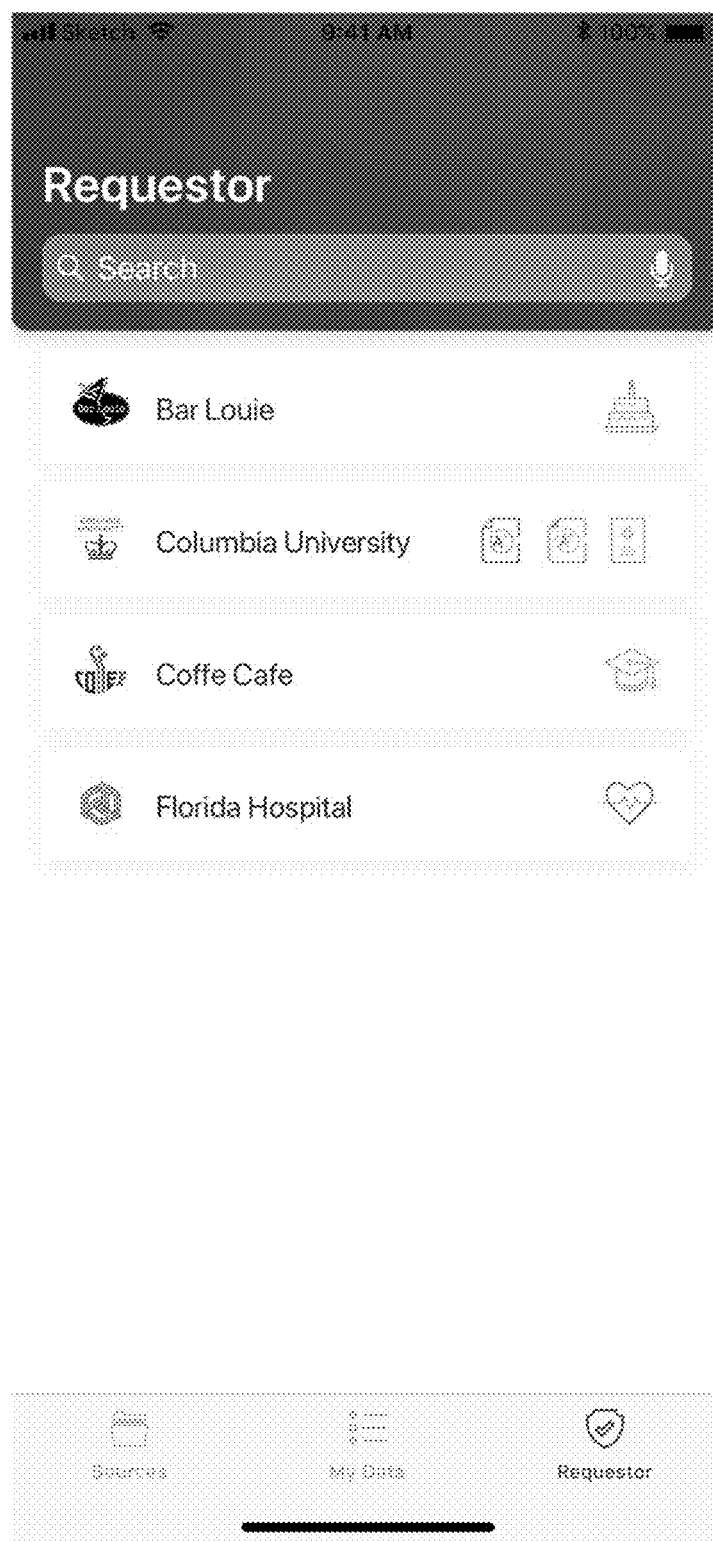

FIG. 54 is a screenshot showing a page having requestors and visual elements relating to specific types of information available.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

In some embodiments, one or more aspects of the tokenization and/or verification/validation processes described herein can involve one or more secure execution environments and/or secure storage elements. For example, in some embodiments, the storage of private keys and tokens, in addition to computations required for issuance and proofs, could be performed on Trusted Execution Environments, Smart Cards, Secure Elements or Trusted Platform Modules on devices such as mobile and personal computers using corresponding APIs.

In some embodiments, a computing system includes or is configured to provide a plurality of distinct execution environments. The isolation of these environments can be enforced using software or hardware. In some embodiments, a distinct execution environment can include one or more secure storage elements (for example, a Secure Element or one or more aspects of a Smart Card).

The distinct execution environments are, in some embodiments, configured to provide access to different storage and processing resources. In some embodiments, one of the environments may be referred to as a trusted execution environment (TEE) and may have access to isolated and secure storage and processing resources.

In some embodiments, a secure environment may support a distinct operating system, or it may be a set of secure resources accessible to applications that are assigned to use it by the underlying operating system of the overall system.

In some embodiments, a computing system includes a dedicated secure storage resource, such as a separate secure storage or a secure storage area within a multipurpose storage resource. In some embodiments, the computing system includes a dedicated secure memory device such as a separate secure memory, or a secure area within a multipurpose memory resource (e.g. secure memory may be accessible in a different address space or in a different address range).

These resources may be physically and/or logically distinct from the multipurpose resources of the same type. In a computing system that includes or is configured to provide two distinct execution environments, the first execution environment is a secure execution environment and the second execution environment is a potentially unsecure environment. The secure execution environment is sometimes referred to as a trusted execution environment (TEE) and the potentially unsecure environment is sometimes referred to as a rich execution environment (REE). The second execution environment (e.g. the potentially unsecure execution environment) is configured to communicate with the secure execution environment (e.g. the first execution environment) to request one or more aspects of the tokenization and/or verification/validation process to be performed.

The second execution environment includes an unsecure portion of a processor, memory, and storage. Software code of the second execution environment can include an unsecure OS which is stored in storage, loaded into memory at run time, and executed by processor to perform OS operations. In some embodiments, software executable by the second execution environment can include one or more APIs or other software components for providing function calls or otherwise interfacing with one or more components of the first execution environment.

For example, in some embodiments, the first (e.g. secure) execution environment can include (e.g. store) one or more keys such as root keys, private keys, and the like for generating signs tokens, validating one or more signed data elements, and/or the like. Some environment, first execution environment can include (e.g. store) one or more tokens against which one or more credentials or other data elements can be validated.

In some embodiments, first execution environment can include one or more software components including computer executable code for generating/issuing and/or validating one or more tokens, credentials and/or other data elements.

For example, in one example embodiment, a digitally signed token representing a verified identity or account can be stored as a secure storage element in a secure execution environment. A secure execution environment can include computer executable instructions which receive from an unsecure execution environment one or more data sets representing one or more biometric verification credentials.

The computer executable instructions and the secure execution environment can be configured to perform one or more calculations or data transformations to validate that the data sets representing the biometric verification credentials match or otherwise correspond to the digitally signed token as described herein or otherwise. In some embodiments, the data sets representing the one or more biometric verification credentials can be received at the device on which the secure execution environment resides and/or an external device in communication with the device in which the secure execution environment resides.

In some embodiments, secure execution environment can return one or more signals indicating whether the biometric verification credentials are valid or otherwise match the digitally signed token. Some environments, the signals can include one or more signed data elements to confirm the veracity of the signals.

In some embodiments, a secure execution environment can be used to generate a signed token. In some embodiments, a secure execution environment can receive from an unsecure execution environment one or more tokens and/or credentials. One or more software elements within the secure execution environment can generate a signed token and/or credential using one or more private keys stored within the secure execution environment. The signed token and/or credential can then be returned to the unsecure execution environment.

In some example scenarios, the signed token and/or credentials can be used by an unsecure execution environment (e.g. a door unlocking device) to verify the signed token with a corresponding public key.

Any other aspect of the tokenization and/or the validation process can be similarly applied to using these secure and unsecure execution environments to ensure that sensitive information such as keys, credentials, tokens, tokenization algorithms, biometric data, biometric processing algorithms, neural networks, and/or the like are only accessible by authorized users and/or processes.

In some embodiments, sensitive operations using a private key may be performed only in a secure area. In some embodiments, some additional or all operations maybe performed in a java card space of a smart card.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium.

For example, a server can include one or more computers operating as a web server, database server, or other type of computer server in a manner to fulfill described roles, responsibilities, or functions. The technical solution of embodiments may be in the form of a software product.

The software product may be stored in a non-volatile or non-transitory storage medium, which can be a CD-ROM, a USB flash disk, or a removable hard disk. The software product includes a number of instructions that enable a computer device (personal computer, server, or network device) to execute the methods provided by the embodiments. The embodiments described herein are implemented by physical computer hardware, including computing devices, servers, receivers, transmitters, processors, memory, displays, and networks. The embodiments described herein provide useful physical machines and particularly configured computer hardware arrangements. Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer system for authentication using secure tokens, the computer system comprising computer memory, and a processor configured to:
receive one or more data sets representing one or more biometric verification credentials including at least image sets storing a facial representation of an individual having a set of features identifying the individual;
transform the set of features in combination with one or more cryptographic keys to generate a digitally signed token representing a model data architecture or parameters of the model data architecture trained on speech motions of the individual extracted from the one or more data sets; and
store the digitally signed token in a data storage resident on the mobile computing device;
wherein the digitally signed token, when processed by a third party computing device, indicates that one or more characteristics of the individual are verified by one or more parties associated with each cryptographic key of the one or more cryptographic keys; and
wherein the digitally signed token is adapted for processing against a challenge response data set representative of one or more response images representing an unverified individual speaking one or more response passphrases.

2. The system of claim 1, wherein the transformation includes combining the facial representation, the model data architecture or the weights of the model data architecture, and the one or more cryptographic keys into the digitally signed token;
wherein a processor of the third party computing device:
processes the digitally signed token against the challenge response data set; and
validates the challenge response data set against the facial representation and the model data architecture.

3. The system of claim 2, wherein the model data architecture is adapted to iteratively update, through modifying one or more weight values associated with one or more computing nodes, one or more transfer functions configured to minimize a loss function related to a false positive by using the speech motions of the individual as positive training examples and using reference speech motions of other individuals as negative training examples, the one or more trained transfer functions used to process the validate the challenge response data set.

4. The system of claim 3, wherein each of the one or more passphrases includes one or more passphrase phonemes; and
wherein the model data architecture includes a plurality of separate transfer functions, each corresponding to a separate passphrase phoneme, and each of the separate transfer functions generates intermediate outputs which are combined together to establish the output of the model data architecture.

5. The system of claim 4, wherein the one or more passphrases includes a plurality of passphrases, and the third party computing device randomly or pseudo-randomly selects which of the plurality of passphrases to present as a challenge string.

6. The system of claim 3, wherein the one or more image sets include depth values, and the speech motions of the individual are extracted from the one or more image data sets based a feature set including at least on at least one of: lateral and medial position coordinates of both eyes, lateral-position coordinates of lips, a forehead curvature, distances between an ear and the eyes, or a height of nose.

7. The system of claim 6, wherein the set of features is represented as a floating point latent vector extracted from raw image data, the floating point vector generated from an encoder neural network adapted to learn a compression of the raw image data into the floating point latent vector defined by the feature set representing speech motions of the individual.

8. The system of claim 7, wherein the encoder neural network is a trained 2D CNN adapted to generate pixel segments on at least one of eyes, nose, and lip corners, trained to recognize people to output the floating point latent vector.

9. The system of claim 8, wherein the digitally signed token includes a plurality of floating point latent vectors, each of the floating point latent vectors trained based on a different mix of feature sets representing speech motions of the individual.

10. The system of claim 1, wherein the third party computing device is able to access, or stores on local memory, one or more public keys corresponding to the one or more cryptographic keys, and during processing of the digitally signed token, validates that the digitally signed token is signed by at least one of the one or more public keys.

11. A method for authentication using secure tokens, the method comprising:
receiving one or more data sets representing one or more biometric verification credentials including at least image sets storing a facial representation of an individual having a set of features identifying the individual;
transforming the set of features in combination with one or more cryptographic keys to generate a digitally signed token representing a model data architecture or parameters of the model data architecture trained on speech motions of the individual extracted from the one or more data sets; and
storing the digitally signed token in a data storage resident on the mobile computing device;
wherein the digitally signed token, when processed by a third party computing device, indicates that one or more characteristics of the individual are verified by one or more parties associated with each cryptographic key of the one or more cryptographic keys; and
wherein the digitally signed token is adapted for processing against a challenge response data set representative of one or more response images representing an unverified individual speaking one or more response passphrases.

12. The method of claim 11, wherein the one or more data sets include one or more image sets storing a facial representation and a model data architecture trained based on speech motions of the individual, the transformation includes combining the facial representation, the model data architecture or the weights of the model data architecture, and the one or more cryptographic keys into the digitally signed token;
wherein the third party computing device is configured for:
processing the digitally signed token upon against the challenge response data set; and
validating the challenge response data set against the facial representation and the model data architecture.

13. The method of claim 12, wherein the model data architecture is adapted to iteratively update, through modifying one or more weight values associated with one or more computing nodes, one or more transfer functions configured to minimize a loss function related to a false positive by using the speech motions of the individual as positive training examples and using reference speech motions of other individuals as negative training examples, the one or more trained transfer functions used to process the validate the challenge response data set.

14. The method of claim 13, wherein each of the one or more passphrases includes one or more passphrase phonemes; and wherein the model data architecture includes a plurality of separate transfer functions, each corresponding to a separate passphrase phoneme, and each of the separate transfer functions generates intermediate outputs which are combined together to establish the output of the model data architecture.

15. The method of claim 14, wherein the one or more passphrases includes a plurality of passphrases, and the third party computing device randomly or pseudo-randomly selects which of the plurality of passphrases to present as a challenge string.

16. The method of claim 13, wherein the one or more image sets include depth values, and the speech motions of the individual are extracted from the one or more image data sets based a feature set including at least on at least one of: lateral and medial position coordinates of both eyes, lateral-position coordinates of lips, a forehead curvature, distances between an ear and the eyes, or a height of nose.

17. The method of claim 16, wherein the set of features is represented as a floating point latent vector extracted from raw image data, the floating point vector generated from an encoder neural network adapted to learn a compression of the raw image data into the floating point latent vector defined by the feature set representing speech motions of the individual.

18. The method of claim 17, wherein the encoder neural network is a trained 2D CNN adapted to generate pixel segments on at least one of eyes, nose, and lip corners, trained to recognize people to output the floating point latent vector.

19. The method of claim 18, wherein the digitally signed token includes a plurality of floating point latent vectors, each of the floating point latent vectors trained based on a different mix of feature sets representing speech motions of the individual.

20. A non-transitory computer readable medium storing machine interpretable instructions, which when executed by a processor, cause the processor to perform a method for authentication using secure tokens, the method comprising:
    receiving one or more data sets representing one or more biometric verification credentials including at least image sets storing a facial representation of an individual having a set of features identifying the individual;
    transforming the set of features in combination with one or more cryptographic keys to generate a digitally signed token representing a model data architecture or parameters of the model data architecture trained on speech motions of the individual extracted from the one or more data sets; and
    storing the digitally signed token in a data storage resident on the mobile computing device;
    wherein the digitally signed token, when processed by a third party computing device, indicates that one or more characteristics of the individual are verified by one or more parties associated with each cryptographic key of the one or more cryptographic keys; and
    wherein the digitally signed token is adapted for processing against a challenge response data set representative of one or more response images representing an unverified individual speaking one or more response passphrases.

* * * * *